US007925996B2

(12) United States Patent
Hofmeister et al.

(10) Patent No.: US 7,925,996 B2
(45) Date of Patent: Apr. 12, 2011

(54) METHOD AND SYSTEM FOR PROVIDING MULTIPLE INPUT CONNECTING USER INTERFACE

(75) Inventors: Nicholas M. Hofmeister, Seattle, WA (US); Dane T. Storrusten, Seattle, WA (US); Ann Valencia, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1139 days.

(21) Appl. No.: 10/991,813

(22) Filed: Nov. 18, 2004

(65) Prior Publication Data
US 2006/0112335 A1 May 25, 2006

(51) Int. Cl.
 G06F 3/033 (2006.01)
 G06F 3/01 (2006.01)
 G06F 3/00 (2006.01)
 G06F 3/048 (2006.01)
(52) U.S. Cl. ........ 715/863; 715/701; 715/709; 715/772; 715/805; 715/855; 715/861
(58) Field of Classification Search .................. 715/709, 715/710, 772, 805, 855, 861, 863; 463/37
See application file for complete search history.

(56) References Cited

U.S. PATENT DOCUMENTS

| 4,346,376 | A | * | 8/1982 | Mallos | ........................... 345/176 |
| 4,561,017 | A | | 12/1985 | Greene | |
| 4,914,624 | A | | 4/1990 | Dunthorn | |
| 4,992,650 | A | | 2/1991 | Somerville | |
| 5,155,813 | A | | 10/1992 | Donoghue | |
| 5,319,747 | A | | 6/1994 | Gerrissen | |
| 5,347,620 | A | | 9/1994 | Zimmer | |
| 5,483,261 | A | | 1/1996 | Yasutake | |
| 5,488,204 | A | | 1/1996 | Mead | |
| 5,570,281 | A | * | 10/1996 | Berry | .............................. 700/17 |
| 5,638,093 | A | | 6/1997 | Takahashi | |
| 5,646,650 | A | | 7/1997 | Miller | |
| 5,748,184 | A | | 5/1998 | Shieh | |

(Continued)

FOREIGN PATENT DOCUMENTS

EP 476972 A2 * 3/1992

OTHER PUBLICATIONS

"Interaction Design Guide for Touchscreen Applications" Jan. 22, 2003.*

(Continued)

*Primary Examiner* — Adam M Queler
*Assistant Examiner* — Andrea N Long
(74) *Attorney, Agent, or Firm* — Workman Nydegger

(57) ABSTRACT

A plurality of elements is identified by a user for input to the computing system by at least one of sequential and simultaneous selection of elements presented on a display of a computing system. Based on the elements thus identified, which may include at least one operator and at least one operand, the computing system recognizes a function to be performed by the computing system and causes a visual indication to be presented on the display. The computing system thus may present a visual indication showing a connection between, for example, the operator and an operand, or an operand and a functional area of the display associated with the function to be performed as a result of the elements identified. The visual indication thus confirms to the user the elements that the user has identified, and the resulting function that will be initiated.

36 Claims, 35 Drawing Sheets

U.S. PATENT DOCUMENTS

| | | | |
|---|---|---|---|
| 5,764,222 | A | 6/1998 | Shieh |
| 5,841,078 | A | 11/1998 | Miller |
| 5,845,122 | A * | 12/1998 | Nielsen et al. ............... 715/810 |
| 5,872,559 | A * | 2/1999 | Shieh ........................... 345/157 |
| 5,914,708 | A | 6/1999 | LaGrange |
| 5,920,313 | A * | 7/1999 | Diedrichsen et al. ......... 715/767 |
| 5,963,671 | A * | 10/1999 | Comerford et al. ........... 382/230 |
| 6,201,528 | B1 | 3/2001 | Lucas |
| 6,266,061 | B1 | 7/2001 | Doi |
| 6,590,568 | B1 * | 7/2003 | Astala et al. .................. 345/173 |
| 6,598,978 | B2 | 7/2003 | Hasegawa |
| 6,603,463 | B1 | 8/2003 | Rising |
| 6,606,086 | B1 | 8/2003 | Sumner |
| 6,710,770 | B2 | 3/2004 | Tomasi |
| 6,803,905 | B1 * | 10/2004 | Capps et al. .................. 345/173 |
| 6,910,132 | B1 | 6/2005 | Bhattacharya |
| 7,084,859 | B1 | 8/2006 | Pryor |
| 7,126,609 | B1 | 10/2006 | Asente |
| 7,307,622 | B2 | 12/2007 | Uchiyama |
| 7,307,623 | B2 | 12/2007 | Enomoto |
| 7,511,703 | B2 | 3/2009 | Wilson |
| 7,554,530 | B2 * | 6/2009 | Mizobuchi et al. ........... 345/173 |
| 2001/0012001 | A1 | 8/2001 | Rekimoto |
| 2002/0130839 | A1 | 9/2002 | Wallace |
| 2003/0043189 | A1 | 3/2003 | Rieffel |
| 2004/0135818 | A1 * | 7/2004 | Thomson et al. .............. 345/823 |
| 2004/0168107 | A1 * | 8/2004 | Sharp et al. ...................... 714/33 |
| 2005/0039145 | A1 * | 2/2005 | Diering et al. ................ 715/853 |
| 2005/0050024 | A1 * | 3/2005 | Ellis et al. .......................... 707/3 |
| 2005/0057498 | A1 * | 3/2005 | Gentle ........................... 345/157 |
| 2005/0086610 | A1 * | 4/2005 | Mackinlay et al. ............ 715/817 |
| 2005/0116929 | A1 * | 6/2005 | Molander et al. .............. 345/157 |
| 2005/0162402 | A1 * | 7/2005 | Watanachote ................. 345/173 |
| 2006/0001650 | A1 | 1/2006 | Robbins |
| 2006/0026521 | A1 * | 2/2006 | Hotelling et al. .............. 715/702 |
| 2006/0062094 | A1 * | 3/2006 | Nathan et al. ............... 369/30.06 |
| 2006/0097991 | A1 | 5/2006 | Hotelling |

OTHER PUBLICATIONS

Pierre Wellner "Interacting with Paper on the DigitalDesk" Communications of the ACM Jul. 1993/vol. 36, No. 7 pp. 87-96.*

Jun Rekimoto "SmartSkin: An Infrastructure for Freehand Manipulation on Interactive Surfaces" CHI 2002: changing the world, changing ourselves, Apr. 20-25, 2002 vol. No. 4, Issue No. 1 pp. 113-120.*

Microsoft "Final Release of Windows Media 9 Series Starts Next Wave of Digital Media" Jan. 7, 2003.*

Kenton O'Hara, Matthew Lipson, Marcel Jansen, Axel Unger, Huw Jeffries, Peter Macer "Jukola: Democratic Music Choice in a Public Space" DIS2004, Aug. 1-4, 2004 pp. 145-154.*

Touch-N-Go Software www.touch-n-go.com/software.htm Wayback Machine for Oct. 19, 2004.*

Sergi Jorda "Interactive music systems for everyone: Exploring visual feedback as a way for creating more intuitive, efficient and learnable instruments" Proceedings of Stockholm Music Acoustics Conference, Aug. 6-9, 2003 (SMAC 03), pp. 1-6.*

"3.6 Interpolation in Two or More Dimensions," Numerical Recipes in C: The Art of Scientific Computing. Chapter 3. Interpolation and Extrapolation. © 1988-1992, Cambridge University Press. Numerical Recipes Software. pp. 123-128.

"Bar Code 1, 2-Dimensional Bar Code Page." Available http://www.adams1.com/pub/russadam/stack.html. Printed Jan. 20, 2004. 14pp.

Ambiente article. "InteracTable®." Dated Jul. 7, 2000. Available http://wwww.darmstadt.gmd.de/ambiente/activities/interactable.html. Printed Nov. 21, 2003 3pp.

Bier, Stone, Pier, Buston, and DeRose. "Toolglass and Magic Lenses: The See-Through Interface." Proceedings of Siggraph '93 (Anaheim, August). Computer Graphics Annual Conference Series, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 47-47.

"DiamondSpin—Begs for Direct Manipulation Technology Is it in the Pen? Sony Leaps Out-of-the-Box Again Pen with Gummi." Mitsubishi/DiamondSpin. CHI 2004#3. Printed Apr. 30, 2004. 5pp.

Dietz and Leigh, "DiamondTouch: A Multi=User Touch Technology." UIST '01 Orlando FLA. © ACM 2001 1-58113-438-x/01/11. CHI Letters 3 (2). Nov. 11-14, 2001. pp. 219-226.

Electronic Check Alliance Processing, Inc. "Gift Cards, How Stored Value Card Systems Work." Available. http:www.electron-cap.com/GiftCards.htm. Printed Jan. 20, 2004 and May 16, 2004. © 2003. 2pp. Total (3pp printed).

Fukuchi and Rekimoto. Interaction Techniques for SmartSkin.: ACM UIST2002 demonstration, 2002. 2pp.

Grabowski, Robert. "A Miniature Video Laser Range Finder for Small Robots." Available http://www.andrew.cmu.edu/~rig/research_hardware/laser_rangefinder.html. Printed May 16, 2004. 8pp.

Grant and Winograd. "Flexible, Collaborative Organization on a Tabletop." ACM CSCW 2002: Workshop on Co-located Tabletop Collaboration: Technologies and Directions. New Orleans, LA. Nov. 2002. pp. 1-4.

Horn, Berthold K.P. "Robot Vision." The MIT Press. Available http://mitpress.mit.edu/catalog/item/default.asp?ttype=2&tid=8388. Printed Dec. 17, 2003. 6pp.

Horn, Berthold Klaus Paul. "Robot Vision." Binary Images: Topological Properties. The MIT Electrical Engineering and Computer Sciene Seriese. 1986. pp. 66-71 and cover pages(s).

Hunter, Anders. "Connected Components Analysis (Computer Vision)." ww.google.com search results http://www.google.com/search?sourceid=navclient&q=connected+component+ellipse. Printed Mar. 7, 2004. Article dated Sep. 24, 2002. 2pp search results, 21pp article.

IR Distance Sensor.: Available http://www.diyelectronics.com/Accessories/IRDS.html (2pp) and http://www.diyelectronics.com/Accessories/GP2D05.html (1pg.). Printed Dec. 30, 2003. 3pp.

"Tangible Bits: Towards Seamless Interfaces between People, Bits and Atoms." Proceedings of CHI '97, Mar. 22-27, 1997, Atlanta, Georgia © 1997 ACM 0-89791-802-9/97/03. pp. 1-8.

Ishii, Wisneski, Orbanes, Chun, and Paradiso. "PinPongPlus: Design of an Athletic-Tangible Interface for Computer-Supported Cooperative Play." Proceedings of CHI '99, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." Extended Abstracts of CHI 2001, Seattle. Apr. 2001 pp. 269-270.

Kang, Sing Bing. "Radial Distortion Snakes." IAPR Workshop on Machine Vision Applications (MVA2000), Tokyo, Japan. Nov. 2000. pp. 603-606.

Kato Billinghurst, Poupyrev, Imamoto, and Tachibana. "Virtual Object Manipulation on a Table-Top AR Environment." IEEE and ACM Int'l Symposium on Augmented Reality 2000, ISAR '2000, Oct. 5-6, 2000, Munich 9pp.

Klemmer, Newman, and Sapien. "The Designer's Outpost: A Task-Centered Tangible Interface for Web Site Information Design." Proceedings of Human Factors in Computing Systems: CHI 2000 Extended Abstracts. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." CHI Letters, The 14th Annual ACM Symposium on User Interface Soft Technology: UIST 2001. 3(2). pp. 1-10.

Kobayashi, Hirano, Narita, and Ishi. "A Tangible Interface for IP Network Simulation." CHI 2003, Apr. 5-10, 2003, F. Lauderdale, FL ACM 1-58113-630-7/03/0004. 2pp.

Koike, Sato, and Kobayashi. "Integrating Paper and Digital Information on EnhanceDesk: A Method for Realtime Finger Tracking on an Augmented Desk System." ACM Transaction on Computer-Human Interaction, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction in Semi-Immersive Virtual Environments." Proceedings of the IEEE Virtual Reality 2000 Conference, Mar. 18-22, 2000. New Brunswich, New Jersey: IEEE Computer Society, 2000. 8pp.

Leigh and Dietz "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." 5th International Conference on Ubiquitous Computing (Ubicomp '03), Oct. 12-15, 2003, Seattle, Washington. 2 pp.

Malandain, Gregoire. "Connected Components Extraction." Available http://www-sop.inria.fr/epidaure/personnel/malandai/segment/connese.html. Printed Dec. 18, 2003. 3pp.

Matsushita and Rekimoto. "HoloWall; Designing a Finger, Hand, Body, and Object Sensitive Wall." UIST '97 Banff, Alberta, Canada. © 1997 ACM 0-89791-881-9/97/10. pp. 209-210.

Missouri Department of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." UIST '99. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." Proceedings of UIST 2002, Oct. 27-30, 2002. © 2002 ACM. 10pp.

Paradiso, Hsiao, Strickon, Lifton, and Adler. "Sensor systems for interactive surfaces." IBM Systems Journal, vol. 39, Nos. 3&4, 2000. pp. 892-914.

Patten, Ishii, Hines, and Pangaro. "Sensetable: A Wireless Object Tracking Platform for Tangible User Interfaces." Proceedings of CHI 2001, Mar. 31-Apr. 5, 2001, ACM Press, © 2001 ACM. 8 pp.

Patten, Recht, and Ishii. "Audiopad: A Tag-based Interface for Musical Performance." Proceedings of Conference on New Interface for Musical Expression (NIME '02). Dublin, Ireland, May 24-26, 2002 6pp.

Ramos and Balakrishnan. "Fluid Interaction Techniques for the Control and Annotation of Digital Video." UIST '03 Vancouver, B.C., Canada. © 2003 ACM 1-58133-636-06/03/0010. pp. 105-114.

Rekimoto and Ayatsuka "CyberCode: Designing Augmented Reality Environments with Visual Tags." Proc. Of UIST 2000, 2000. 10pp.

Rekimoto and Matsushita. "Perceptual Surfaces: Towards a Human and Object Sensitive Interactive Display." Proceedings of Workshop on Perceptual User Interfaces (PUI'97), 1997. 3pp.

Rekimoto and Nagao. "The World through the Computer: Computer Augmented Interaction with Real World Environments." Proceedings of UIST'95, 1995. pp. 29-36.

Rekimoto and Saitoh. "Augmented Surfaces: A Spatially Continuous Work Space for Hybrid Computing Environments." CHI '99, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." Proc. Of Asia Pacific Computer Human Interaction (APCHI '98), 1998. 6pp.

Rekimoto, Jun. "Multiple-Computer User Interfaces: 'Beyond the Desktop' Direct Manipulation Environments." ACI CHI2000 Video Proceedings, 2000. 2pp.

Rekimoto, Jun. "Pick-and-Drop: A Direct Manipulation Technique for Multiple Computer Environments." Proceedings of UIST'97, 1997. pp. 31-39.

Rekimoto, Jun. "SmartSkin: An Infrastructure for Freehand Manipulation on Interactive Surfaces." CHI 2002, Apr. 20-25, 2002, Minneapolis, Minnesota. © 2001 ACM 1-58113-453-3/02/0004. 8pp.

Rekimoto, Ullmer, and Oba. "Data Tiles: A Modular Platform for Mixed Physical and Graphical Interactions." SIGCHI'01, Mar. 31-Apr. 4, 2001, Seattle, WA. © 2001 ACM 1-58113-327-8/01/0003. 8pp.

Reznik, Canny, and Alldrin. "Leaving on a Plane Jet." 2001 Int. Conf. on Intelligent Robots & Systems (IROS), Maui, Hawaii, Oct. 2001. 6pp.

Ringel, Gerh, Jin, and Winograd. "Barehands: Implement-Free Interaction with a Wall-Mounted Display." Short Talk. CHI 2001 Mar. 31-Apr. 5 pp. 367-368.

Rosenfeld, Zawadzki, Sudol, and Perlin. "Planar Manipulator Display." New York University MRL. NYU Media Research Lab. Available http://cat.nyu.edu/PMD. Printed May 16, 2004. 3pp.

Rovani, David (Posted by). "My Second Month with the Compaq Tablet." Home>Reviews, TablePCHome.com—Table PC user community. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction with The Virtual Table." Presented at 1999 ACM Symposium on Interactive 3D Graphics (I3DG '99). Apr. 26-28, 1999, Atlanta, GA. 7pp.

Scott, Grant, and Mandryk. "System Guidelines for Co-located collaborative Work on a Tabletop Display." Proceedings of ECSCW'03, European Conference Computer-Supported Cooperative Work 2003, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." Interactions. Mar.+Apr. 2003. pp. 15-22.

Shen, Lesh, Bernier, Forlines, and Frost. "Sharing and Building Digital Group Histories." CSCW'02, Nov. 16-20, 2002, New Orleans, Louisiana. © 2002 ACM 1-58113-560-2/02/0011. 10pp.

Shen, Lesh, and Moghaddam, Beardsley, and Bardsley. "Personal Digital Historian: User Interface Design." © Mitsubishi Electric Research Laboratories, Inc. 2001. Cambridge, Massachusetts. 5pp.

SMART Technologies Inc. White Paper. "DViT Digital Vision Touch Technology." Feb. 2003. 10pp.

Smart Technologies, Inc. "Rear Projection SMART Board TM Interactive Whiteboard" "SMART Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary,Lyons, Gandy, and Pair. "Towards Augmented Reality Gaming." Available http://www.gvu.gatech.Edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." Proceedings of the ACM Conference on Human Factors in Computing Systems (CHI'99), Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." Pen Computing Magazine: Tablet PC. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." Proceedings of the 14. Annual ACM Symposium on User Interface Software and Technoic (USIT'01), ACM Press (CHI Letters 3(2)), 2001, pp. 11-20 (10pp).

Ullmer and Ishii. "The metaDESK: Models and Prototypes for Tangible User Interfaces." Proceedings of UIST'97, Oct. 14-17, 1997. © 1997 ACM—ACM 0-89791-881-9/97/10. 10pp.

Ullmer, Ishii and Glas. "mediaBlocks: Physical Containers, Transports, and Controls for Online Media." Computer Graphics Proceedings (SIGGRAPH'98), Jul. 19-24, 1998, © 1998 ACM. ACM-0-89791-999-88/98/007. 8pp.

Ullmer, Ishii and Jacob. "Tangible query Interfaces: Physically Constrained Tokens for Manipulating Database Queries." Proc. INTERACT 2003 Conference, 2003. 11pp.

Underkoffler and Ishii. "Illuminating Light: An Optical Design Tool with a Luminous-Tangible Interface." Proceeding of CHI '98, Apr. 18-23, 1998, © 1998 ACM. pp. 1-8.

Underkoffler and Ishii. "Urp: A Luminous-Tangible Workbench for Urban Planning and Design." Proceedings of CHI '99. May 15-20, 1999. © 1998 ACM. pp. 1-8.

Underkoffler Ullmer, and Ishii. "Emancipated Pixels: Real-World Graphics in the Luminous Room." Proceedings of SIGGRAPH '99, Aug. 8-13, 1999, © 1999 ACM. 8pp.

Vernier, Lesh and Shen. "Visualization Techniques for Circular Tabletop Interfaces." To appear in Advanced Visual Interfaces, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp."VIRTUALBOARD." Available http://visilab.unime.it/visilab/virtualboard.htm. Printed Dec. 16, 2003. 6pp.

Von Hardenberg and Bérard. Bare-Hand Human-Computer Interaction. PUI 2001 Orlando, FL, © 2001 ACM 1-58113-448-7-11/14/01. 8pp.

Wellner, Pierre. "Interacting with Paper on the DigitalDesk." Communications of the ACM. Jul. 1993. EuroPARC tech report EPC-93-195. 17pp.

Whalen, Tara. "Playing well with Others: Applying Board Game Design to Tabletop Display Interfaces." UIST 203. Vancouver, Nov. 2-5, 2003, 3pp.

Wu and Balakrishnan. "Multi-Finger and Whole Hand Gestural Interaction Techniques for Multi-User Tabletop Displays." UIST '03, Vancouver, B.C., Canada. © 2003 ACM 1-58113-636-6/03/0010. pp. 193-202.

Office Action dated Jul. 27, 2007 cited in U.S. Appl. No. 10/883,515.
Office Action dated Jan. 28, 2008 cited in U.S. Appl. No. 10/883,515.
Office Action dated Oct. 17, 2008 cited in U.S. Appl. No. 10/883,515.
Office Action dated Jul. 7, 2009 cited in U.S. Appl. No. 10/883,515.
Notice of Allowance dated Dec. 29, 2009 cited in U.S. Appl. No. 10/883,515.
Office Action dated Aug. 22, 2007 cited in U.S. Appl. No. 10/879,872.
Office Action dated Apr. 10, 2008 cited in U.S. Appl. No. 10/879,872.
Notice of Allowance dated Dec. 31, 2008 cited in U.S. Appl. No. 10/879,872.
Notice of Allowance dated Feb. 22, 2010 cited in U.S. Appl. No. 10/883,515.

* cited by examiner

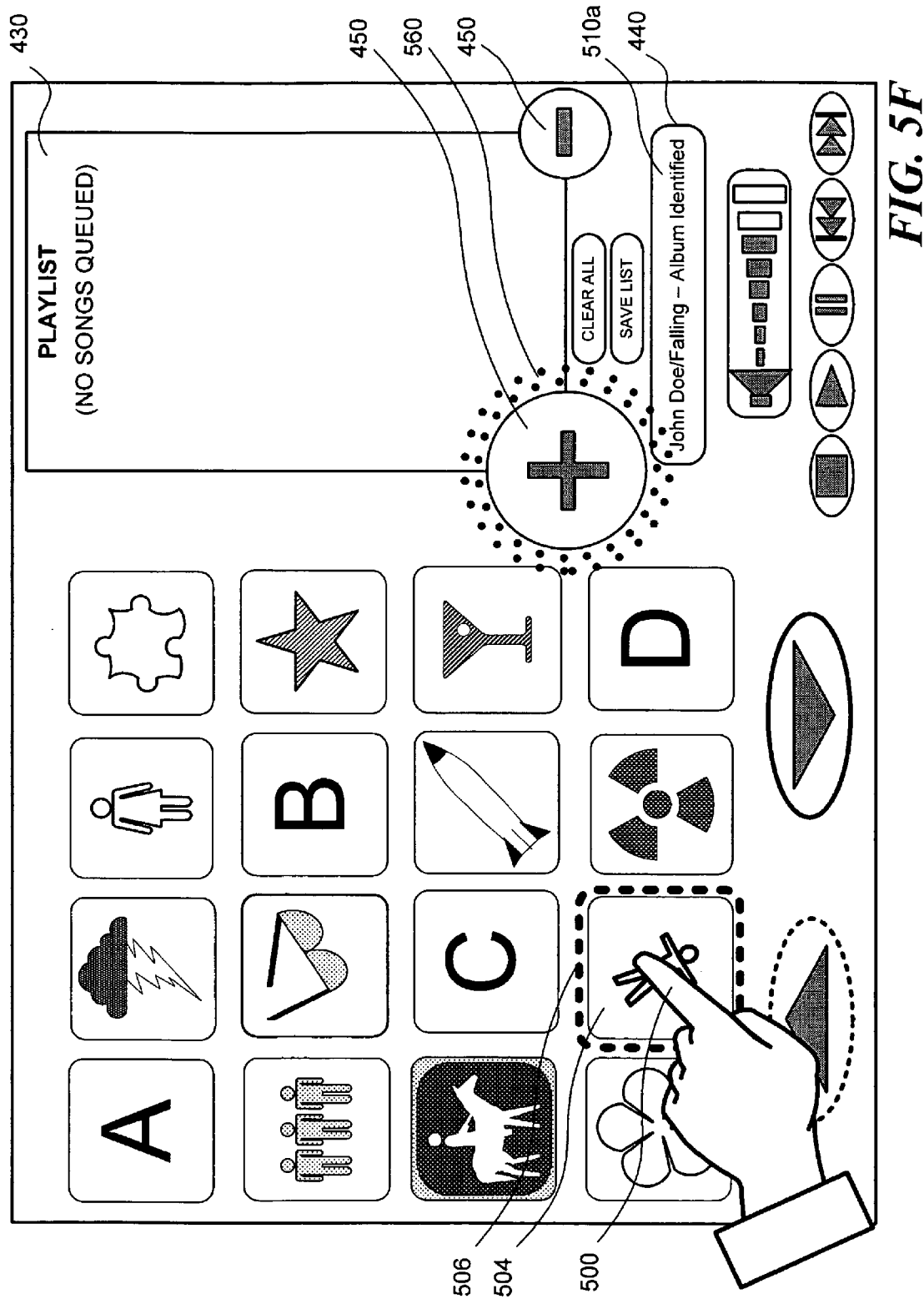

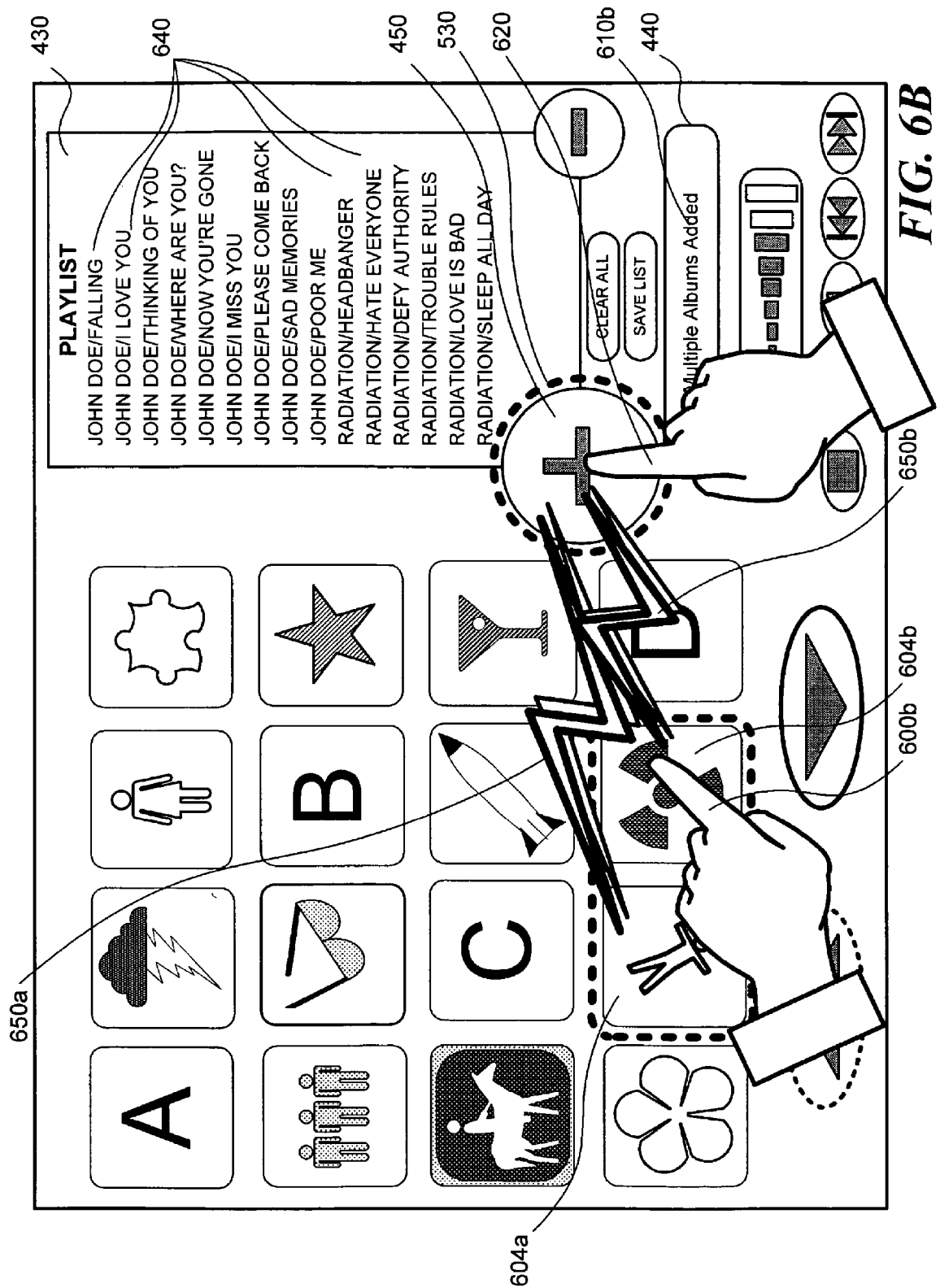

METHOD AND SYSTEM FOR PROVIDING MULTIPLE INPUT CONNECTING USER INTERFACE

FIELD OF THE INVENTION

The present invention generally pertains to a user interface for a computing device, and more specifically, to providing feedback to a user confirming the result of user actions.

BACKGROUND OF THE INVENTION

Because of the widespread popularity of computers, most people have become comfortable with conventional computer input devices such as keyboards and pointing devices. The keystrokes on a keyboard, and the cursor movement and control provided by mice, trackballs, and joysticks are sufficiently intuitive to provide satisfactory interfaces for most computer-related tasks. Nonetheless, as computers become increasingly more indispensable, limits of a human-machine interface that depends upon pressing buttons and dragging a pointer with a mouse or other device tends to restrict how quickly and naturally computers can be used.

In seeking to further enhance the human-machine interface, ever-improving hardware capabilities have made possible systems that obviate the need to enter text with a keyboard. Personal digital assistants and tablet PCs can now recognize handwriting. Speech recognition software also enables users to operate computers and enter text by simply speaking into a microphone. Such systems can thus provide a more efficient and satisfying experience for users who prefer not to type on a keyboard or are less proficient in doing so, or who don't want to manipulate a pointing device.

As computers become even more commonplace throughout our environment, the desire to make computers and their interfaces even more user-friendly continues to promote development in this area. For example, the MIT Media Lab, as reported by Brygg Ullmer and Hiroshi Ishii in "The metaDESK: Models and Prototypes for Tangible User Interfaces," Proceedings of UIST 10/1997:14 17," has developed another form of "keyboardless" human machine interface. The metaDESK includes a generally planar graphical surface that not only displays computing system text and graphic output, but also receives user input by responding to an object placed against the graphical surface. The combined object responsive and display capability of the graphical surface of the metaDESK is facilitated using infrared (IR) lamps, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR reflections from the undersurface of an object placed on the graphical surface, to detect the object and its disposition.

Others have been developing similar keyboardless interfaces. For example, papers published by Jun Rekimoto of the Sony Computer Science Laboratory, Inc. and associates describe a "HoloWall" and a "HoloTable" that display images on a surface and use IR light to detect objects positioned adjacent to the surface.

By detecting a specially configured object or by detecting IR reflected light from an object disposed on a graphical display surface, the metaDESK can respond to the contemporaneous placement and movement of the object on the display surface to carry out a predefined function, such as displaying and moving a map of the MIT campus. Thus, computing systems such as the HoloWall and metaDESK may provide a more natural degree of human machine interaction by providing the means for a computer to respond to specific objects.

By facilitating a more natural input arising from the person's interaction with a graphical display, such technologies not only broaden the manner in which a user might provide tactile input to a computing system, but also generally extend the ability of a user to provide input to a computing system. In conventional computing systems, a user provides only a single input to the computing system at one time with a pointing device or a keyboard. Using a graphical user interface, for example, a user might be able to select a number of documents to move into a folder or attach to an e-mail at a single time. But first, the user must select those items, and then associate them with the folder or e-mail by dragging or performing one or more mouse clicks. Single commands are made, sequentially mirroring the interaction of the human operator: with one pointing device, a user can perform one action at a time, therefore, modes of computing system input are designed to receive only one input at a time.

There is a degree of comfort with serial, single-input systems. When input is provided serially, a user is compelled by the serial input paradigm to perform actions in a logical, or at least a mandated sequence. In the example described above, to add a document as an attachment to an e-mail, the user first would identify the document to be attached, and then perform a second input to actually attach it to the e-mail. The serial input structure's limit of eliciting one input at a time inherently simplifies the process for the user so that the user does not become confused as to the nature or consequences of the actions being performed.

By contrast, an interactive display surface potentially enables a user—or multiple users—to simultaneously enter multiple inputs to the computing system. For example, a user might perform input by using both hands at the same time, or by positioning multiple physical objects adjacent to the interactive display surface. Examples of other methods and systems for detecting and responding to multiple objects placed on or near a graphical surface at one time are described in connection with other inventions owned by the assignee of the present application. These inventions are described in co-pending U.S. patent application Ser. No. 10/879,872, entitled "Using Size And Shape Of A Physical Object To Manipulate Output In An Interactive Display Application," filed on Jun. 28, 2004, and application Ser. No. 10/883,515, entitled "Using Physical Objects To Adjust Attributes Of An Interactive Display Application," filed on Jun. 30, 2004.

A possible concern with enabling one or more users to enter simultaneous multiple inputs to a computing system is the need to provide an indication to a user of choices made and the functions thus initiated. In other contexts where a person operates a device by providing multiple simultaneous inputs, it is common to receive visual, audible, or tactile feedback that indicates the simultaneous inputs are correct. For example, when a person playing a piano presses the intended keys at the same time, the resulting sound will indicate that the actions were correct. Similarly, a user operating an automobile with a manual transmission who fails to depress the clutch fully when shifting gears will receive multiple forms of audible and tactile feedback indicating that the user has failed to properly shift the transmission.

The ability to provide multiple simultaneous user inputs to a computing system does not necessarily provide such an unambiguous confirmation and feedback. For example, if a user were permitted to delete files by simultaneously pressing a delete key and a key corresponding to the first letter of a file name, the user might unknowingly and/or unintentionally delete a number of files by failing to change one of the inputs in time to carry out the intended action or by providing the wrong input. A user might be able to check that the desired files were indeed deleted, by opening a "recycle bin" or "deleted items" folder to see that the intended files were deleted. The user may choose not to bother with the additional step of having to check the contents of such a folder, and thus inadvertently destroy files the user intended to keep. Alternatively, the user may slow the pace for providing inputs to the system to make sure that such errors do not occur. In any case, being able to make multiple inputs at one time may result in only a slight time savings compared to entering inputs one at a time, or if a mistake is made, making multiple incorrect simultaneous inputs may result in more time being consumed than carrying out the action with more traditional sequential inputs.

It would therefore be desirable to provide confirmation to a user of actions that initiate specific functions. In particular, it would be desirable to provide such confirmation with an interactive display system or other computing system configured to permit multiple, simultaneous inputs, to enable a user to interact with the system more quickly and naturally. Ideally, the user should be provided such indicia without performing extra steps or having to slow the interaction to avoid mistakes that might otherwise arise when using a system able to simultaneously process multiple user inputs.

SUMMARY OF THE INVENTION

One of the advantages of the present invention is that it facilitates an intuitive, user-friendly method for initiating a function on a computing system. Using an embodiment of the present invention, a user specifies at least two objects presented on a display screen that will cause a desired function to be initiated, and the computing system will present a visual indication confirming the user's selection. The visual indication is presented as a connection joining one or more of the elements to another object visually displayed on the screen associated with the selected function. For example, if the application is a music player application, a user may select an album cover or other visual element representing a collection of songs and, simultaneously with, just before, or just after indicating the album cover, select an operator such as an "add songs to playlist button." A visual indication in the form of a connector, such as a line, lighting bolt, or some other graphic indicia or animation, visually connects the album cover with the add button or the playlist to confirm the user's selection. As a result, when using an interactive display surface that can be engaged with the user's hands or other physical objects, an interface that may permit multiple simultaneous inputs, or another interface, the user receives visual confirmation of the user's actions.

One aspect of the present invention is thus directed to a method for providing visual feedback of selection of a plurality of elements presented on a display associated with a computing system. Identifications for the plurality of elements presented on the display are received. A function performable by the computing system as a result of a combination of the elements identified is recognized, and a function is performed between at least one of the elements identified and a portion of the display associated with the function that is recognized.

A visual option indicator is presented on the display upon detecting a first identification indicating an option for a next identification. The visual option indicator may include, for example, visually highlighting a choice of available operands when an operator is selected with the first identification. Alternatively, the visual option indicator may include visually highlighting a choice of available operators when at least one operand is selected with the first identification.

A visual indication may be presented indicating a connection between one of each of the plurality of elements identified and at least one of the plurality of elements that were identified and a portion of the display associated with the function that was recognized. The visual indication presented may be varied according to the function recognized. The identifications for the plurality of elements presented on the display may be received substantially simultaneously. At least one of the identifications for one of the plurality of elements is performed by detecting a physical object disposed adjacent the display approximately at a location where one of the plurality of elements is displayed. The physical object may include at least one of an inanimate object and a part of a user's body. When a plurality of identifications are made, the identifications may be made by a combination of physical objects including a part of a first user's body, a part of a second user's body, an inanimate object manipulated by a first user, and an inanimate object manipulated by a second user.

While a first identification of one of the combination of elements is detected as being maintained, a second identification of another of the combination of elements may be made. The function recognized may vary, based on a time interval during which the physical object is disposed adjacent to the display at the location where one of the plurality of elements is displayed. Of the combination of elements, the element for which the identification is first received may cause at least one of the function recognized and the visual indication presented to be changed.

The combination of elements may include at least one operator and at least one operand, such that identifying the operator and the at least one operand causes a predefined function represented by the operator to be performed on the at least one operand. A plurality of operands may be identified when a first operand is identified and, while an action causing the first operand to be identified continues, an additional operand is identified. The action causing the first operand to be identified includes pointing to the first operand and the action continues while the pointing action is dragged to include the additional operand.

Embodiments of the present invention may be applied to a media player application wherein the operator represents a playback function and the at least one operand includes a representation of media recording. The playback function may include at least one of an add selection to playlist function, a delete selection from playlist function, and a play function. In the media player application, the portion of the display associated with the function recognized may include one of a displayed playlist and the operator representing the playback function.

Alternatively, embodiments of the present invention may be applied to a document processing application, wherein the operator represents a document processing function and the at least one operand represents a document. The document processing function may include at least one of an attach to e-mail function, a delete function, an open function, a save function, a copy function, and a move function. As a further alternative, the application may include a gaming application wherein the at least one operand represents a game element and the operator represents a game function. Further, an embodiment of the present invention may present a help facility wherein the function recognized is providing instruction to a user regarding operation of the computing system, and the visual indication illustrates consequences of a particular user action . . .

According to embodiments of the present invention, the visual indication presented on the display indicating the connection may include at least one of a linear connection and an animation. Embodiments of the present invention also may include a memory medium on which are stored machine instructions for carrying out the steps of this method.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIGS. 5A-5H, 6A-6D, 7A-7D, 8A-8C, 9A-9G are screen images of the music player application of FIG. 4 in which embodiments of the present invention receive user input and provide feedback to a user regarding that input;

Figure 13:
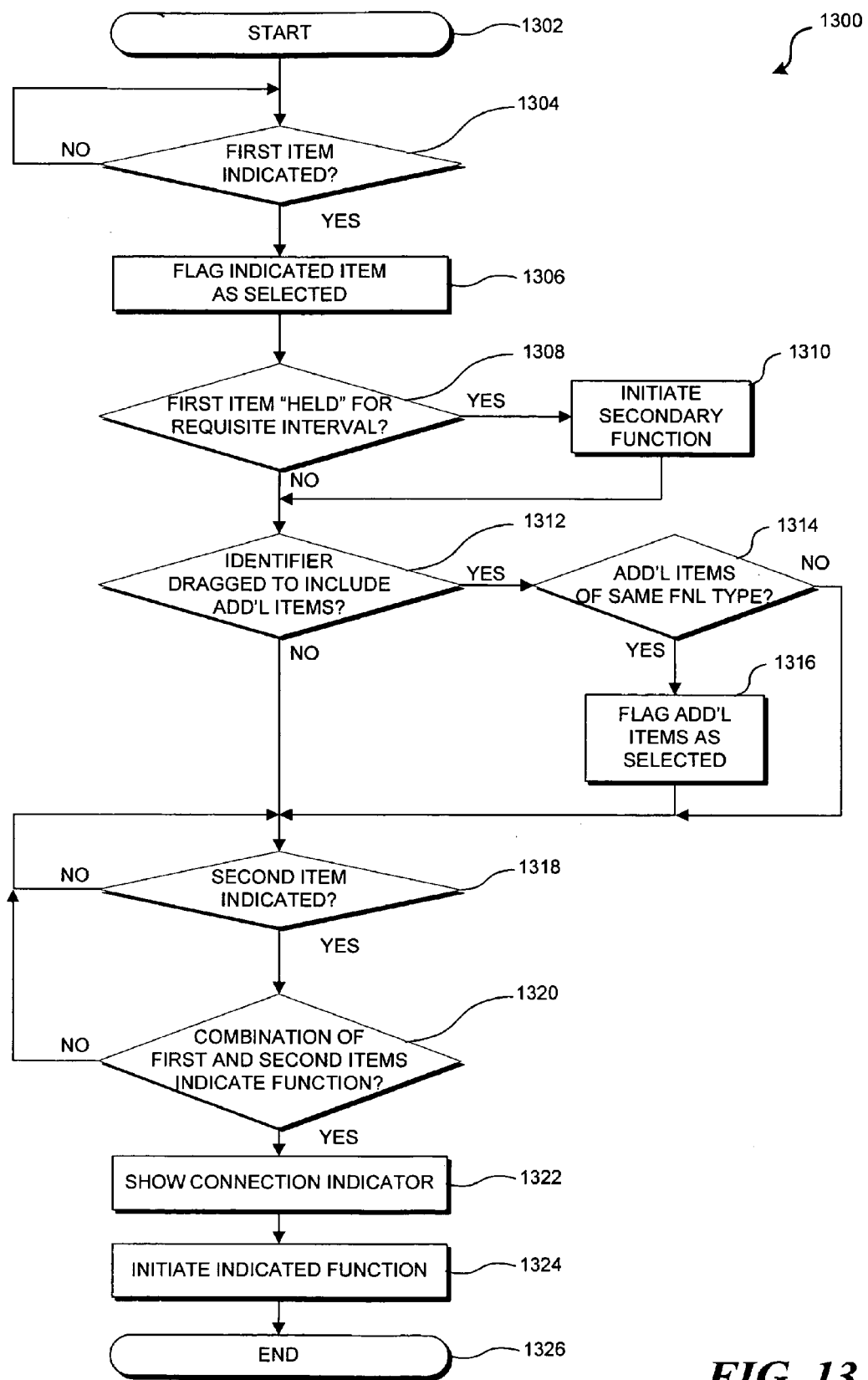
Figures 14A, 14B, 14C:
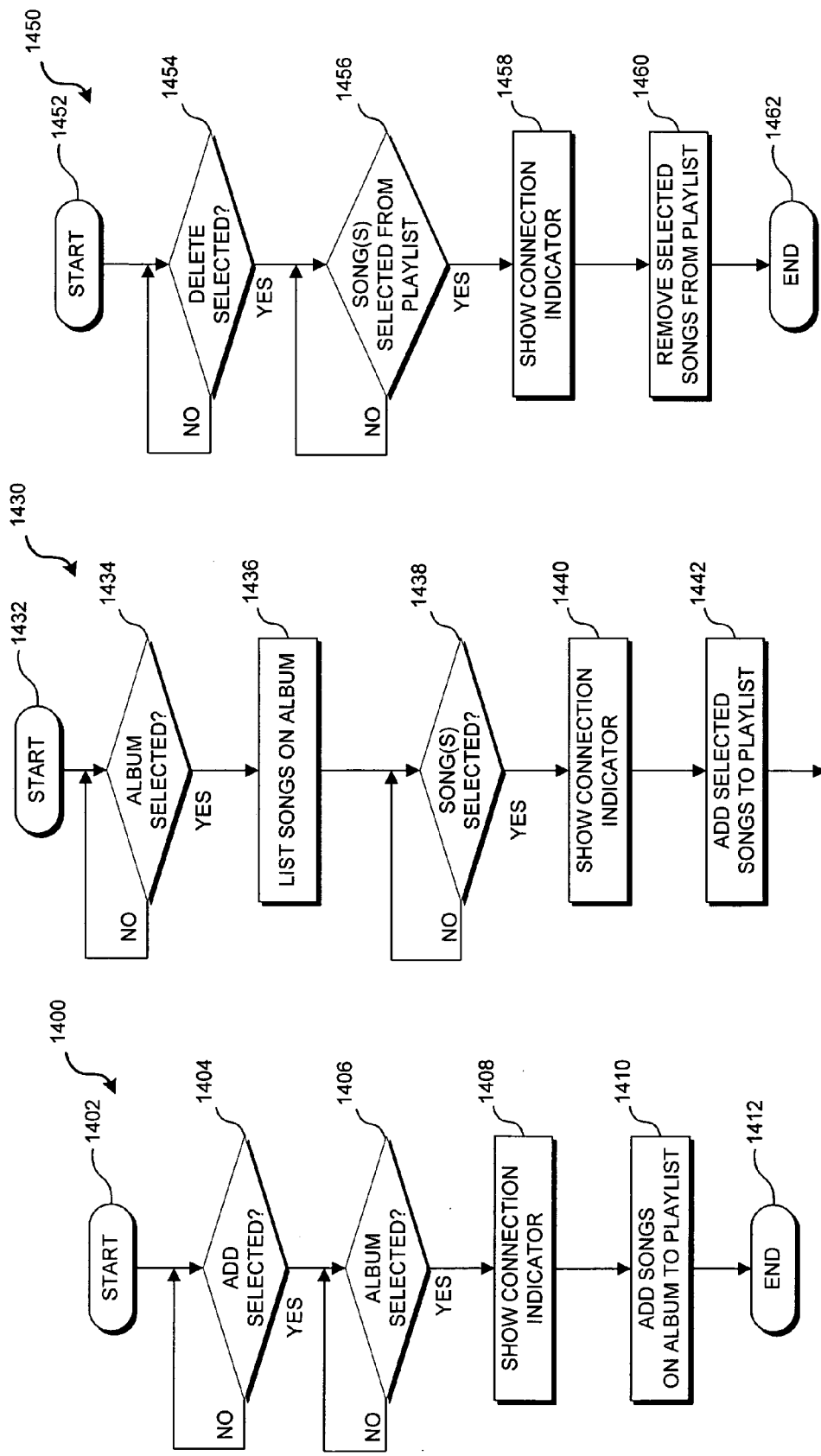

FIG. 13 is a generalized flow diagram illustrating the logical steps for receiving user input and providing user feedback in computing system interfaces according to an embodiment of the present invention; and FIGS. 14A-14C are flow diagrams illustrating the logical steps for receiving user input and providing user feedback in the music player application of FIGS. 4, 5A-5H, 6A-6D, 7A-7D, 8A-8C, and 9A-9G, according to an embodiment of the present invention.

DESCRIPTION OF THE PREFERRED EMBODIMENT

Exemplary Computing System for Implementing Present Invention

Figure 1:
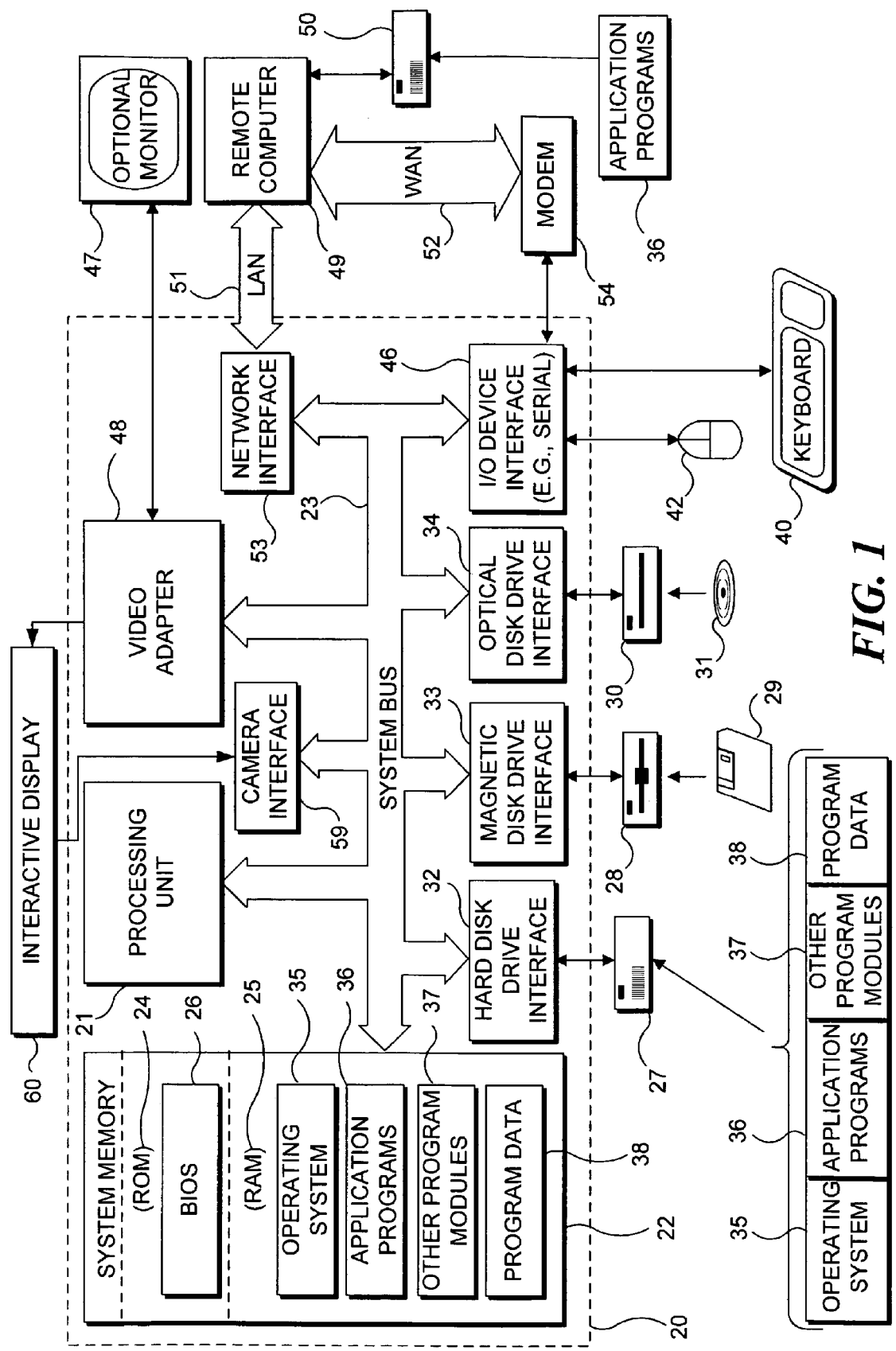
FIG. 1 is a functional block diagram of a generally conventional computing device or personal computer (PC) that is suitable for implementing an interactive display surface as used in a preferred embodiment for practicing the present invention.

With reference to FIG. 1, an exemplary system suitable for making use of embodiments of the present invention is shown. It will be appreciated, however, that the present invention is not limited to being used on the system of FIG. 1, but instead, is usable in connection with other computing devices. The system of FIG. 1 includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. Also, PC 20 may include a Bluetooth radio or other wireless interface for communication with various types of interface device, such as printers, or the interactive display table of the present invention. These and other input/output (I/O) devices are often connected to processing unit 21 through an I/O device interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals form a digital video camera that is included therein, as discussed below. The digital video camera may be instead coupled to an appropriate serial I/O port, such as to a USB version 2.0 port. An optional monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced on a single machine, or on multiple computing devices. For example, PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface

Figure 2:
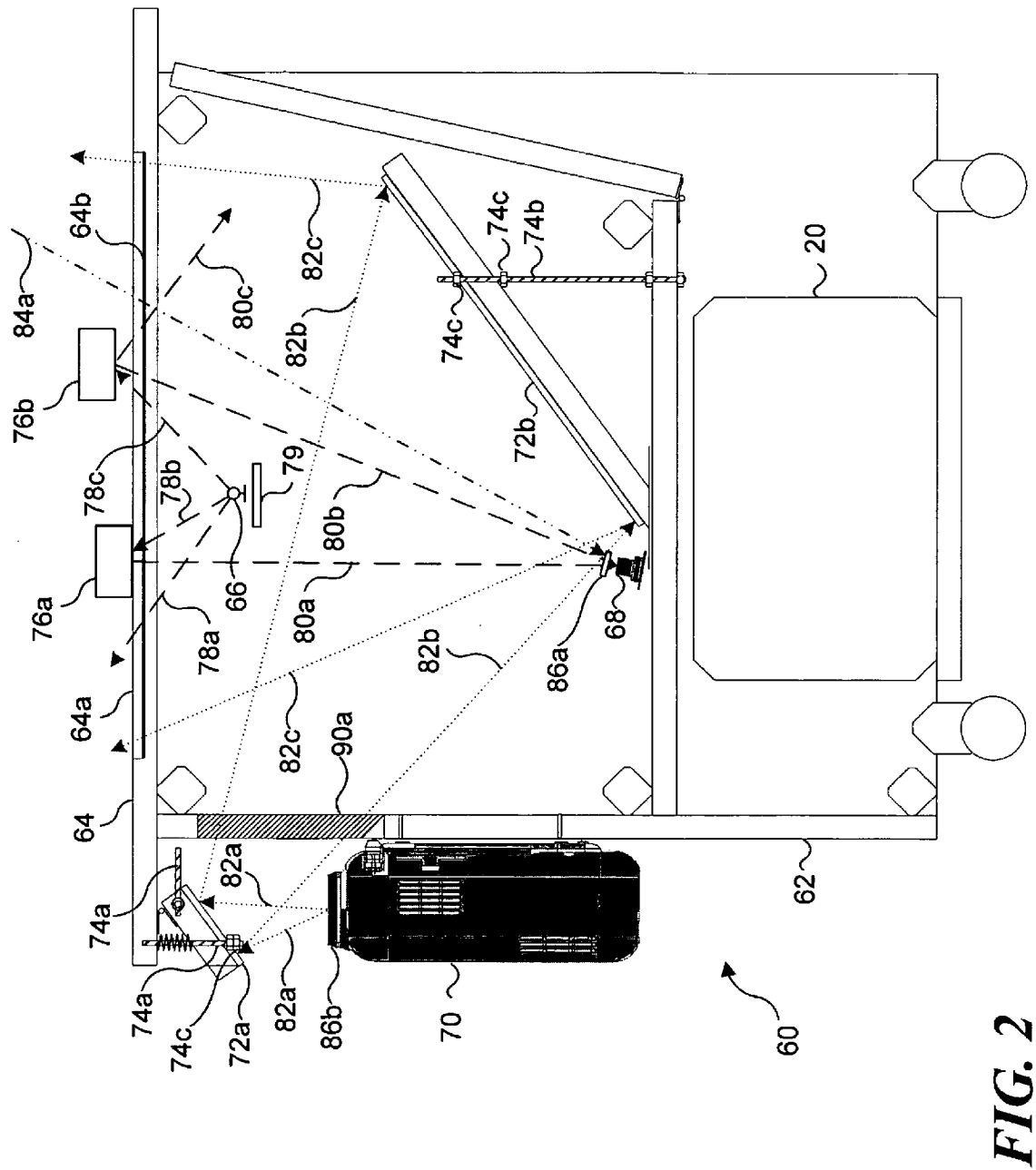
FIG. 2 is a cross-sectional view of a table having an interactive display surface, illustrating internal components of the table.

In FIG. 2, an exemplary interactive display table 60 is shown that includes PC 20 within a frame 62 and which serves as both an optical input and video display device for the PC. In this cut-away figure of interactive display table 60, rays of light used for displaying text and graphic images are generally illustrated using dotted lines 82a-82c, while rays of IR light used for sensing objects on or just above a display surface 64a of interactive display table 60 are illustrated using dashed lines 80a-80b. Display surface 64a is set within an upper surface 64 of interactive display table 60. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62 in this exemplary embodiment, but can alternatively be mounted at other locations on the interactive display table. The IR light that is produced by IR light sources 66 is directed upwardly toward the underside of display surface 64a, as indicated by dashed lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. As used herein and in the claims that follow in connection with objects positioned on or proximate to the interactive display surface, the term "adjacent to" is used with the intention that this term encompass both an object that is actually touching the interactive display surface as well as one that is just above the interactive display surface. Although only one IR light source 66 is shown, it will be appreciated that a plurality of such IR light sources may be mounted at spaced-apart locations around the interior sides of frame 62 to prove an even illumination of display surface 64a. The IR light produced by the IR light sources may:

- exit through the table surface without illuminating any objects, as indicated by dash line 78a;
- illuminate objects on the table surface, as indicated by dash line 78b; or
- illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. Thus, both touch and hover objects are "adjacent to" the display surface, as that term is used herein. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dashed line 84a. A baffle 79 is disposed between IR light source 66 and the digital video camera to prevent IR light that is directly emitted from IR light source 66 from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display including ambient IR light that also travels along the path indicated by dotted line 84a.

IR light reflected from objects on or above the table surface may be:

- reflected back through translucent layer 64b, through IR pass filter 86a and into the lens of digital video camera 68, as indicated by dashed lines 80a and 80b; or
- reflected or absorbed by other interior surfaces within the interactive display without entering the lens of digital video camera 68, as indicated by dashed line 80c.

Translucent layer 64b diffuses both incident and reflected IR light. Thus, as explained above, "hover" objects such as hover object 76b that are closer to display surface 64a will reflect more IR light back to digital video camera 68 than objects of the same reflectivity that are farther away from the display surface. The digital video camera 68 senses the IR light reflected from "touch" and "hover" objects within its imaging field and produces a digital signal corresponding to images of the reflected IR light that is input to the PC 20 for processing to determine a location of each such object, and optionally, the size, orientation, and shape of the object. It should be noted that a portion of an object, such as a user's forearm, may be above the table while another portion, such as the user's finger, is in contact with the display surface. In addition, an object may include an IR light reflective pattern or coded identifier, such as a bar code, on its bottom surface that is specific to that object or to a class of related objects of which that object is a member. Accordingly, the imaging signal from the digital video camera 68 can also be used for detecting each such specific object, as well as determining its orientation, based on the IR light reflected from its reflective pattern, in accord with the present invention.

Embodiments of the present invention are thus operable in connection with recognizing an object and/or its position relative to the interactive display surface 64a by detecting its identifying characteristics using the IR light reflected from the object. The logical steps implemented to thus detect and identify an object and its orientation are explained in the commonly-assigned patent applications, including application Ser. No. 10/814,577, entitled "Identification Of Object On Interactive Display Surface By Identifying Coded Pattern," and application Ser. No. 10/814,761, entitled "Determining Connectedness And Offset Of 3D Objects Relative To An Interactive Surface," both of which were filed on Mar. 31, 2004. The disclosure and drawings of these two patent applications are hereby specifically incorporated herein by reference.

Figure 3:
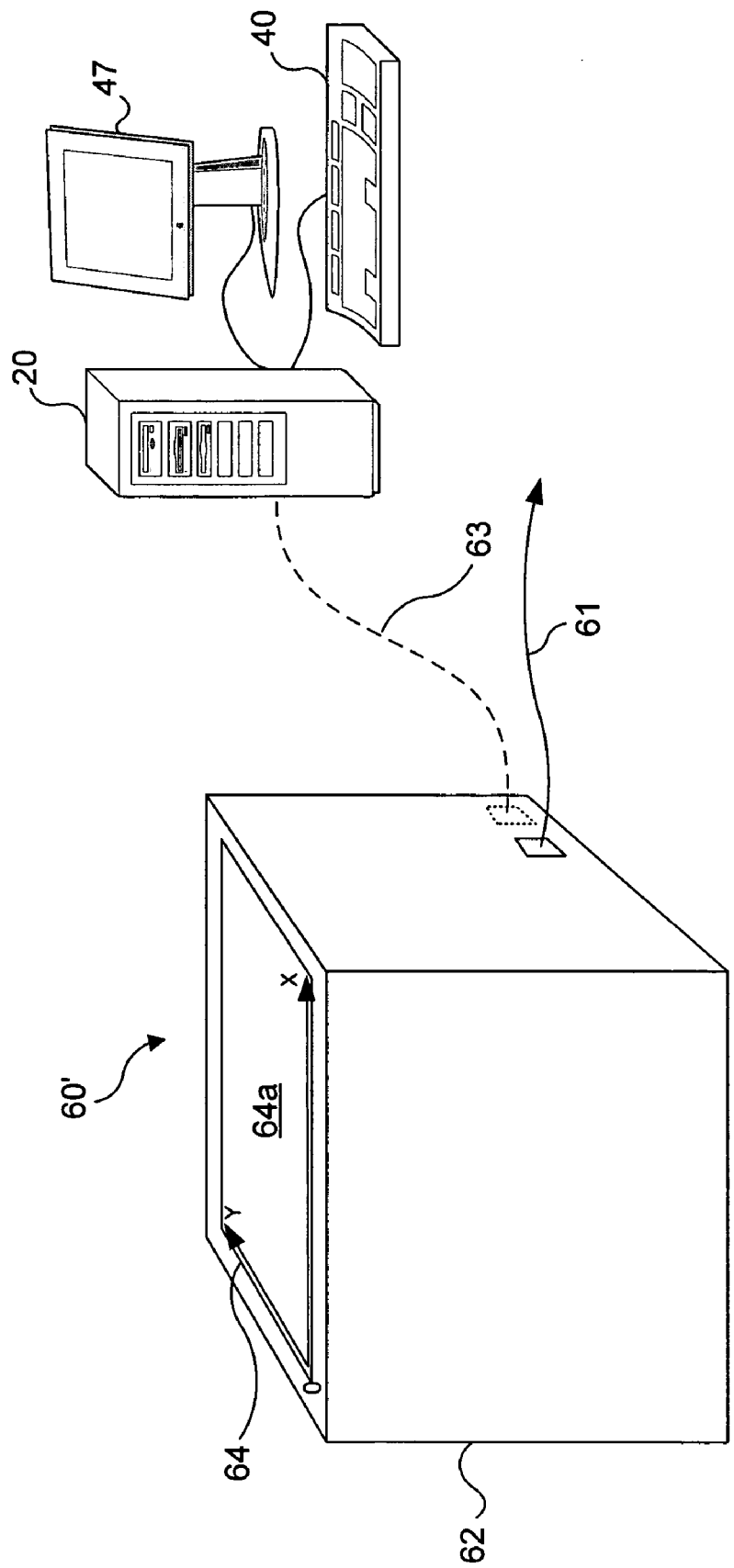
FIG. 3 is an isometric view of an embodiment of the table-type interactive display surface that is coupled to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). Alternatively, external PC 20 can be connected to interactive display table 60' via a wireless link (i.e., WiFi or other appropriate radio signal link). As also shown in this Figure, a set of orthogonal X and Y axes are associated with display surface 64a, as well as an origin indicated by "0." While not discretely shown, it will be appreciated that a plurality of coordinate locations along each orthogonal axis can be employed to specify any location on display surface 64a.

If an interactive display table 60' is connected to an external PC 20 (as in FIG. 3) or to some other type of external computing device, such as a set top box, video game, laptop computer, or media computer (not shown), then interactive display table 60' comprises an input/output device. Power for interactive display table 60' is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, interactive display table 60' might also be connected to a computing device, such as PC 20 via such a high-speed wireless connection, or via some other appropriate wired or wireless data communication link. Whether included internally as an integral part of the interactive display, or externally, PC 20 executes algorithms for processing the digital images from digital video camera 68 and executes software applications that are designed to employ the more intuitive user interface functionality of interactive display table to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of interactive display table 60 or 60' (i.e., of either of the embodiments of the interactive display table discussed above) is its ability to display graphic images or a virtual environment for games or other software applications and to enable an interaction between the graphic image or virtual environment visible on display surface 64a and identify objects that are resting atop the display surface, such as object 76a, or are hovering just above it, such as object 76b.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, or a liquid crystal on silicon (LCoS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. Video projector 70 projects light along dotted line 82a toward a first mirror assembly 72a. First mirror assembly 72a reflects projected light from dotted line 82a received from video projector 70 along dotted line 82b through a transparent opening 90a in frame 62, so that the reflected projected light is incident on a second mirror assembly 72b. Second mirror assembly 72b reflects light from dotted line 82b along dotted line 82c onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b to enable a longer focal length (and lower cost) projector lens to be used with the projector.

The foregoing and following discussions describe an interactive display device in the form of interactive display table 60 and 60'. Nevertheless, it is understood that the interactive display surface need not be in the form of a generally horizontal table top. The principles described in this description of the invention suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent the display surface.

Exemplary Music Player Application for Using the Connecting User Interface

Figure 4:
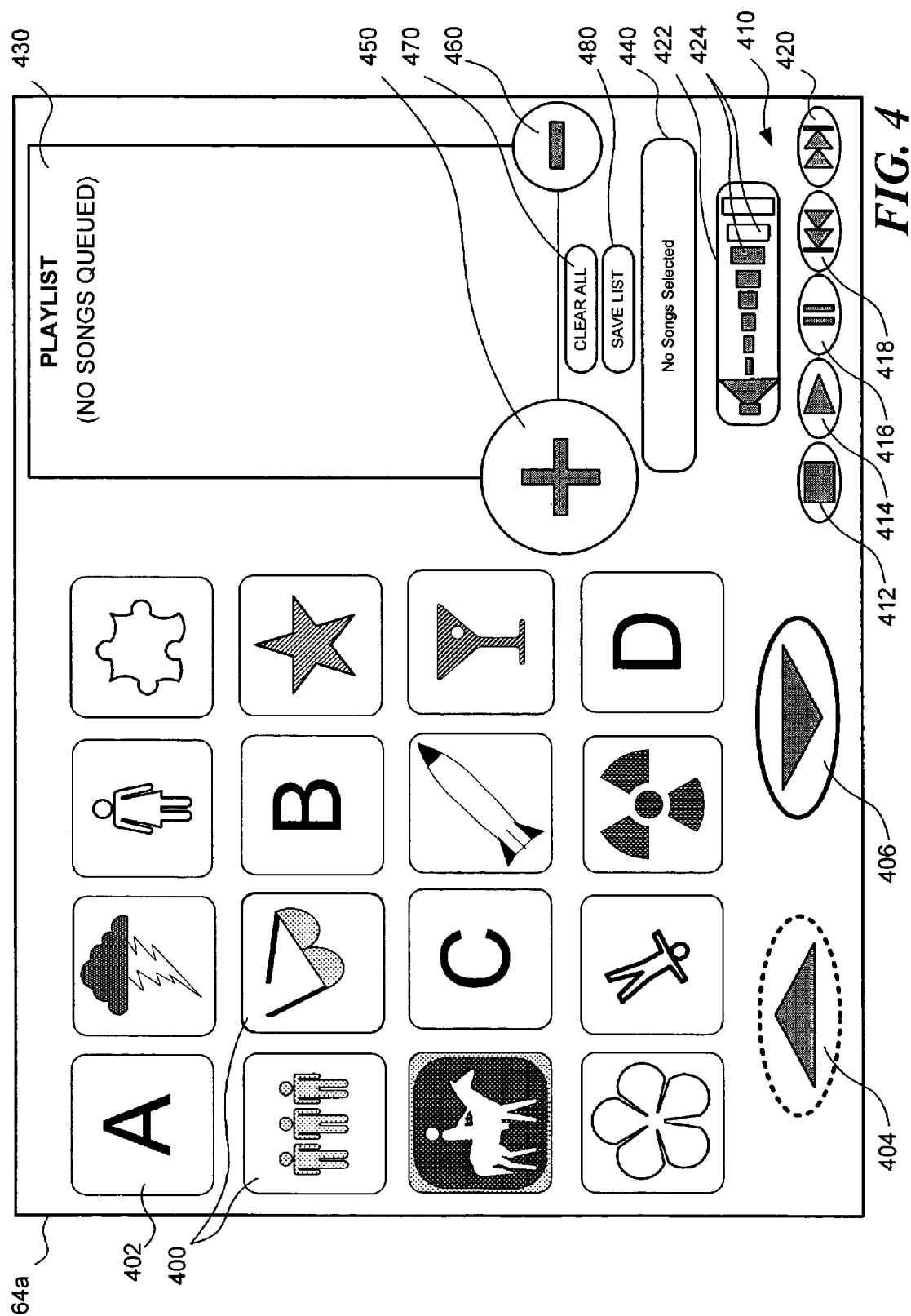
FIG. 4 is an exemplary screen image from a music player application configured to be executed on the interactive display surface and configured to use an embodiment of the present invention.

FIG. 4 is an exemplary screen image from a music player application configured to be executed in connection with the interactive display surface and configured to use embodiments of the present invention. FIGS. 5A-5E, 6A-6C, 7A-7D, 8A-8C, and 9A-9E are exemplary screen shots showing the effects of user interaction with the music player application to illustrate the operation of embodiments of the present invention.

More specifically, FIG. 4 illustrates display surface 64a presenting the music player application. The music player application enables a user to access available musical selections through a series of album covers 400 displayed on interactive display surface. As shown in FIG. 4 and the subsequent figures, album covers 400 are organized alphabetically. Letter tabs 402 delineate album covers 400 sorted under the letters "A," "B," "C," etc. Album covers 400 may be sorted alphabetically by artist name, album title, genre, or other criteria. Instead of album covers 400, other icons or graphics may be displayed to represent preselected playlists or mixes. Such icons or graphics, for example, may include images of the artist, other selected graphics, e.g., related to the genre of music, and/or descriptive labels.

Because a limited number of album covers 400 are viewable at one time on interactive display surface 64a, a user may wish to scroll upward or downward through a list of available albums using scroll up button 404 and scroll down button 406. If a user is at a first or last screen of a list of album covers 400 including available songs, scroll up button 404, as shown by the dotted outline of scroll up button 404 in FIG. 4, and/or scroll down button 406 may be inactive.

In the music player application, interactive display screen 64a also presents standard playback controls 410. Playback controls 410 include a stop button 412, a play button 414, a pause button 416 (which may be combined with play button 414), a skip backward button 416, and a skip forward button 420. Playback controls 410 also include a volume control 422 that fills or otherwise changes the appearance of a plurality of bars 424, to indicate the relative current volume level.

As is typical of conventional music players, the music player application also includes a playlist 430. Playlist 430 appears in a window and shows a list of songs that have been selected to be played. Playlist 430 shows the order in which the songs are queued for playback. The order is useful in the event that the user wishes to use the skip backward button 418 or skip forward button 420 (unless the music player is set to a random or shuffle play mode), or wishes to add or delete songs to playlist 430. A status bar 440 displays user messages to indicate or confirm a current status of the player. Operation of status bar 440 is described in more detail below. Also described below are the operation of an add button 450, which is used to add songs to playlist 420, a remove button 460, and a clear-all button 470 that is activated to remove all songs from playlist 430.

Figure 9A:
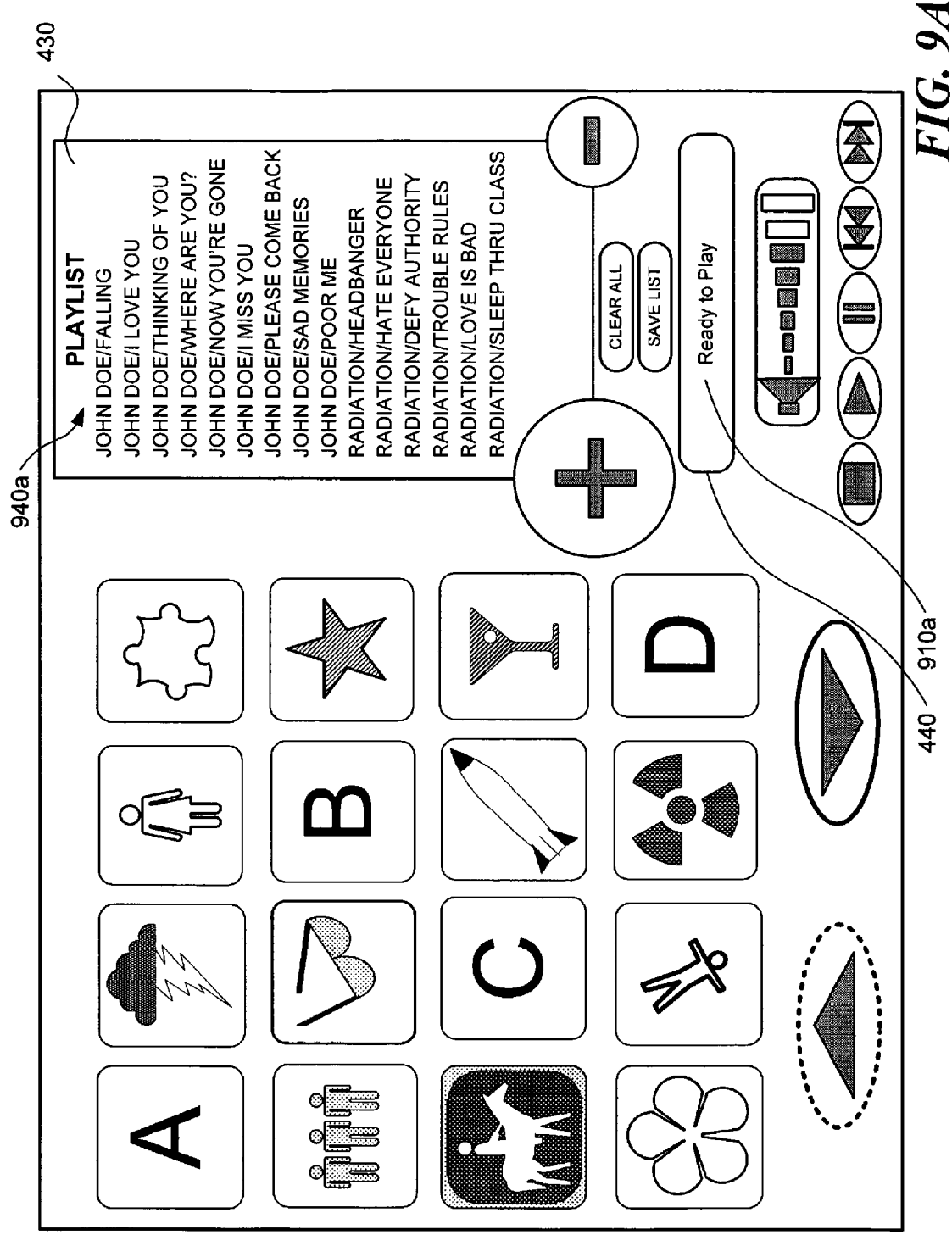
Figure 10:
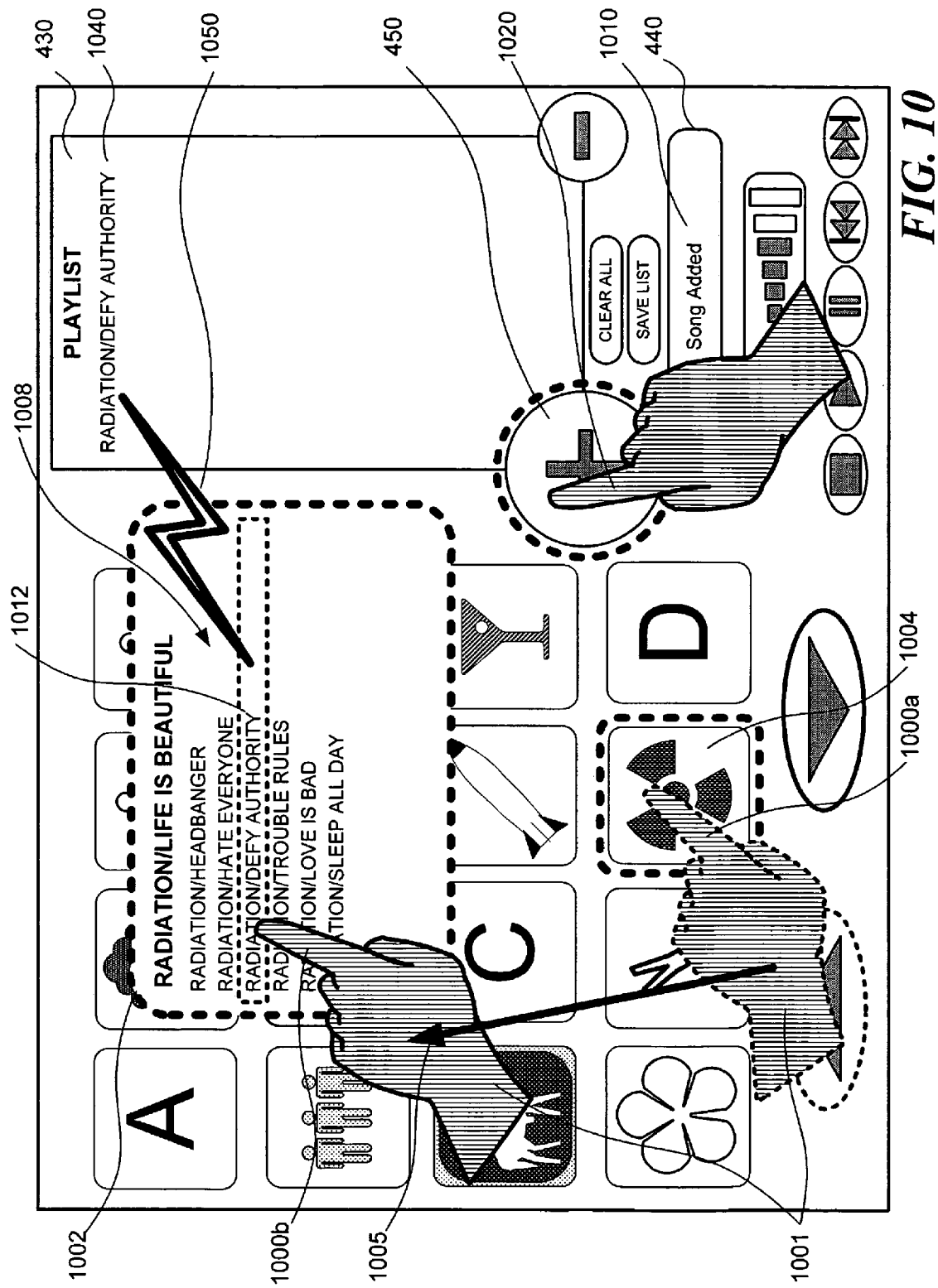
FIG. 10 is a screen image of an embodiment of the present invention being used to provide help to a user.
Figure 11A:
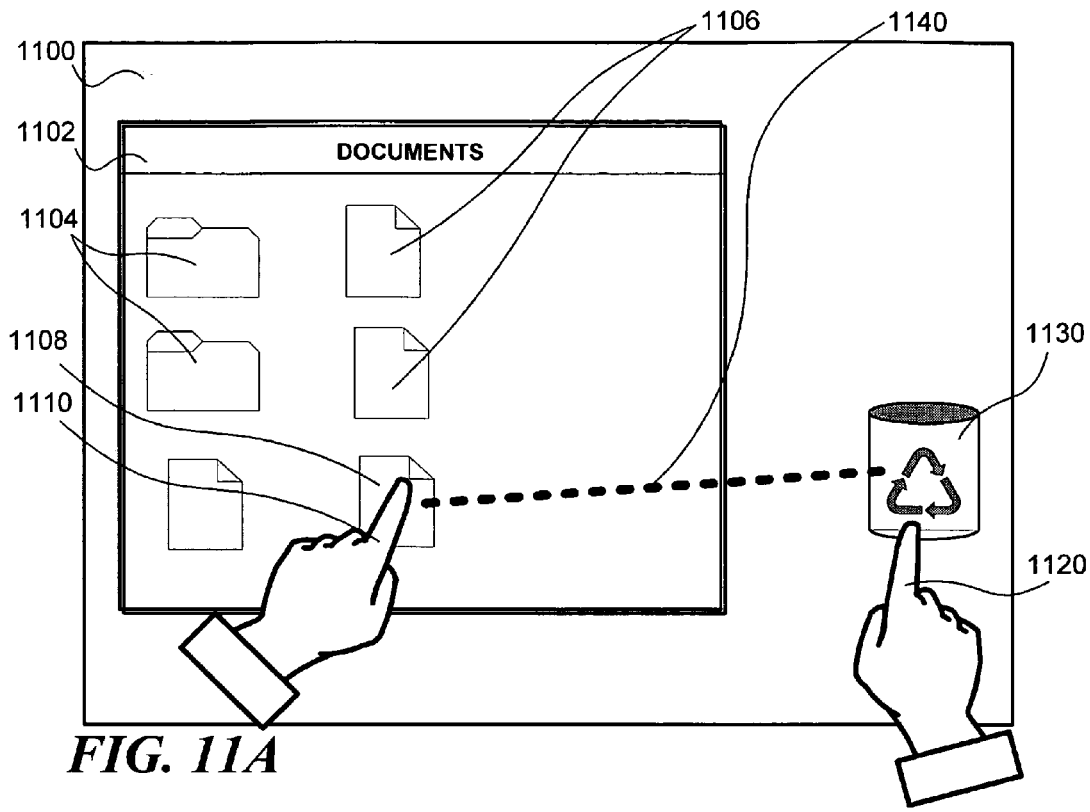
FIGS. 11A-11B and 12A-12B are screen images of additional applications usable with embodiments of the present invention to receive user input and provide feedback to a user regarding that input.
Figure 11B:
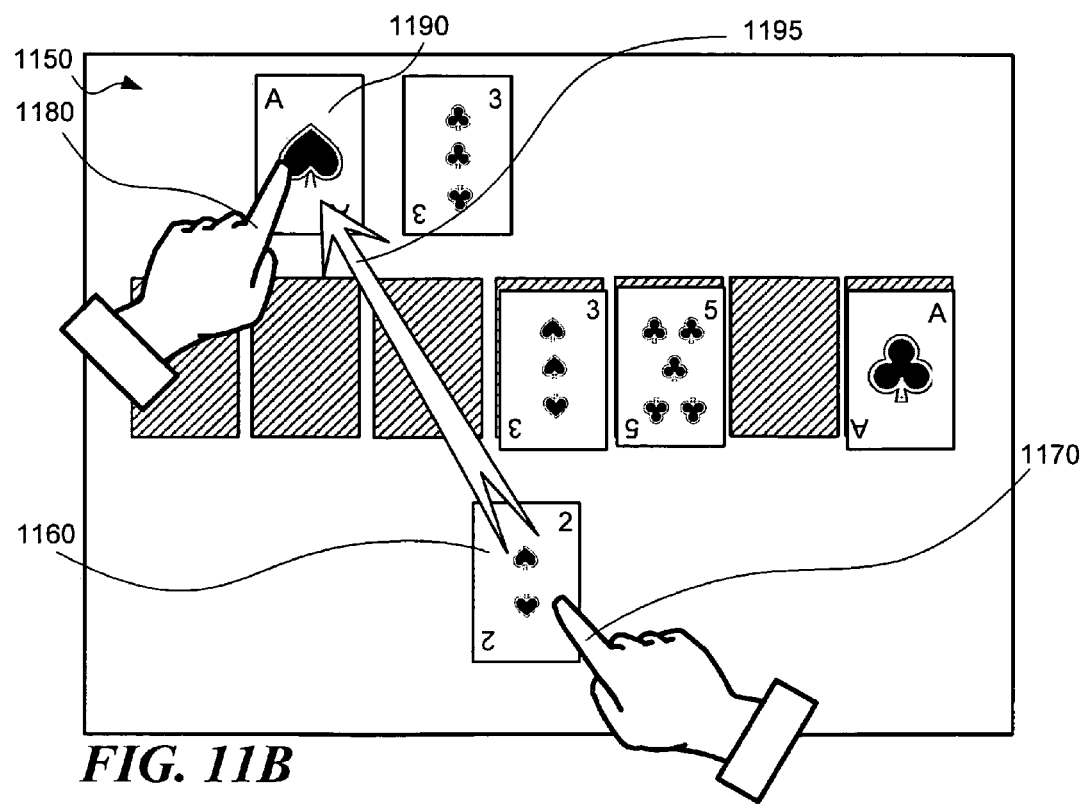

In FIGS. 5A-5E, 6A-6C, 7A-7D, 8A-8C, and 9A-9E, operation of an embodiment of the music player application on interactive display surface 64a (FIGS. 2-4) is illustrated, while in FIGS. 11A-11B, other applications are similarly illustrated being executed on interactive display surface 64a. FIG. 10 illustrates a help facility using an embodiment of the present invention to provide user instructions. In each case, a user manipulates the application by placing the user's hands adjacent to interactive display surface 64a, and moving the user's hands as described. As noted above, interactive display surface 64a permits simultaneous inputs to be detected for use by a computing system from multiple sources, such as touch object 76a and hover object 76b. Accordingly, such an interactive display surface interface is well-suited for use with embodiments of the present invention. However, it also should be appreciated that embodiments of the present invention can be used with other systems besides interactive display surface 64a, and with systems where only a single input is registrable at a single time. It also should be appreciated that particular sequences of steps and optional features are shown in FIGS. 5A-5E, 6A-6C, 7A-7D, 8A-8C, and 9A-9E for adding and removing songs from playlist 430, but these sequences and features are included for purpose of illustration, and do not limit the scope of the described embodiments of the present invention.

Adding All Songs from an Album Using Connecting User Interface

Figure 5A:
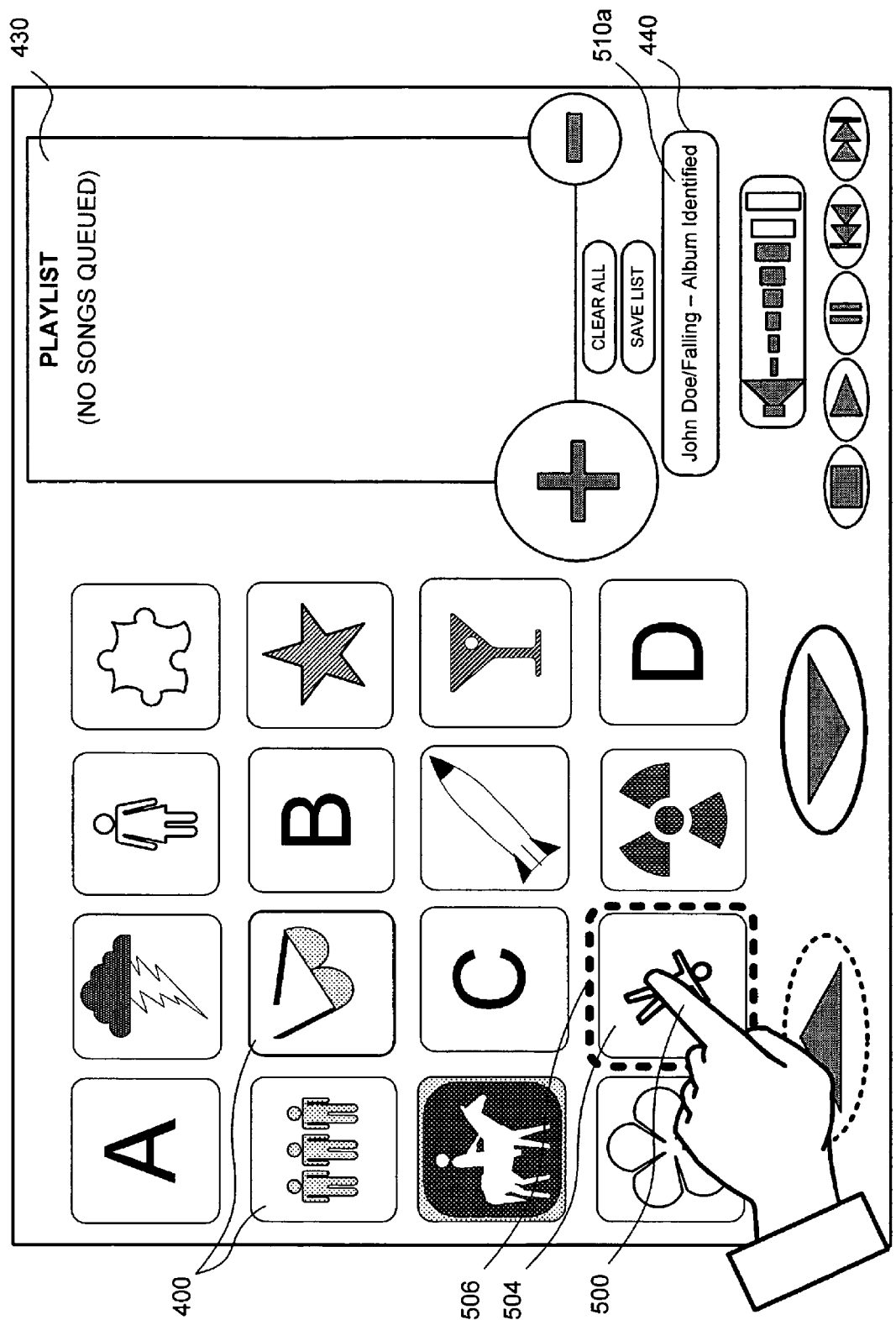

As shown in FIG. 5A, no songs have yet been added to playlist 430. However, the user begins the process of adding songs to playlist 430 by employing a left index finger 500 (or any other digit) to select chosen album cover 504 from among the displayed album covers. To provide corroborative feedback, a selection indicator 506 optionally appears around chosen album cover 504. Optionally, status bar 440 shows an album identification message 510a indicating that the user has thus identified an album "John Doe/Falling," which is a first step in adding songs from the album represented by chosen album cover 504 to playlist 430.

Figure 5B:
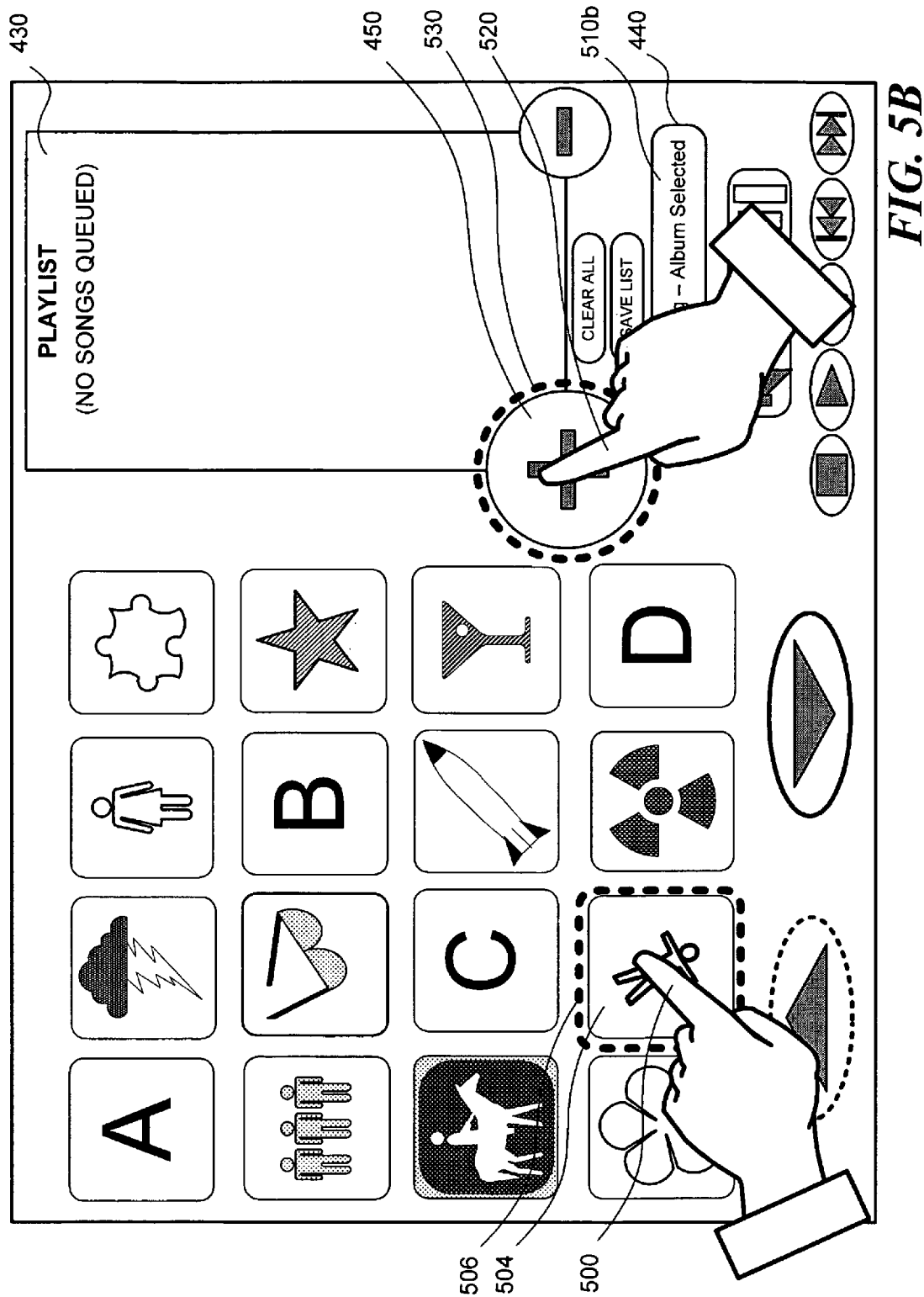

In FIG. 5B, while the user continues to hold left index finger 500 over chosen album cover 504, the user places a right index finger 520 over add button 450. (In the following discussion, it will be clearly understood that the reference to a specific digit of a user's hand is not intended to be limiting, since any digit of either hand may be employed to make a selection or other control input. In addition, the input is not limited to actions made with a digit of the user's hands, since other objects can alternatively be manipulated by a user to make a selection or an input.) To indicate that the user has positioned right index finger 520 over add button 450, add indicator 530 appears around add button 450, in a manner similar to that in which selection indicator 506 appeared around chosen album cover 504. By selecting this combination of elements, i.e., by pressing chosen album cover 504 and add button 430 with index fingers 500 and 520, respectively, the user has selectively added songs from the album represented by chosen album cover 504 to playlist 430. Status bar 440 now shows an album selected message 510b, indicating that the user has chosen to add these songs to playlist 430.

Figure 5C:
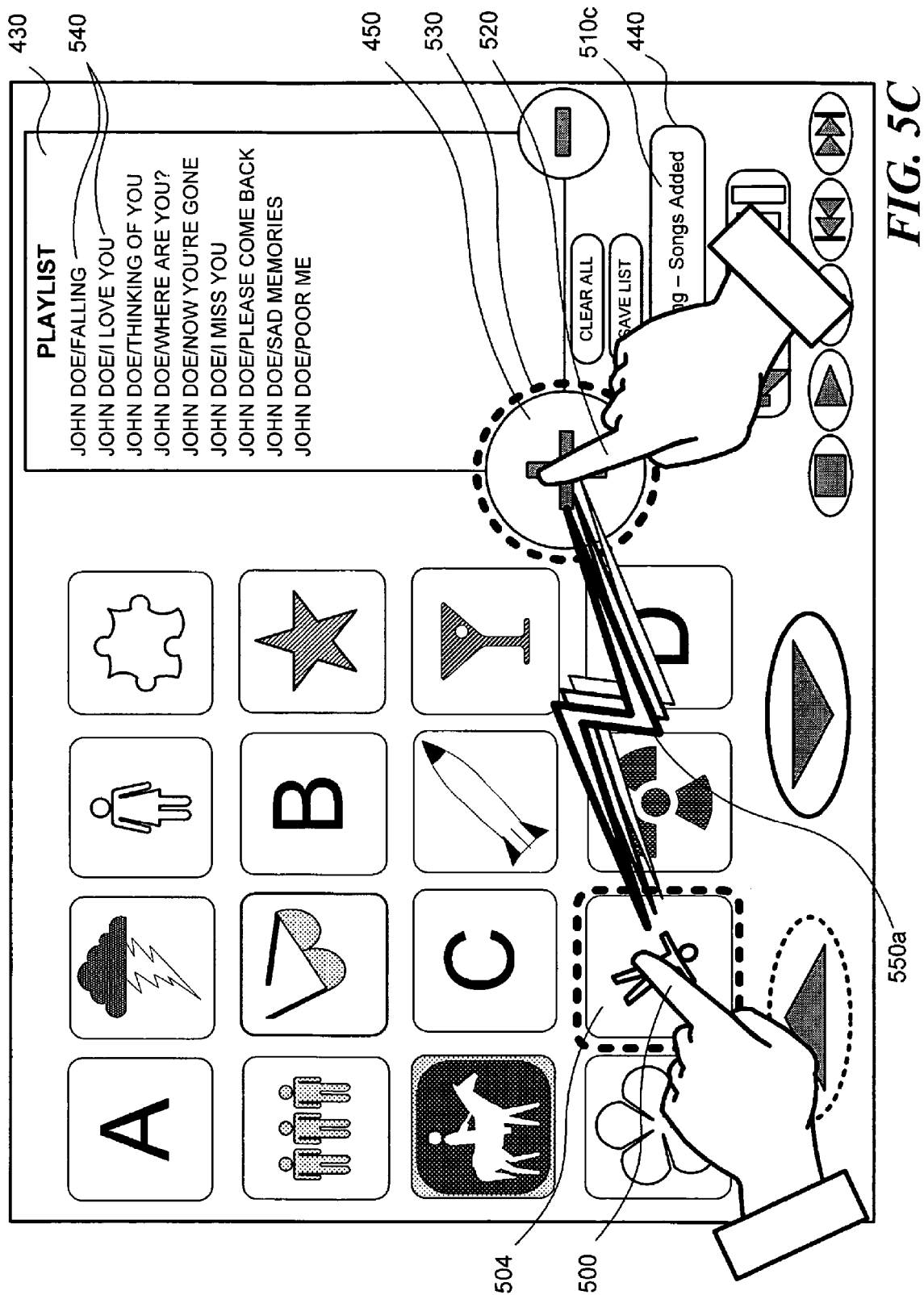

FIG. 5C shows an embodiment of a connecting user interface to further highlight and confirm for the user, the result of the user's actions. Appearing a moment after the screen image shown in FIG. 5B, connection indicator 550a shows a connection between chosen album cover 504 that was selected with user's left index finger 500 and add button 450, which was chosen with user's right index finger 520. Connection indicator 550a is a three-tiered lightning bolt which, in a preferred embodiment, actually appears as an animated lightning strike between chosen album cover 504 and add button 450. Such an animation serves to make the application visually interesting, as well as making visual indicator 550a very apparent, to clearly confirm the user's actions in adding songs associated with chosen album cover 504 to playlist 430. Connection indicator 550a may be used in addition to or instead of selection indicator 506 and add indicator 530 to highlight the user's selections. As also shown in FIG. 5C, in status bar 440, a songs added message 510c is now shown to confirm that songs associated with chosen album cover 504 have been added to playlist 430 as a result of the user's placement of left index finger 500 and right index finger 520. Also, song titles 540 associated with chosen album cover 504 are added to playlist 430.

It should be noted that images presented in screen images of FIGS. 5B and 5C need not be generated sequentially, and not all the images may be presented. For example, the user placing right index finger 520 over add button 450 may result in immediate generation of connecting indicator 550a, with or without selection indicator 506 and/or add indicator 530 appearing.

Figure 5D:
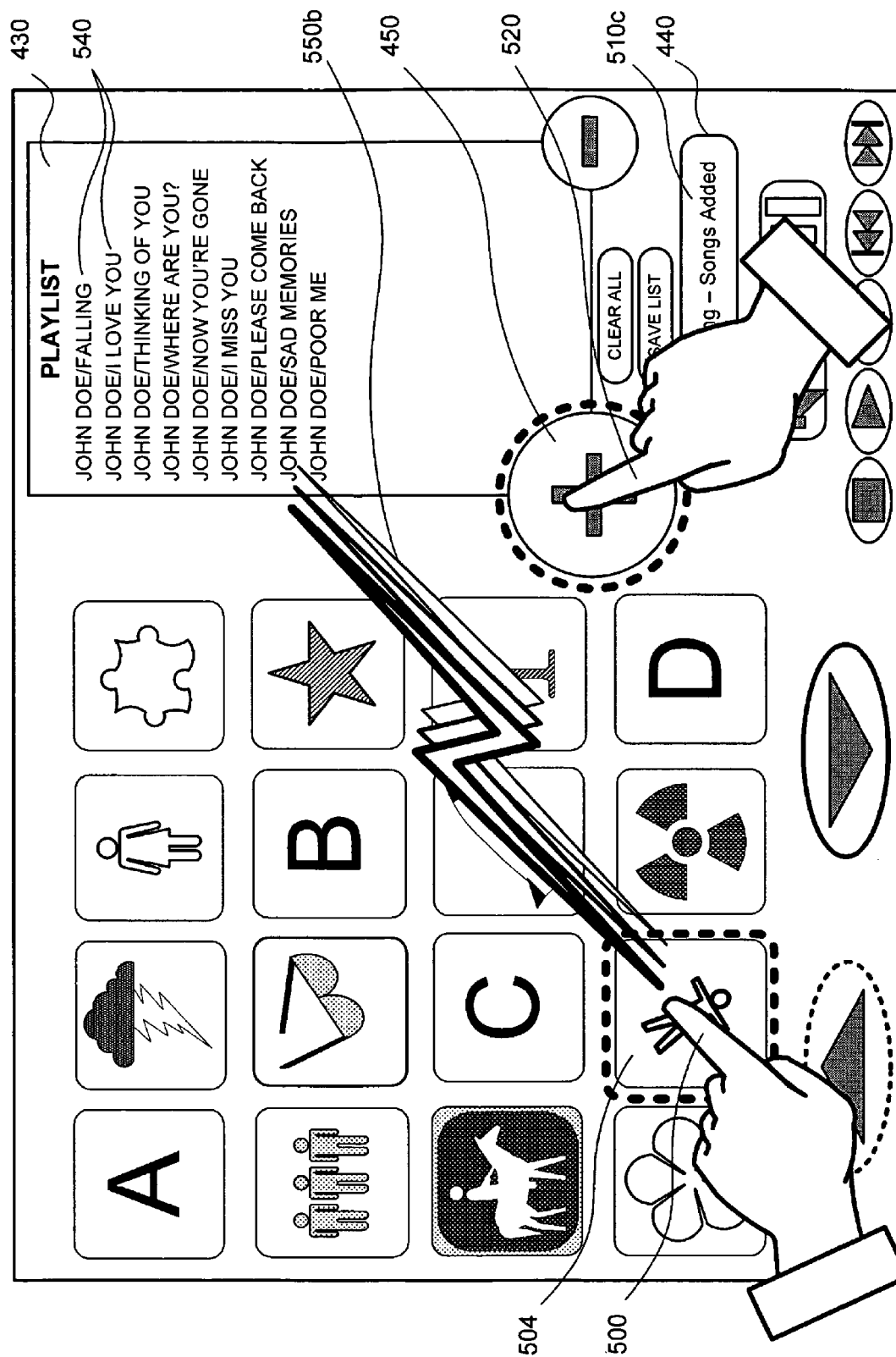

FIG. 5D shows another embodiment of the connecting user interface. In FIG. 5D, once again, by placing left index finger 500 on chosen album cover 504 and right index finger 520 on add button 430, the user has caused songs with song titles 540 to be added to playlist 430. Again, songs added message 510c is presented in the status bar to confirm that song titles 540 have been added to playlist 430. However, in the embodiment of the invention shown in FIG. 5D, connection indicator 550b displays a connection between chosen album cover 504 and playlist 430, instead of showing a connection between chosen album cover 504 and add button 430, as illustrated in FIG. 5C.

The connecting user interface can confirm the function initiated by the user in a number of ways. In the embodiment shown in FIG. 5C, connection indicator 550a indicates a connection between each of the plurality of elements identified, which in the case of FIG. 5C, included chosen album cover 504 and add button 450. More generally therefore, connection indicator 550a shows a connection between an operand, in the form of chosen album cover 504, and an operator, add button 450. On the other hand, in the embodiment shown in FIG. 5D, connection indicator 550b indicates a connection between one of the elements selected, chosen album cover 504, and playlist 430. Thus, in showing a connection between chosen album cover 504 and playlist 430, connection indicator 550b shows a connection between an element identified by the user and a portion of the display associated with the function indicated by the user's actions. In other words, connection indicator 550b can be considered as highlighting a consequence of the user's actions rather than the actions themselves, as is the case with connection indicator 550a of FIG. 5C. Alternatively, connection indicators 550a and 550b can be suitably presented between chosen album cover 504 and both playlist 430 and add button 450, simultaneously, sequentially, or in another fashion to confirm both actions and consequences. In any case, connection indicators 550a and 550b highlight and confirm a function initiated by the user.

Figure 5E:
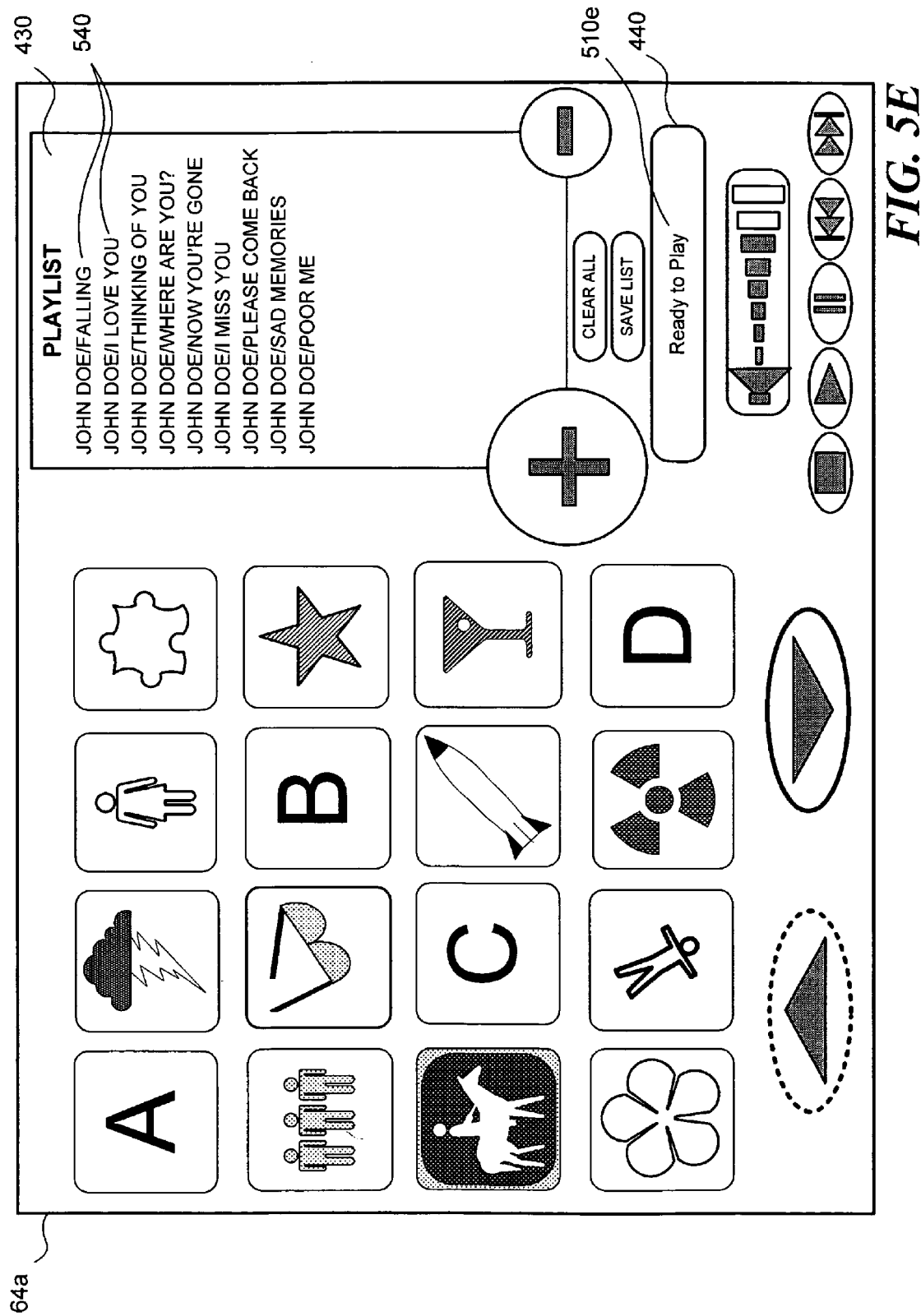

As shown in FIG. 5E, once the user removes left index finger 500 and right index finger 520 (not shown) from interactive display surface 64a, selection indicator 506 (FIGS. 5A-5D), add indicator 530 (FIGS. 5B-5D), connection indicator 550a (FIG. 5C), and connection indicator 550b (FIG. 5D) no longer appear on interactive display surface 64a. Nonetheless, song titles 540, which were added to playlist 430 by virtue of the user's actions, are displayed, along with ready to play message 510e, which now appears in status bar 440.

According to another embodiment of the present invention, option indicators also are provided to assist a user in knowing what actions may be available based on the user's current actions. For example, similar to the example shown in FIG. 5B, as shown in FIG. 5F, the user has placed left index finger 500 (or another digit or object) over chosen album cover 504 to indicate the user desires to add songs associated with chosen album cover 504. In FIG. 5F, as in FIG. 5B, to provide corroborative feedback of the selection to the user, selection indicator 506 optionally appears around chosen album cover 504, and status bar 440 optionally shows an album selected message 510a indicating that the user has selected an album cover 504. Selection indicator 506 and album selected message 510a, however, only provide corroboration to the user about what the user has indicated thus far.

To provide the user with an indication of what actions are available or needed to, for example, adds songs to playlist 430, option indicators also may be provided. In FIG. 5F, once the user has selected chosen album cover 504, add option indicator 560 appears around add button 450. Option indicator 560 appears around add button 450 to indicate to the user that, to complete the addition of songs associated with chosen album cover 504 to playlist 430, user should press add button 450.

Option indicators may be context-sensitive. Thus, for example, as is described below in connection with FIGS. 9A-9G, if the user were to identify songs already added to playlist 430, an option indicator may be displayed around remove button 460. Also, as will be appreciated in connection with the following description, if user first should choose add button 450, option indicators may be displayed around album covers associated with songs not yet added to playlist 430 to indicate what options are available to the user.

Figure 5G:
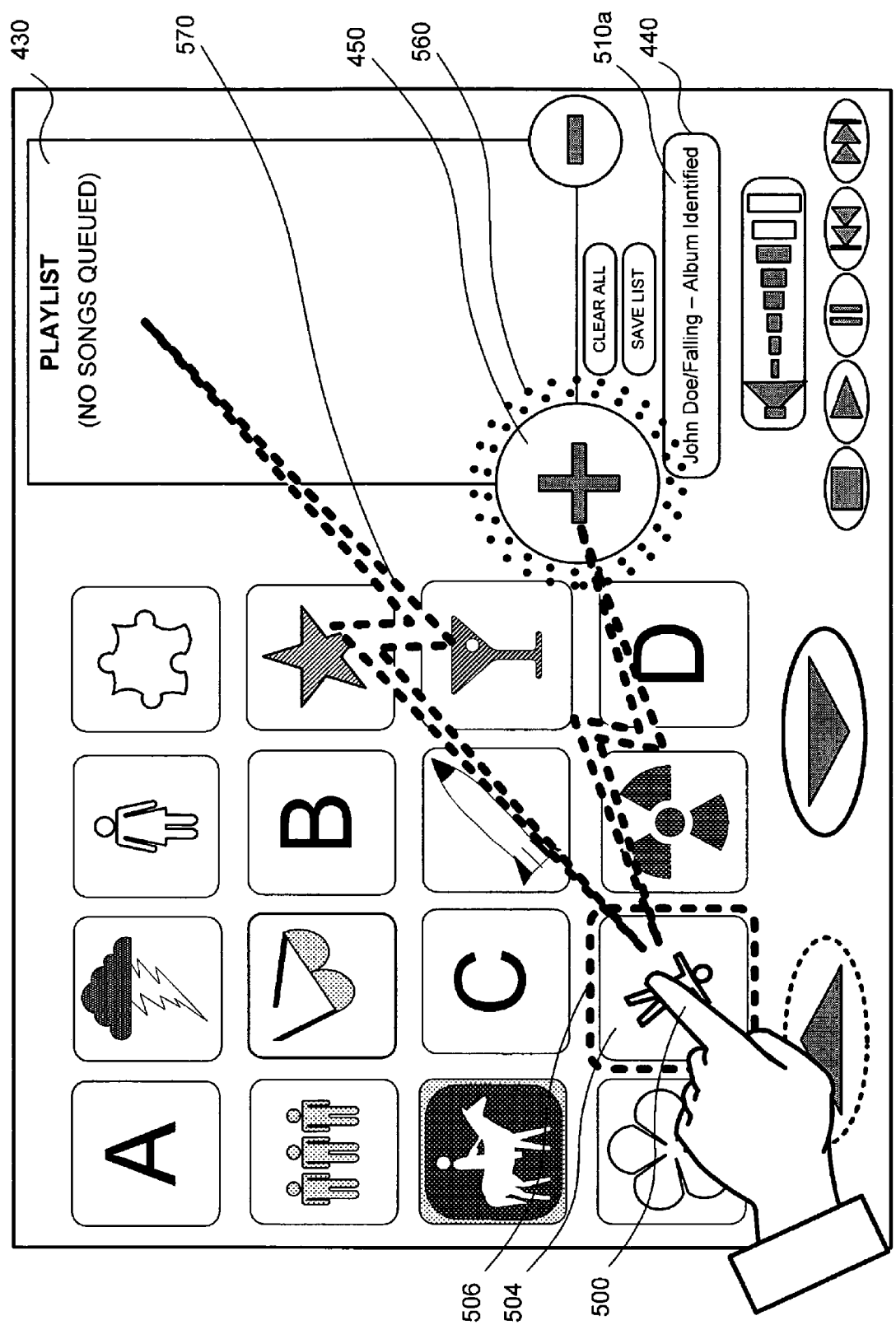

Further, in addition to option indicator 560 identifying a next action available to the user, result indicator 570 may be provided to show what actions will result from the user selecting the option represented by option indicator 560. As shown in FIG. 5G, once user places left index finger 500 on chosen album cover 504, selection indicator 506 appears to show that user has chosen selected album cover, album identified message 510a appears in status bar 440, and option indicator 560 appears around add button 450. In addition, as shown in FIG. 5G, result indicator 570 appears between chosen album cover 504 and playlist 430. Thus, in the embodiment of the invention shown in FIG. 5G, provision of option indicator 560 and result indicator 570 makes clear to user what the user might do next and what will be the result of that action.

Figure 5H:
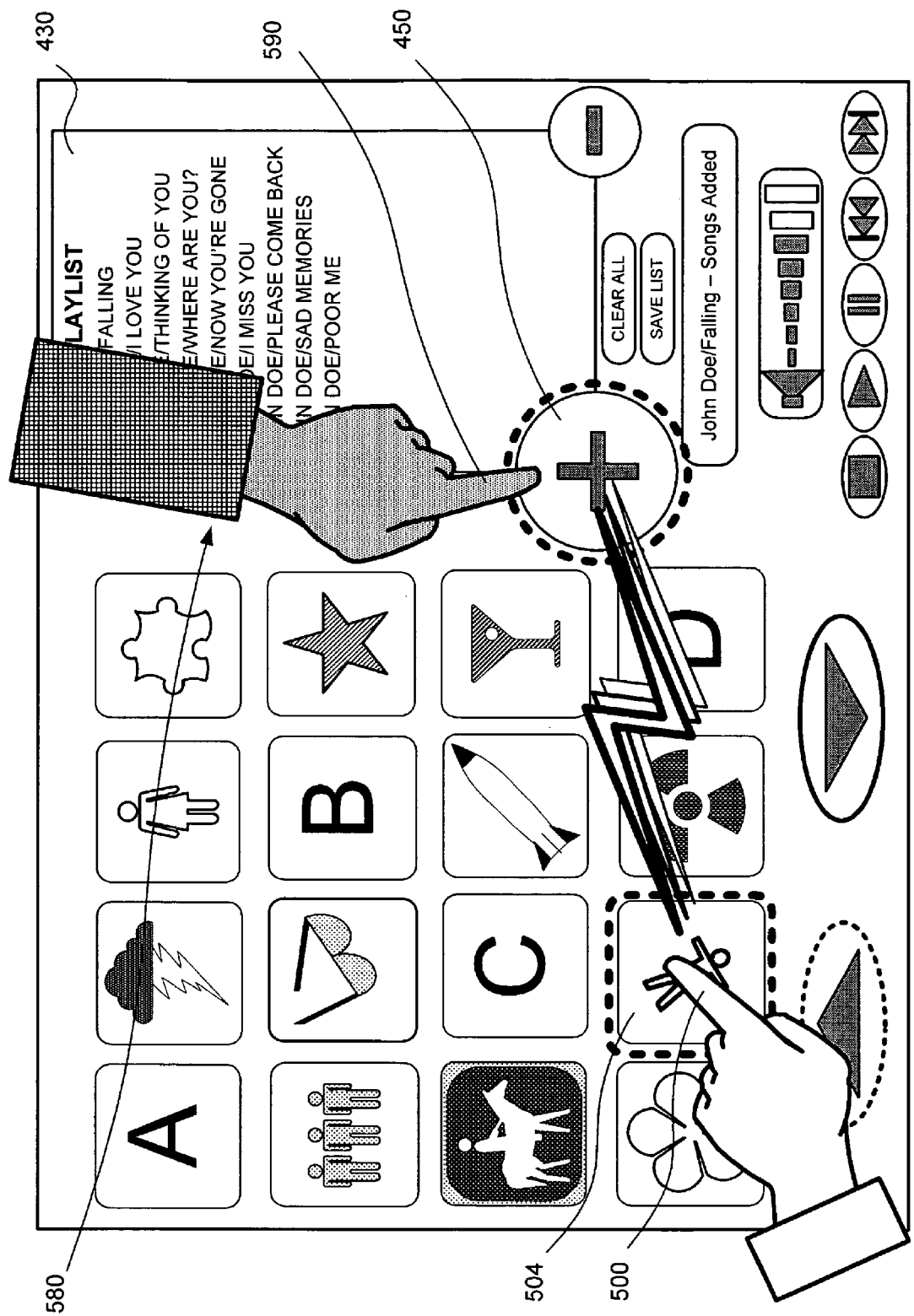

In any of the cases illustrated above in connection with FIGS. 5A-5G or described below, it should be noted that a user is not limited to identifying selections with any particular finger. A user may identify displayed objects or indicate choice using a wide range of physical objects that might be detected by interactive systems such as those described in FIGS. 2 and 3. Users can use other parts of their hands, other parts of their bodies, or use inanimate objects. Moreover, as shown in FIG. 5H, more than one user may cooperate in using an application. As shown in FIG. 5H, for example, a first user places left index finger 500 on chosen album cover 504 while a second user 580 places a second left index finger 590 on add button 450 to cause songs to be added to playlist 430. In sum, it should be appreciated that embodiments of the present invention are not limited to using particular fingers or other objects, and are not limited to use by only a single user at any one time.

Adding Songs from Multiple Albums Using Connecting User Interface

Figure 6A:
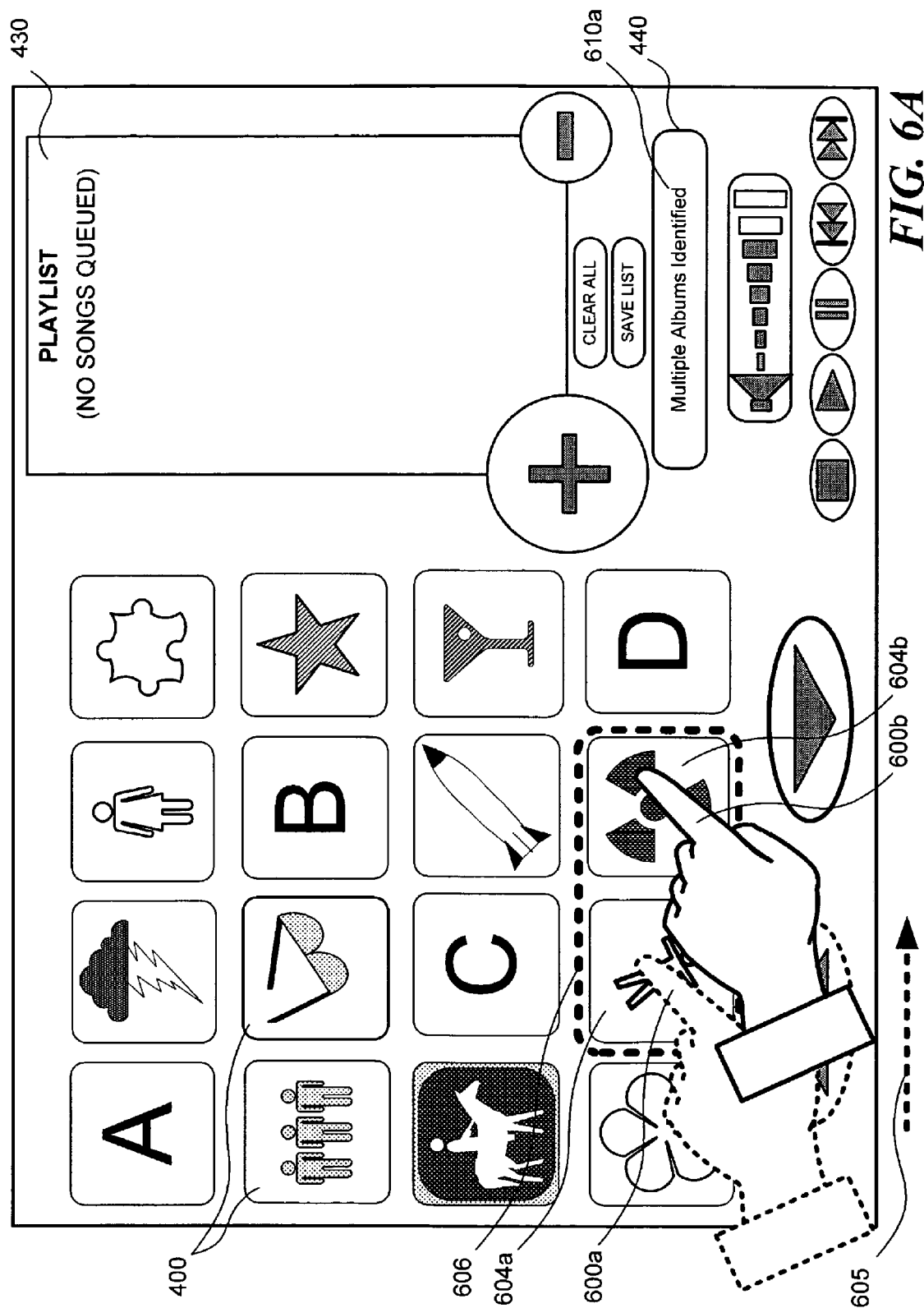

FIG. 6A shows how an embodiment of the connecting user interface may be employed to identify a plurality of operands to initiate a function represented by an operator and confirm the function selected with a visual indicator. FIG. 6A shows a first position 600a of the user's left index finger as placed on first chosen album cover 604a. After pointing to chosen album cover 504 with the left index finger at first position 600a, the user slides the left index finger in the direction of an arrow 605, from the first position to a second position 600b of the left index finger, to identify a second chosen album cover 604b. The purpose of this movement, as indicated by a multiple albums identified message 610a in status bar 440, is to select songs associated with multiple album covers 604a and 604b from among album covers 400. A selection indicator 606 appears as an outline surrounding all, or in this case, both, of the albums identified, and a multiple albums selected message 610a appears in status bar 440. However, as shown in playlist 430, no songs have yet been queued for playback.

In FIG. 6B, the user places right index finger 620 over add button 450. Placement of right index finger 620 results in a number of displayed changes, including song titles 640 associated with both chosen album covers 604a and 604b being added to playlist 430, add indicator 530 appearing around add button 450, and a songs added message 610b appearing in status bar 440. Most notably, connection indicators 650a and 650b are displayed between add button 450 and first chosen album cover 604a and second chosen album cover 604b, respectively. In identifying multiple album covers 604a and 604b along with identifying add button 450, the user has indicated an intent to add song titles associated with both album covers 604*a* and 604*b* to playlist 430. Thus, to appropriately confirm the additions to playlist 430 from multiple sources 604*a* and 604*b*, multiple connection indicators 650*a* and 650*b* are presented, visually confirming the user's actions. As described above in connection with FIG. 5D, connection indicators 650*a* and 650*b* could have been presented to indicate, for example, a connection between chosen album covers 604*a* and 604*b* and playlist 430, instead of, or in addition to, showing a connection with add button 450.

Figure 6C:
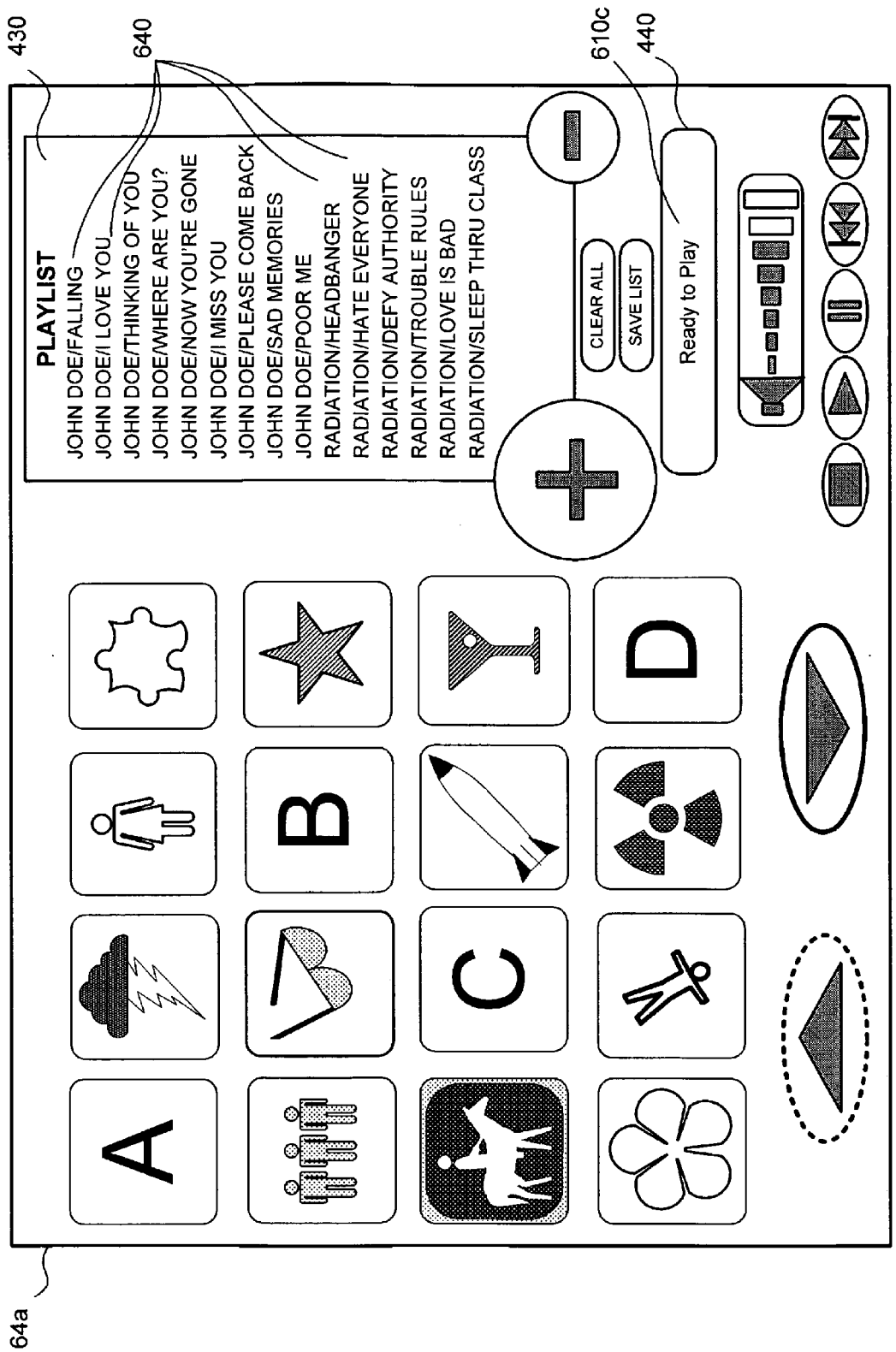

As indicated in FIG. 6C, once the user removes left index finger 600*a*-600*b* and right index finger 620 from interactive display surface 64*a*, song titles 640 remain in the playlist 430, and status bar 440 presents a "ready to play message" 610*c*. Optionally, the selection of the songs associated with one or more album covers may cause the songs to begin playing automatically, either as an application default, or as a result of a user options setting.

Figure 6D:
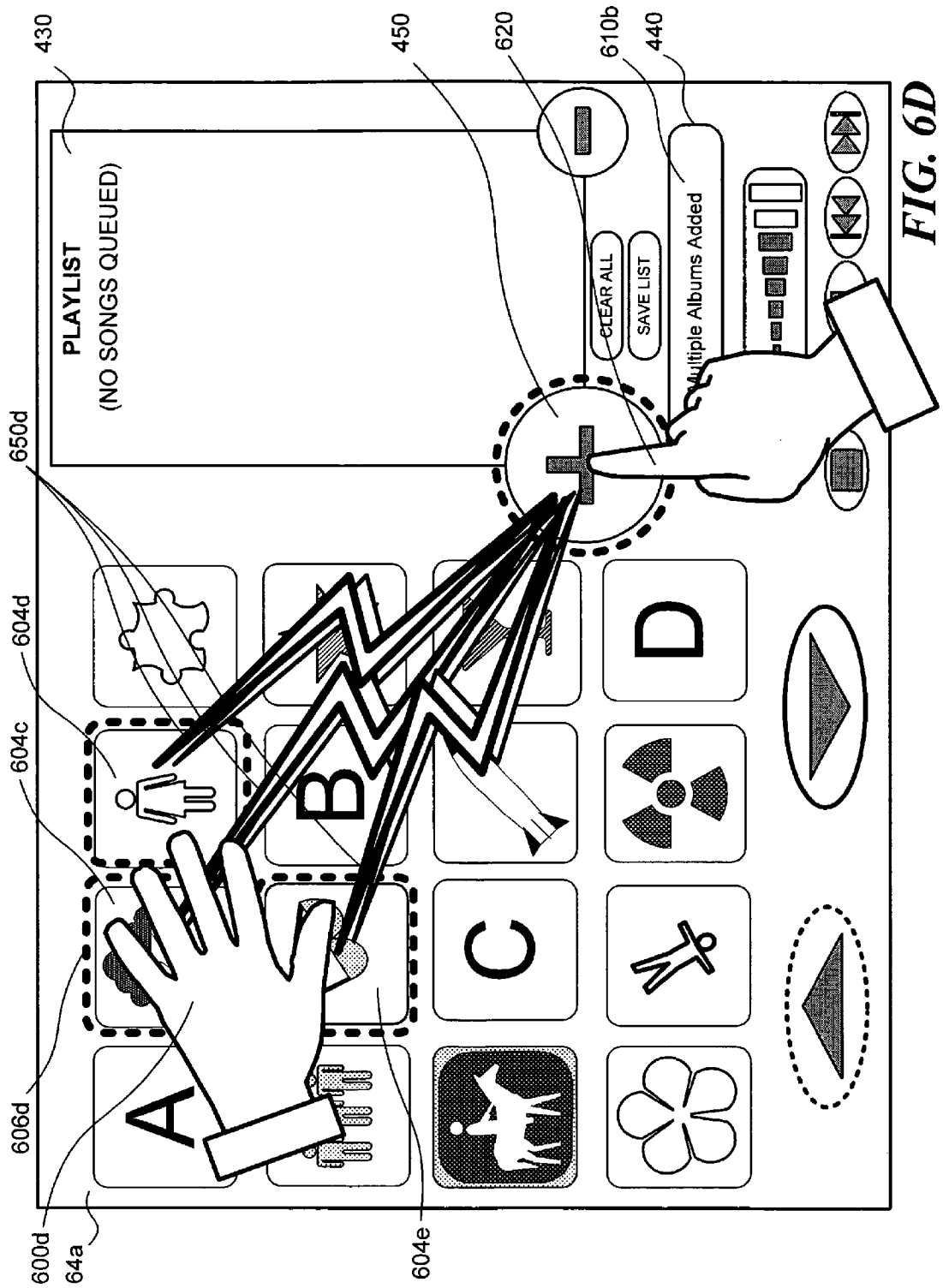

It should also be noted that embodiments of the present invention do not restrict user to selecting displayed objects one at a time. Users can make multiple selections at one time, as shown in FIG. 6D. In FIG. 6D, user places left hand 600*d* onto display surface 64*a* such that various parts of left hand 600*d* identify chosen album covers 604*c*, 604*d*, and 604*e* all at one time. Thus, when user places right index finger 620 over add button 450, songs associated with album covers 604*c*-604*e* all will be added to playlist 430, as indicated by appearance of multiple albums added message 610*b* in status bar 440. Furthermore, the user's choice to add chosen album covers 404*c*-604*e* to playlist 430 is further indicated by multiple connection indicators 650*d* appearing between chosen album covers 604*c*-604*e* and playlist 430.

Adding Selected Songs from an Album Using Connecting User Interface

Figure 7A:
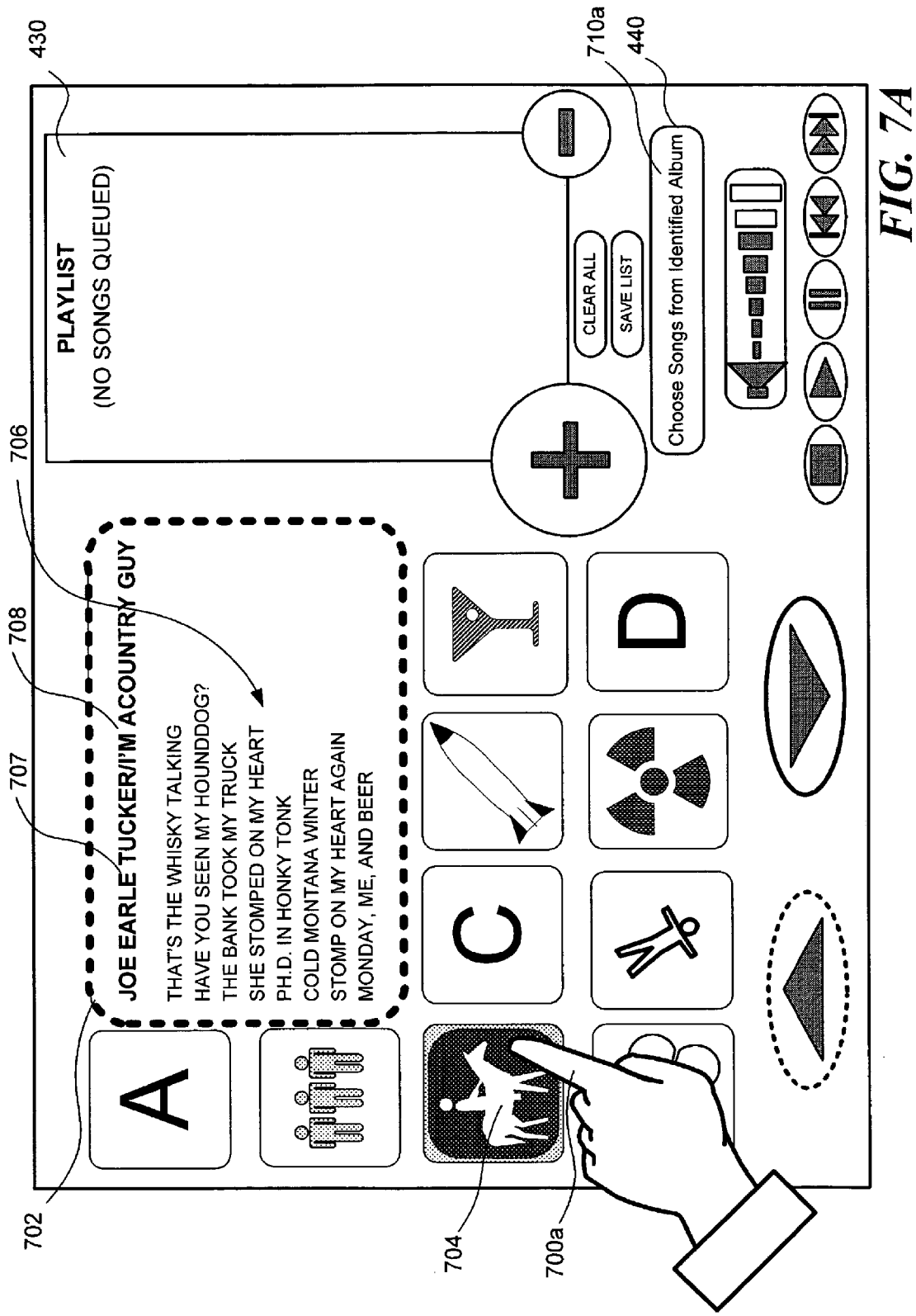

FIG. 7A shows how an embodiment of the connecting user interface may be used to identify selected songs from an album to be added to playlist 430 instead of adding all songs associated with a chosen album cover 704. In this embodiment, the software responds to the user placing left index finger at a first position 700*a* on chosen album cover 704, and holding the left index finger in that first position for a prescribed interval, by displaying song window 702, which presents to the user a list of song titles 706 associated with selected album cover 704. Song window 702 also displays an artist name 707 and album title, if applicable. Also, in response to the user holding the left index finger over the chosen album cover to cause song window 702 to be displayed, status bar 440 presents a choose songs message 710*a*, which informs the user of the current status of the application and/or what the application expects at this point.

Figure 7B:
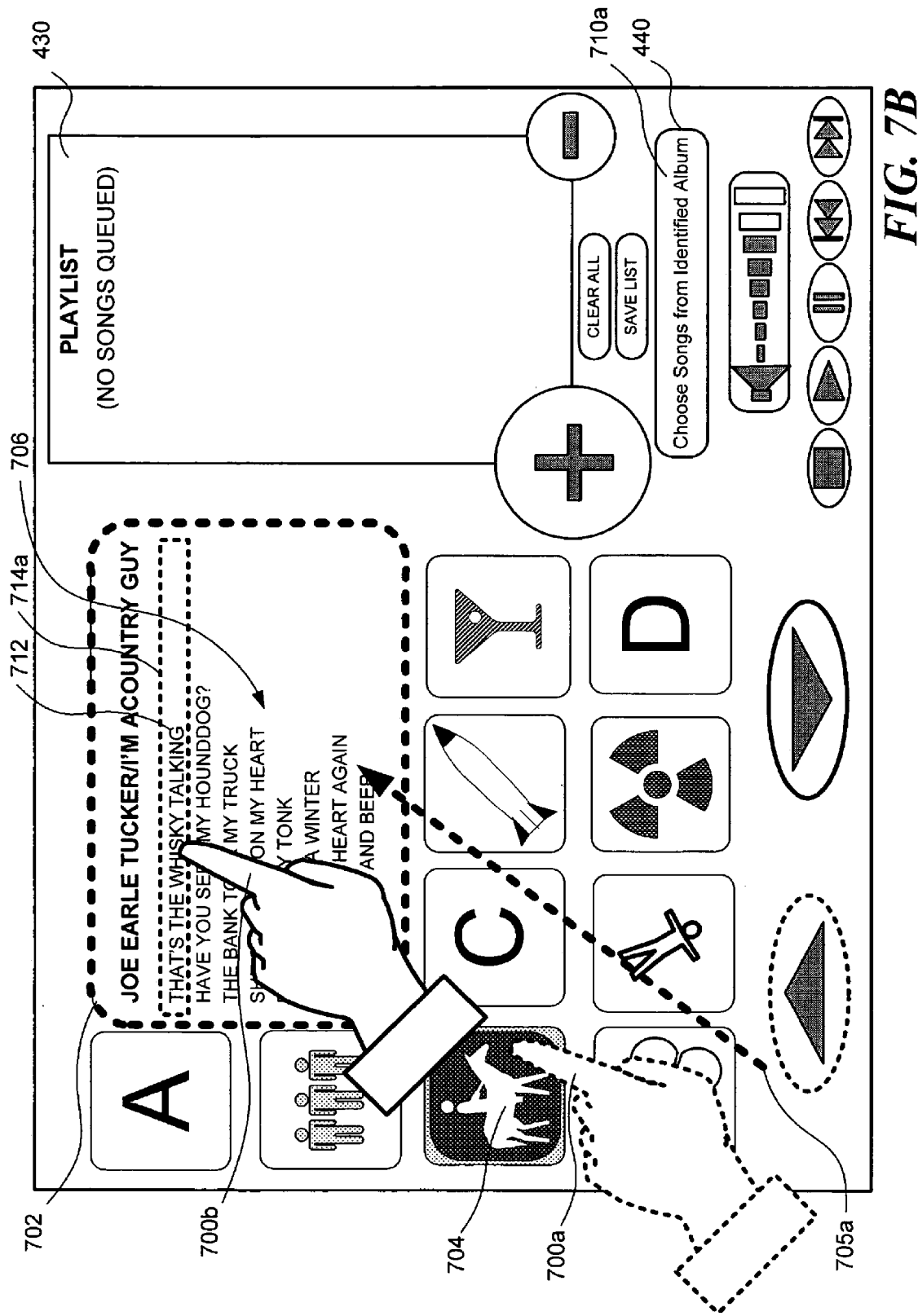

As shown in FIG. 7B, after song window 702 appears, the user can select one or more songs from list of song titles 706 by sliding the left index finger from its first position 700*a*, in the direction of an arrow 705, to a second position 700*b* of the left index finger, where the left index finger is over a chosen song 712. Having identified chosen song 712 with second position 700*b* of the left index finger, a song selection indicator 714 may appear around chosen song 712 to provide visual feedback to the user. It should be noted that no songs have yet been added to playlist 430, and status bar 440 continues to display a choose songs message 710*a*.

Figure 7C:
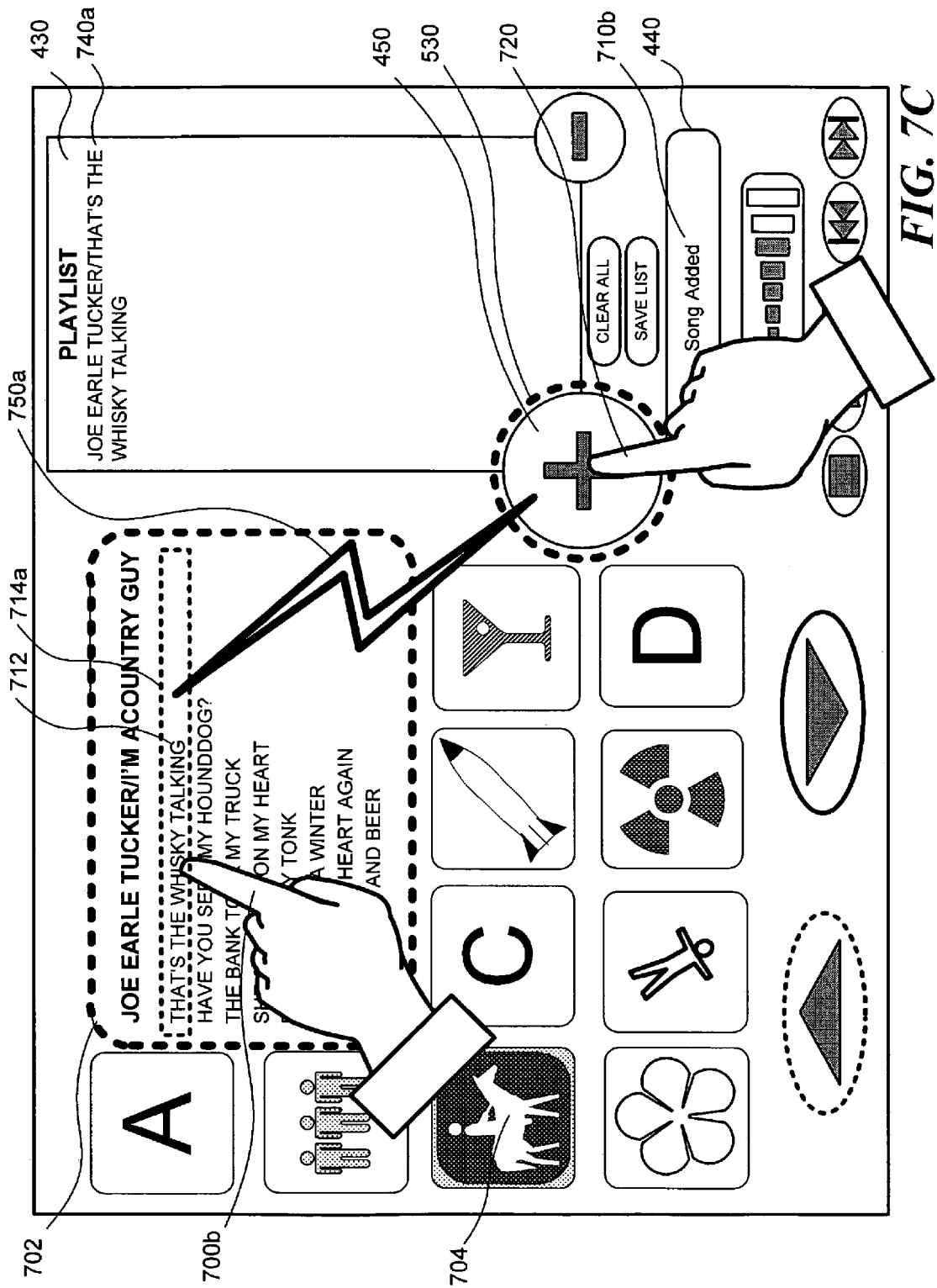

As shown in FIG. 7C, chosen song 712 is added to playlist 430 through another identification resulting from the user placing a right index finger 720 on add button 450. As in the examples discussed above, add indicator 530 is optionally shown to confirm the user's placement of right index finger 720 on add button 450. Furthermore, a connection indicator 750*a* appears to connect chosen song 712 with add button 450, and the chosen song is added to the list of selected songs 740*a*, in playlist 430. Status bar 440 then shows a song added message 710*b*, to further confirm the user's choice.

It should be noted that connection indicator 750*a* could appear between chosen song 712 and playlist 430, between chosen album cover 704 and playlist 430, or to indicate connections between other displayed elements to visually signal the results of user's actions. It also should be noted that connection indicator 750*a* differs from connection indicators 550*a* (FIG. 5C), 550*b* (FIG. 5D), 650*a* and 650*b* (FIG. 6B). Connection indicators 550*a*, 550*b*, 650, and 650*b*, which were used to add all songs associated with album covers, are represented with triple-lightning bolts, whereas connection indicator 750*a* is a single lightning bolt. The differences between the types of connection indicators can thus be used to visually signify distinctions between even closely related functions, to provide meaningful confirmation to the user.

Figure 7D:
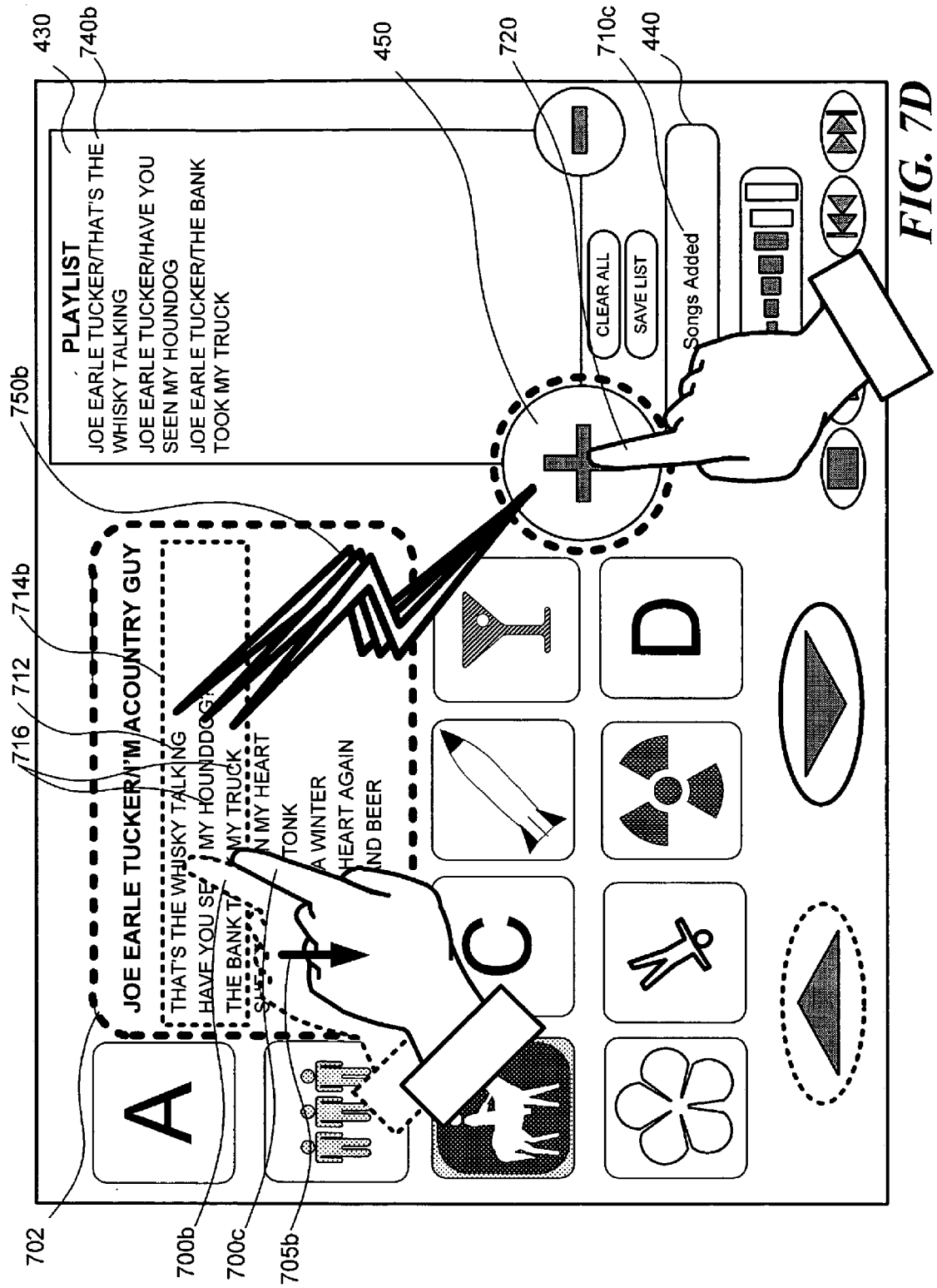

As shown in FIG. 7D, just as a user is able to add all songs from multiple selected album covers, as shown in FIGS. 6B and 6C by continuing an identification, a user can also add multiple songs from chosen album 704. By sliding the user's hand in the direction of arrow 705*b* to move the left index finger from its second position 700*b* to a third position 700*c*, the user can identify additional songs 716 to be added to playlist 430, in addition to chosen song 712. An optional song selection indicator 714*b* expands to include additional chosen songs 716 along with chosen song 714. Playlist 430 is revised to include additional chosen songs 716, and song added message 710*b* in status bar 440 is changed to a songs added message 710*c*, to indicate that the multiple selections have been made. Furthermore, connection indicator 750*b* now includes multiple single lightning bolts connecting chosen song 712 and additional chosen songs 716 to add button 430. Again, changes in connection indicator 750*b* providing meaningful confirmation to the user by changing to signify that different functions are being performed.

Changing the Order of Identification Using Connecting User Interface

Because embodiments of the present invention are adaptable to present different connection indicators to indicate different user identifications and actions, connection indicators also can be changed to communicate different options or responses that are available when a user performs a task in a different sequence. More specifically, in the examples described in connection with FIGS. 5A-5E, 6A-6C, and 7A-7D, the sources of songs to be added to the playlist were identified first, and then the add operation was performed. In other words, first the operand or operands were identified, and then the operator was identified. The user could instead choose to first identify the operator, which may enable different functions and responses to be done, and the connection indicator is adaptable to communicate and confirm the different possibilities.

Figure 8A:
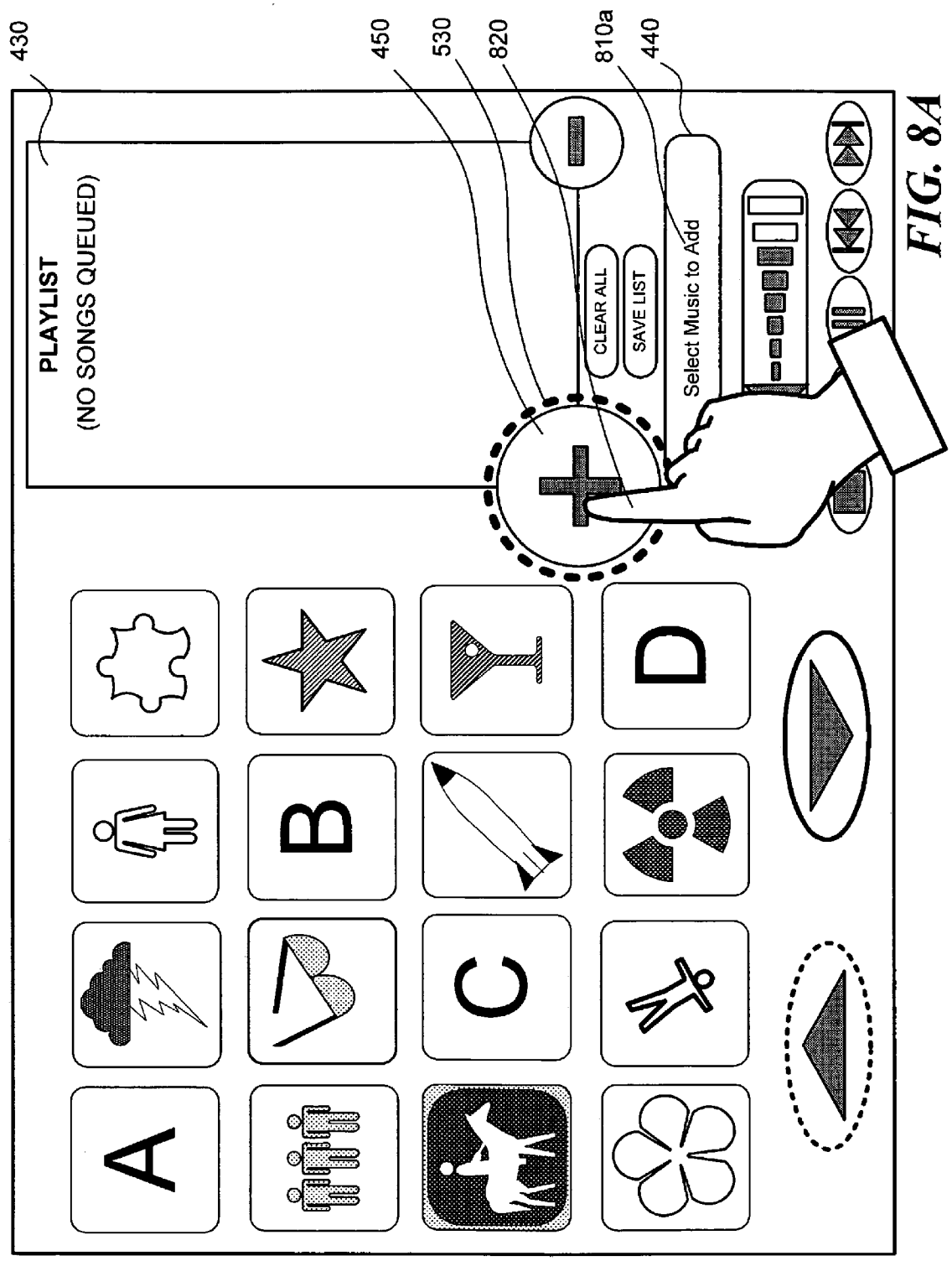

In FIG. 8A, a user places right index finger 820 on add button 450. The user has not yet selected any album covers or otherwise selected music. Add indicator 530 is presented around add button 450 to show that the user has placed right index finger 820 on add button, but as indicated by playlist 430, no songs have yet been queued. Status bar 440 presents a select music message 810*a*, inviting the user to select songs to be added to playlist 430.

Figure 8B:
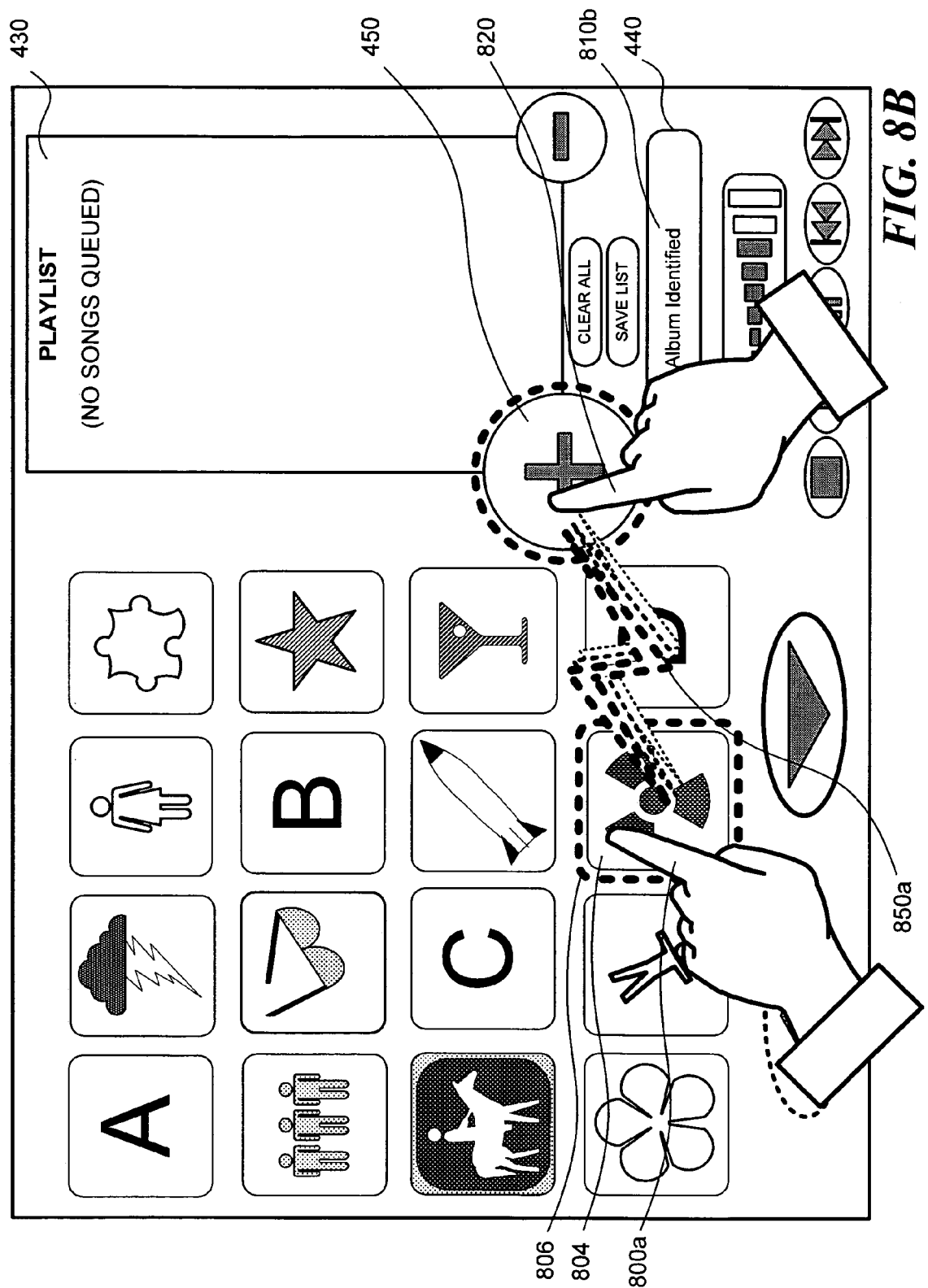

As shown in FIG. 8B, with the user's right index finger 820 still placed on add button 450, the user places left index finger 800*a* on a chosen album cover 804. A selection indicator 806 is presented around chosen album cover 804 to confirm the user's selection, and the user's selection is further confirmed in status bar 440 by an album identified message 810*b*. In accordance with this embodiment of the present invention, a connection indicator 850a is presented, showing a connection between add button 450 and chosen album cover 804.

Two points should be noted regarding FIG. 8B. First, as compared to connection indicators 550a (FIG. 5C), 550b (FIG. 5D), 650a and 650b (FIG. 6B), 750a (FIG. 7C), and 750b (FIG. 7D), connection indicator 850a has a different appearance to distinguish the effects of the user's action in choosing add indicator 450 first, before selecting chosen album cover 804. Second, more distinctly, although connection indicator 850a is presented to show a connection between add indicator 450 and the chosen album cover, no songs are yet added to playlist 430. In accordance with embodiments of the present invention, the addition of songs to playlist 430 and/or presentation of connection indicator 850a may be delayed, staggered, or otherwise sequenced to enable the user to determine if the user's actions are in accord with the user's intentions or to provide a desired feedback. Such delays and/or sequencing may be set as a program default and potentially, can be modified by the user.

Figure 8C:
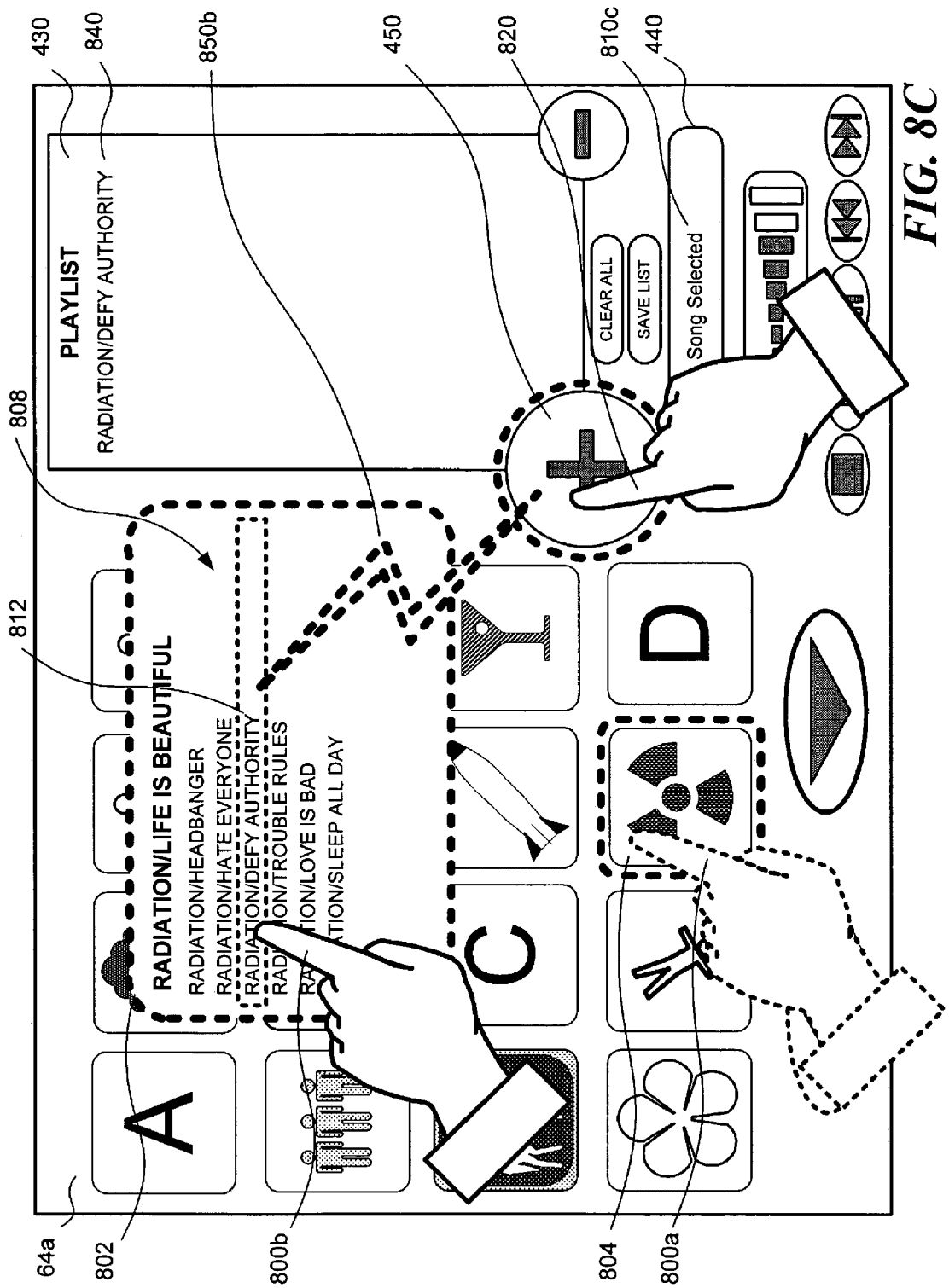

As shown in FIG. 8C, instead of all songs associated with selected album cover 804 being added to playlist 430, song window 802 opens to present a list of songs 808 on chosen album 804. By moving the user's hand from the initial position of the left index finger to a second position 800b, while right index finger 820 remains on add button 450, the user can identify a chosen song 812, causing it to be included in a list of song titles 840 that are added to playlist 430. Further, in the example of FIGS. 8A-8C where a user initiates song selection by first selecting add button 450 instead of chosen album cover 804, the user may select a song by moving the user's hand from a first position of left index finger 800a to a second position 800b—not by sliding the left index finger, but my lifting it from interactive display surface 64a and moving it directly to chosen song 812. Connection indicator 850b confirms the addition of chosen song 812 to playlist 430. Optionally, status bar 440 presents a song selected message 810c to further confirm the addition of chosen song 812 to list of song titles 840 in playlist 430. Thus, a user employing a different sequence of events can initiate different means for performing operations, and differently presented connection indicators 850a and 850b may be used to visually distinguish between the different means for performing operations.

Removing Songs Using Connecting User Interface

Embodiments of the connecting user interface may be used for functions other than adding songs to a playlist. For example, the connecting user interface can be employed to provide a visual confirmation of the removal of songs from a playlist. FIG. 9A shows an exemplary screen image in which a list of song titles 940a already has been added to playlist 430. Status bar 440 presents a ready to play message 910a, indicating a list of song titles 940a that is ready to play. However, before playing the list of songs, a user may decide to remove some of the songs from list of song titles 940a.

Figure 9B:
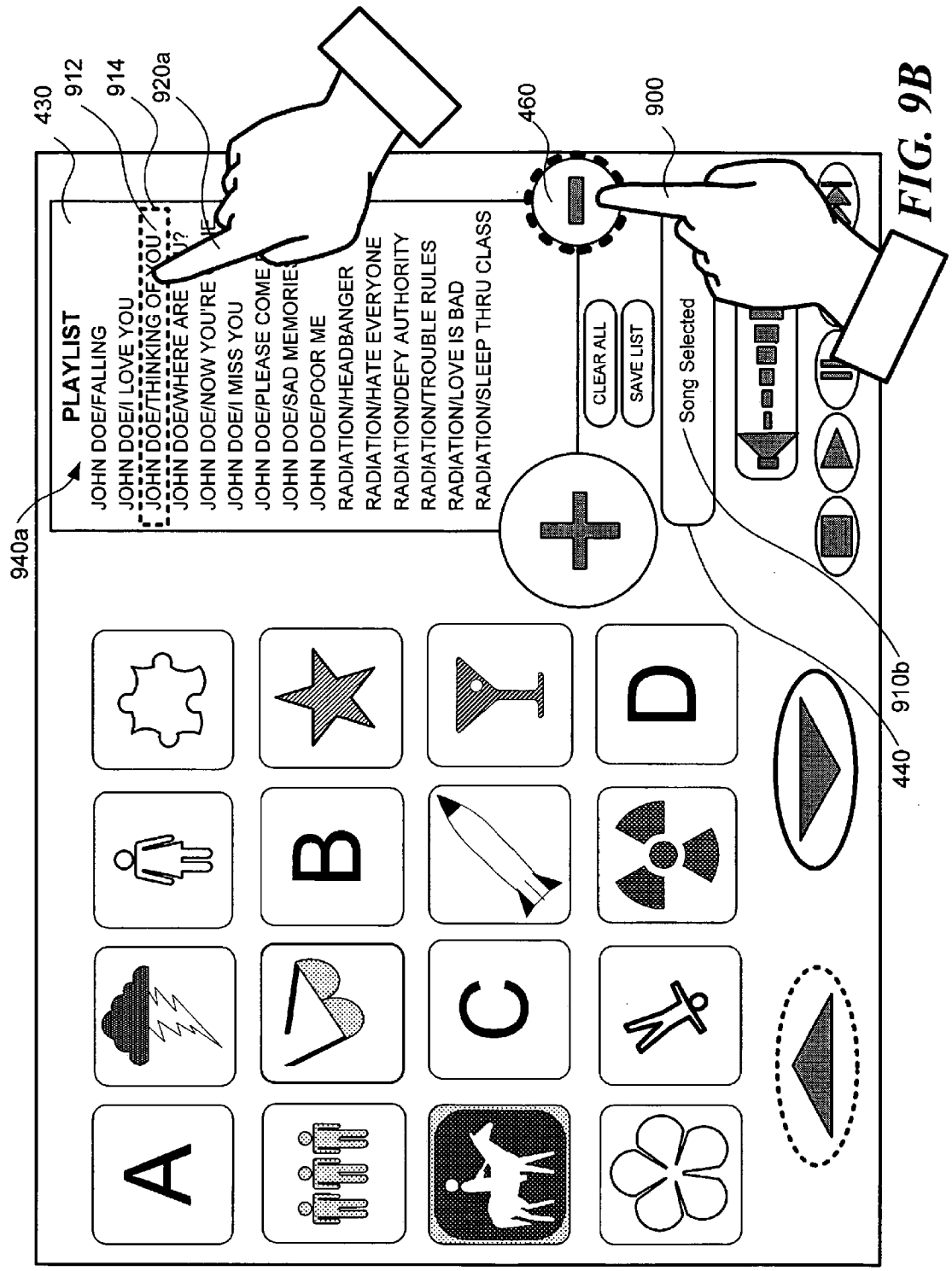

In a manner comparable to that used for adding songs to playlist 430, songs may be removed by a user placing a finger or other physical object over remove button 460, as shown in FIG. 9B. More specifically, the user places a left index finger 900 on remove button 460 and places a right index finger 920a on a chosen song 912 among list of song titles 940a in playlist 430. As described above, embodiments of the present invention can be adapted to include a delay to enable a user to determine if the user's actions will actually initiate the function desired. Thus, status bar 440 optionally presents song selected message 910b, and selection indicator 914. Also, a user can certainly switch the fingers that are used for each action, the hands that are used for selecting a specific button, etc.

Figure 9C:
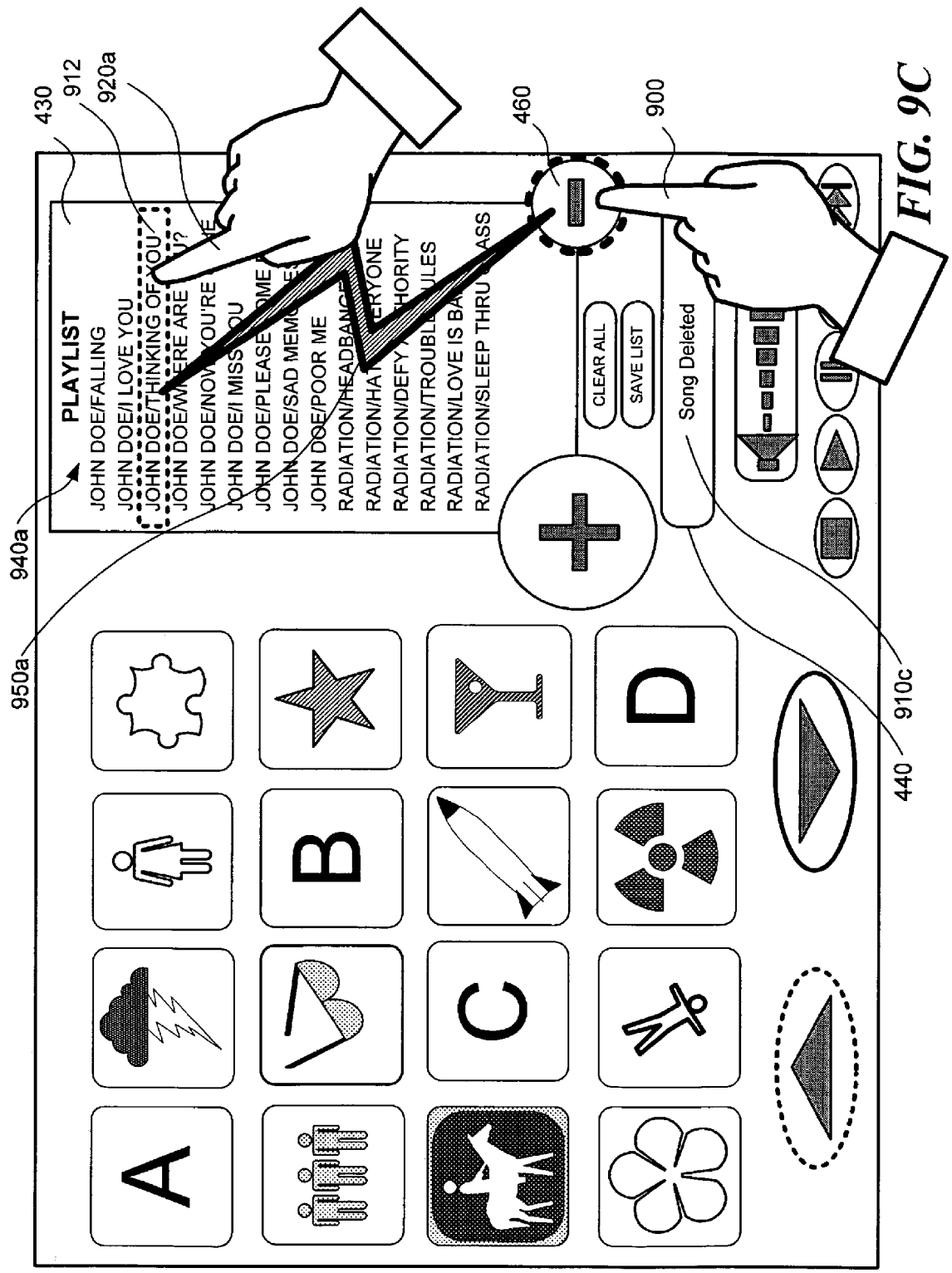

Subsequently, as shown in FIG. 9C, a connection indicator 950a is shown between chosen song 912 and remove button 460. Optionally, status bar 440 displays a song deleted message 910c. Placement of the user's left index finger 900 on remove button 460 and placement of right index finger 920a on chosen song 912 in list of song titles 940a included in playlist 430 causes chosen song 912 to be deleted, as confirmed by a connection indicator 950a. Connection indicator 950a has a different appearance from connection indicators 550a (FIG. 5C), 550b (FIG. 5D), 650a and 650b (FIG. 6B), and 750a (FIG. 7C), visually signifying the removal of selections from playlist 430, instead of song additions, as signified by the other connection indicators.

Figure 9D:
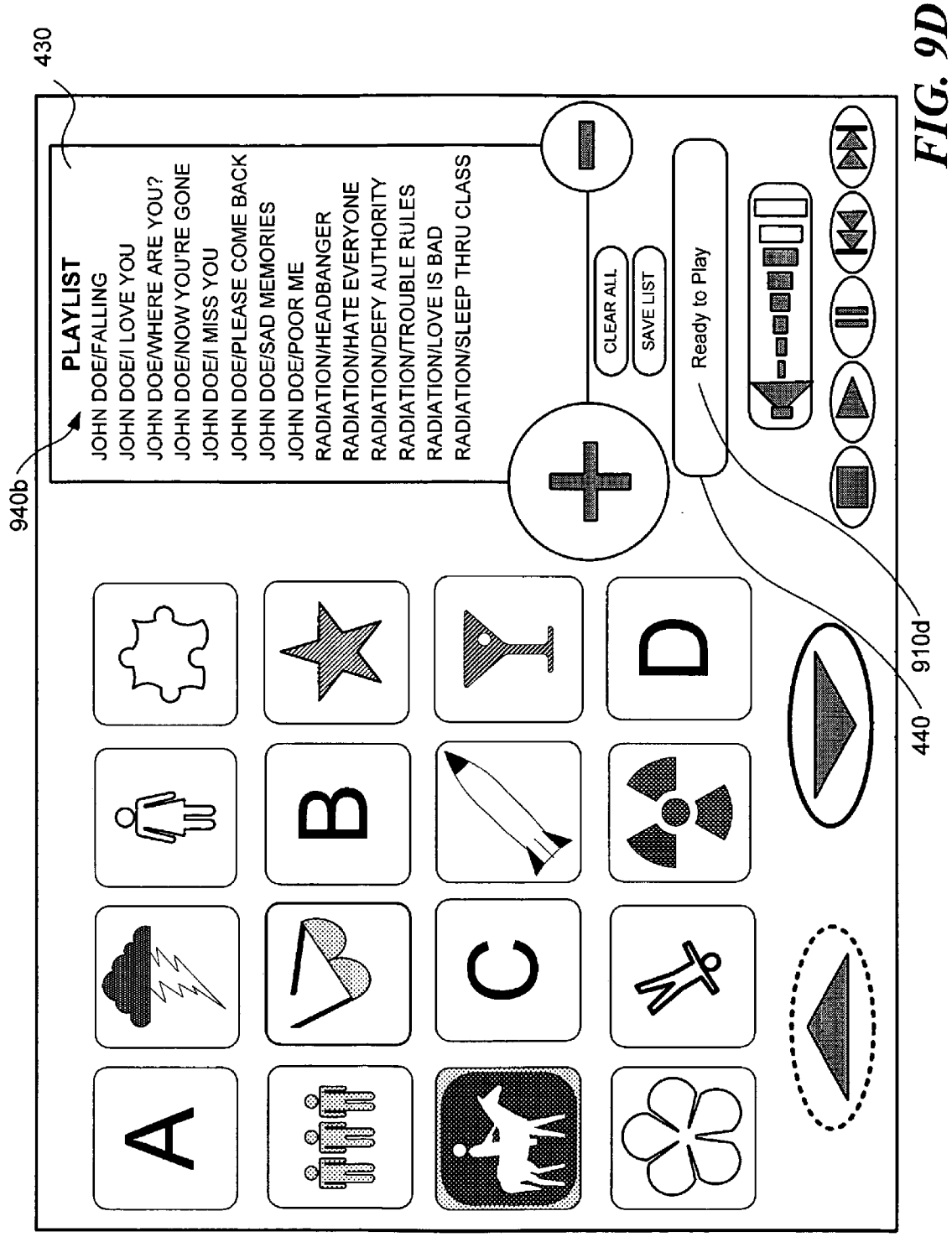

FIG. 9D shows the results of the user's actions, where a modified list of song titles 940b no longer includes chosen song 912 (FIGS. 9A-9C) in playlist 430. Status bar 440 presents ready to play message 910d, to indicate that modified list of songs titles 940b is ready to be played.

Figure 9E:
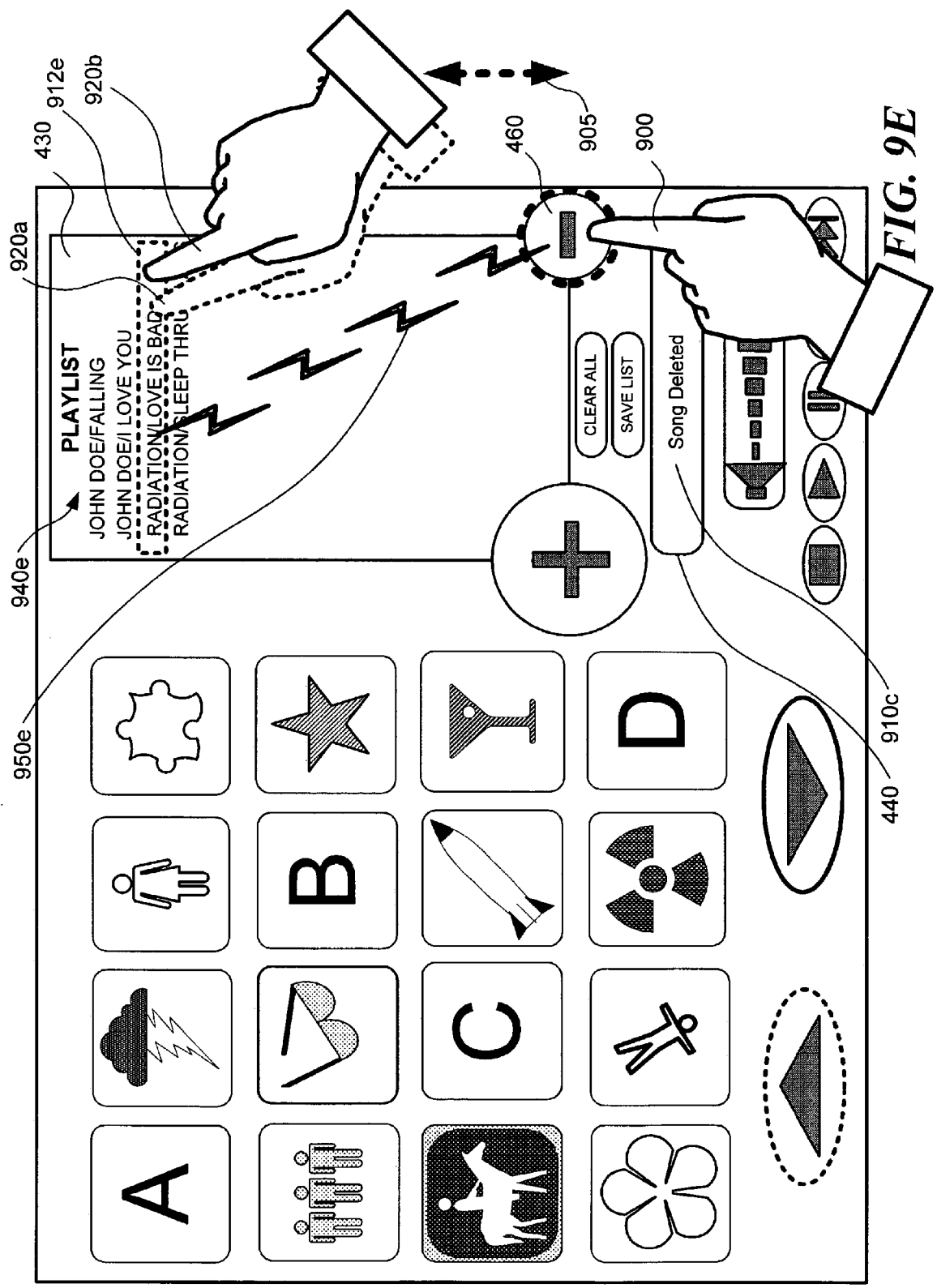

In connection with FIGS. 6B and 7B, it was described above that a user could drag a finger or other physical object to perform a compound action, such as a multiple album or song selection, respectively. It should be noted that, using the connecting interface, the user may perform a rapid repetitive action to accomplish a similar result. For example, as shown in FIG. 9E, while maintaining left index finger 900 on remove button 460, the user repeatedly moves the user's hand along an arrow 905, between a first position 920a of the right index finger and a second position 920b, tapping on what is a rapidly shrinking list of song titles 940e in playlist 430. Interactive display surface 64a detects such repeated movements and not only respond to the user's actions by removing each of a number of successively chosen songs 912e from list of song titles 940e in playlist 430, but also presents a different connection indicator 950e to confirm the user's repeated action.

Figure 9F:
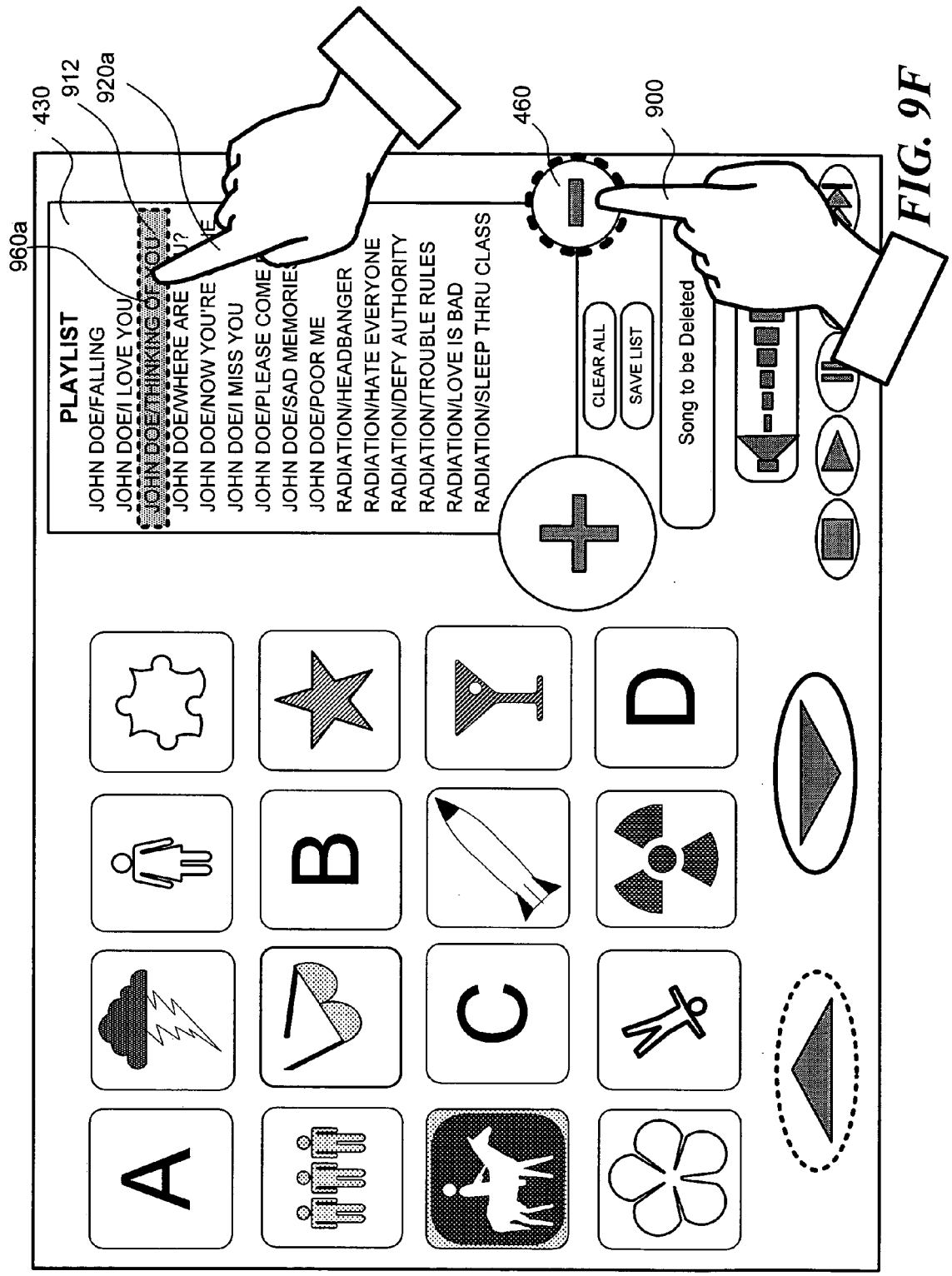
Figure 9G:
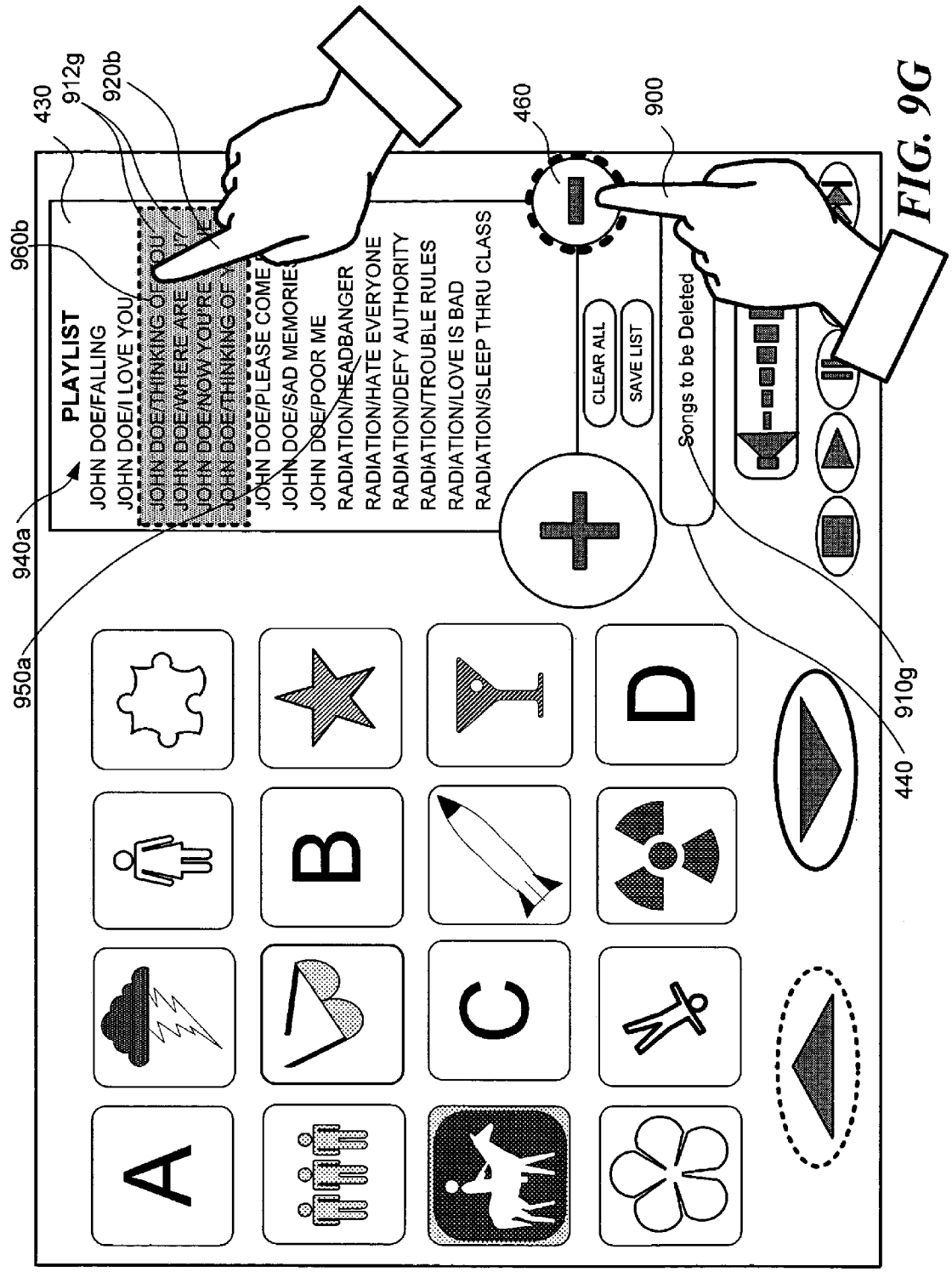

FIGS. 9F and 9G illustrates another aspect that may be provided by embodiments of the present invention to assist a user in the form of a deletion indicator. As is familiar to users of most computer systems, when a user indicates that he or she wishes to delete a file from a directory, the application and/or operating system commonly will seek confirmation from the user that the user indeed intends to delete the file before proceeding. In fact, in music player programs, such as Windows Media Player™ and RealPlayer™, when a user indicates that he or she wishes to delete a song from a playlist, even without deleting the media file itself, the user will be asked to confirm the choice before the player application removes the media file from the playlist. In a situation where a user, as described in connection with FIG. 9E, may remove multiple tracks through a series of repeated movements, it may be desirable to provide some clarification of what files the system has detected the user wishes to delete before proceeding.

Thus, FIGS. 9F and 9G illustrate deletion indicators 960a and 960b to provide visual feedback to the user of what files the system detects the user wishes to remove from playlist 430. Thus, as shown in FIG. 9F, when user has placed left index finger 900 on remove button 460 and right index finger 920a on chosen song 912, deletion indicator 960a appears around chosen song 912 to show that chosen song 912 will be removed from playlist 912. Deletion indicator 960a may appear to clarify the deletion, or appearance of deletion indicator 912 may be sustained for an interval of time to indicate the user must continue to selection chosen song 912 and remove button 460 for an interval before the application actually will remove the song.

As a result, if the user, by tapping a finger as previously described, has deleted a number of songs from playlist 430 and actually has deleted more songs than intended, appearance of deletion indicator may allow user to change his or her mind. Referring to FIG. 9G, for example, by tapping right index finger 920b, user may have indicated a number of selected songs 912g for deletion from playlist 430. Before selected songs 912g are removed, however, deletion indicator 960b appears around selected songs 912g. Thus, for example, if user removed left index finger 900 from removal button 460 while delection indicator 960b is still displayed and before selected songs 912g are removed from playlist 430, the deletion may be aborted. Thus, deletion indicators 960a and 960b can provide some assurance to the user that rapid actions, that may lead to a mistake, can be aborted to avoid unintended and/or undesired consequences.

Employing the Connecting User Interface to Provide User Help

FIG. 10 illustrates another embodiment of the present invention using a connection indicator 1050 for presenting a user help screen. While running the music player application, help may be provided to show a user how to operate the application. For example, if the user seeks help about how to add a chosen song 1012 to playlist 430, the help facility generates animated images of hands 1001, to teach the user the actions that are involved in carrying out this function. Thus, the help screen shows a right index finger 1020 over add button 450, while a left index finger at a first position 1000a is shown selecting a chosen album cover 1004. The generated image of the hand is then shown to move along the direction of an arrow 1005 (optionally displaying arrow 1005) from a first position 1000b of the left index finger, over chosen album cover 1004, to chosen song 1012, which is displayed among a list of songs 1008 associated with chosen album cover 1004, in a song window 1002. A song added message 1010 is presented in status bar 440, to provide a narrative explanation of the operation to the user. A connection indicator 1050 graphically illustrates the effect of the user's actions by, for example, illustrating a connection between chosen song 1012 and list of song titles 1040 in playlist 430. Connection indicator 1050 thus shows how elements in the display that are identified by a user cause a function to be initiated on the computing system. Connection indicator 1050 also can be used to show other connections, such as between chosen album 1004 and add button 450, between chosen song 1012 and the add button, as well as any number of other logical connections that might be beneficially illustrated to help the user.

Additional Uses of the Connecting User Interface

Although use of the connecting user interface has been described extensively for the music player application, it should be emphasized that embodiments of the connecting user interface are usable with almost any operating system interface and many other types of applications. For example, FIG. 11A shows a connecting user interface being employed in a file management application. On a desktop 1100, a window 1102 presents a number of folders 1104 and documents 1106. To delete a chosen document 1108, for example, the user identifies the chosen document with a left index finger 1100. After chosen document 1108 is identified, or while the user continues to identify it with left index finger 1100, the user positions right index finger 1120 to select or identify a recycle bin 1130. With these elements identified (where chosen document 1108 may be considered an operand to recycle bin 1130, which serves as an operator), a connection indicator 1140 is presented to show chosen document 1108 being moved to recycle bin 1130. It should be noted that connection indicator 1140 varies in appearance from the connection indicators described above, and it will be apparent that the connection indicator used for this purpose may be presented in any form that conveys cogent information to the user about the functions initiated.

It will also be appreciated that the connecting user interface is usable with any operation in which a data file is operated on by an application. The connecting user interface may thus be employed with any number of document functions, such as open, copy, save, move, attach, and delete. In these cases, the user would identify the document or other data file to be accessed, using a finger or other physical object, and the user also would identify the application, insertion point, function button, or other displayed information associated with achieving the desired function.

Embodiments of connecting interface also are usable with games and recreational applications. For example, a solitaire game is typically included with Microsoft Corporation's Windows™ operating systems. In the conventional version of this game, a user manipulates virtual cards with a mouse or other pointing device. Using an embodiment of the present invention, as shown in FIG. 11B for example, when playing a solitaire application 1150, a user can cause a card to be moved from one position to another by identifying the card and the destination with the user's finger(s) or other physical objects. Thus, a user could identify a selected card 1160 with a right index finger 1170, and use a left index finger 1180 to identify a destination 1190 where the card that was selected should be moved. Once these identifications are made, a connection indicator 1195 graphically illustrates and confirms what the user has selected. Once again, connection indicator 1195 may take a number of different forms selected to appropriately communicate information to a user about the user selected action.

Figure 12A:
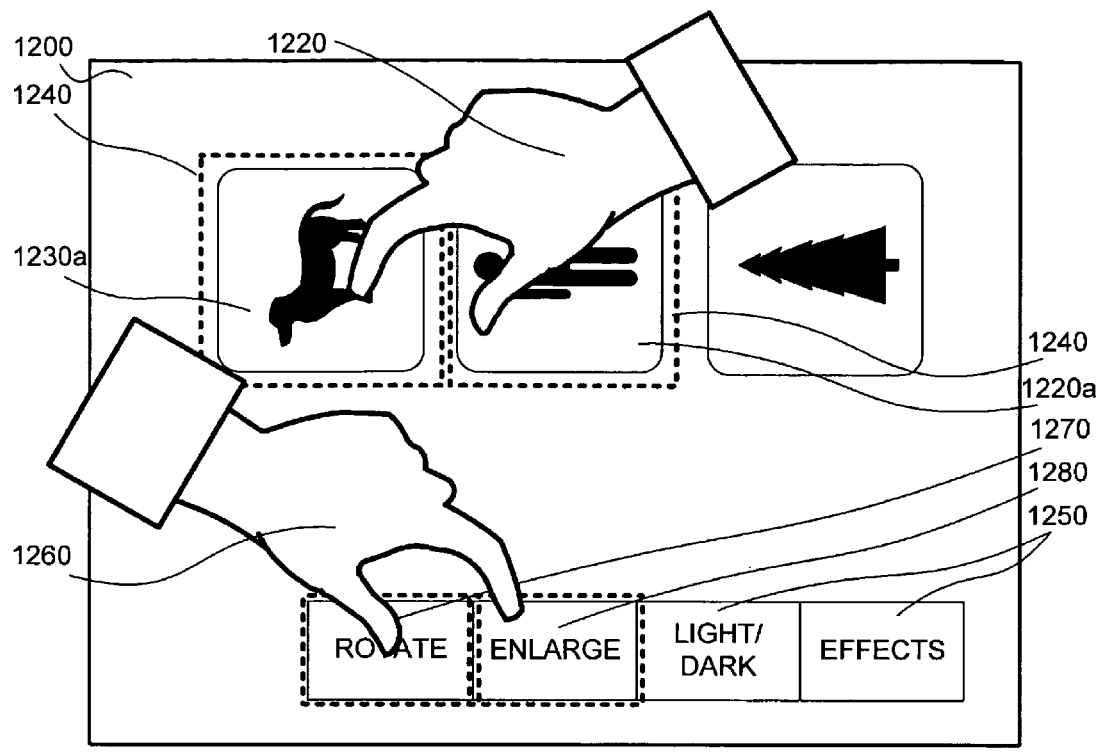

It should be appreciated that embodiments of the present invention allow multiple objects to be associated at one time, for example, as described in connection with FIGS. 6A-6D, 7D, and 9G. Furthermore, it should be appreciated that embodiments of the present invention not only allow multiple operands to be associated with an operator, but also allow multiple operators to be associated with one or more operands. For example, FIG. 12A illustrates an image viewing and processing application 1200. A number of images, such as images 1220a and 1230a are displayed, along with graphical buttons 1250 representing operations the user can perform. In FIG. 12A, user chooses images 1220a and 1230b with right hand 1220. Selection of images 1220a and 1220b is confirmed by selection indicators 1240. With images 1220a and 1230a selected, user then chooses rotate function button 1270 and enlarge function button 1280 by touching buttons 1270 and 1280 with left hand 1260. As previously described, such selections could be made either sequentially or contemporaneously. In either case, it will be appreciated that user has identified not only multiple operands in images 1220a and 1230a, but also has selected multiple operators 1270 and 1280.

Figure 12B:
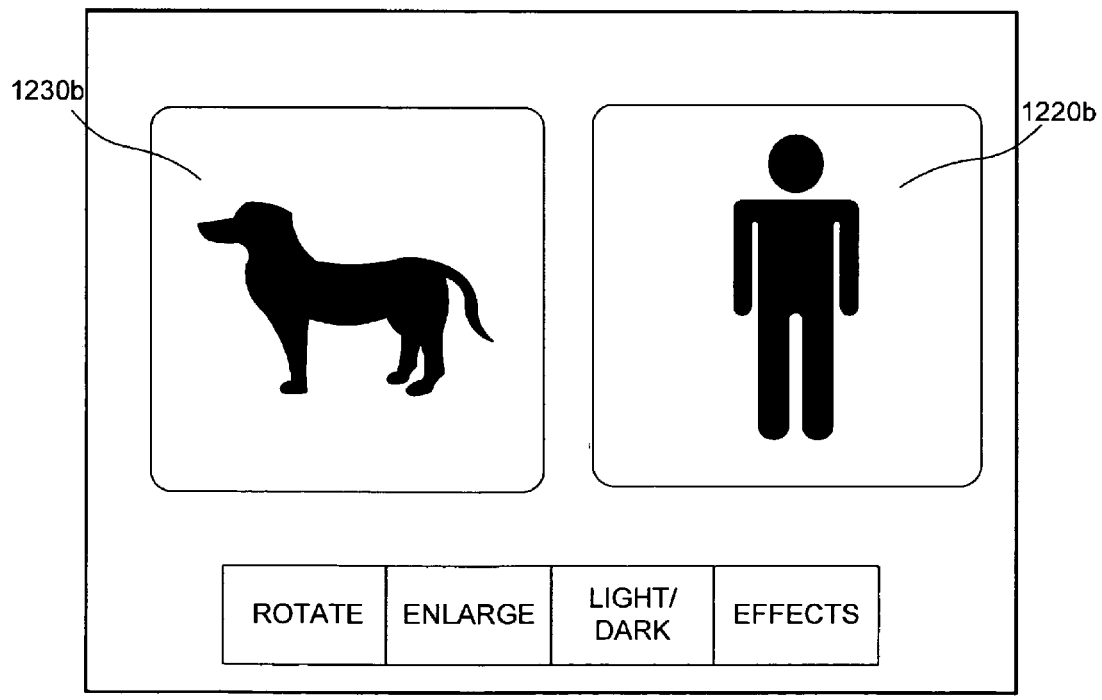

As can be seen in FIG. 12B, rotating and enlarging functions associated with operators 1270 and 1280, respectively, both have been performed, resulting in images 1220b and 1230b being displayed. Embodiments of the present invention, thus, are not limited to application of one operator at a time.

Methods for Receiving User Input and Presenting Connection Indicators

FIG. 13 shows a generalized flow diagram 1300 illustrating logical steps for receiving user input and providing appropriate user feedback. Flow diagram 1300 begins at a step 1302. At a decision step 1304, it is determined if a first item has yet been identified or indicated by a user, which can be done with the input means employed on the system to indicate a displayed item. If it is determined at decision step 1304 that no first item has yet been indicated, flow diagram 1300 continues to loop to repeat decision step 1304. Once a first item has been indicated, at a step 1306, the item indicated is flagged as selected.

At a decision step 1308, it is determined if the first item has been held for a requisite interval. As described above in connection with FIG. 7A, for example, if a user holds the identification of chosen album cover 704 for a predetermined interval, instead of all songs associated with chosen album cover 704 being added to playlist 430, song window 702 may open to present list of songs 706 from which user can choose one or more songs. Referring back to FIG. 13, decision step 1308 determines if an identification of the first item is held for a sufficient period of time to trigger a secondary function. If not, flow diagram 1300 proceeds to a step 1312. On the other hand, if the identification is held for the predetermined interval of time, at a step 1310, the secondary function is initiated.

At a decision step 1312, it is determined if the identifier, whether it be a finger or another physical object, has been dragged to identify other items, as described above in connection with FIGS. 6B and 7D. If so, at a decision step 1314, it is determined if the items identified are of the same type. If not, the continued dragging identification may be disregarded. Thus, for example, if a user should drag an identification to include both a chosen album cover and a player function, the continued identification may be disregarded as an error. On the other hand, if it is determined at decision step 1314 that the items are of the same type, then the additional items are flagged as selected, just as the additional album cover and additional songs were indicated as selected in FIGS. 6B and 7D, respectively.

Once a first item is selected, at a decision step 1318, it is determined if a second item, such as an operator has been selected. If not, flow diagram 1300 continues to loop back to decision step 1318. On the other hand, once it is determined at decision step 1318 that a second item has been selected, at a decision step 1320, it is determined if the first item(s) and second item indicate a function. For example, if the first and second items are both album covers, the selections made do not indicate a valid function. On the other hand, if the first item is an album cover and the second item is the add button, a function is clearly indicated. Thus, if it is determined at decision step 1320 that the first and second items do not indicate a function, flow diagram 1300 loops to decision step 1318 for indication of another item. However, if a function is indicated, at a step 1322, a connection indicator illustrative of the function is presented. At a step 1324, the function is initiated, and at a step 1326, flow diagram 1300 ends.

It should be noted that flow diagram 1300 illustrates just one generalized approach usable by an embodiment of the present invention. However, as described above, an embodiment of the present invention may enable a user to select either operands or operators first, and generally, embodiments of the present invention are not limited to a particular selection sequence.

FIGS. 14A-14C illustrate methods for receiving user identifications and presenting connection indicators for the music player application previously described in connection with FIGS. 4, 5A-5G, 6A-6D, 7A-7D, 8A-8C, and 9A-9G. FIG. 14A shows a flow diagram 1400 for a method for adding all songs on an album to a playlist. FIG. 14B shows a flow diagram 1430 for a method for adding selected songs from an album to a playlist. FIG. 14C shows a flow diagram 1450 for removing songs from a playlist. For the sake of further illustration, as contrasted with FIGS. 5A-5E and FIGS. 8A-8C, in FIGS. 14A and 14B it is assumed that selecting the add button then selecting an album cover causes all the songs on the album to be added to the playlist. On the other hand, while selecting the album cover before selecting the add button dictates that songs associated with the chosen album cover will be selected individually.

In FIG. 14A, a flow diagram 1400 begins at a step 1402. At a decision step 1404, it is determined if the add button is selected. If not, flow diagram 1400 loops back to decision step 1404 until the add button is selected. On the other hand, once it is determined at decision step 1404 that the add button has been identified, at a decision step 1406, it is determined if an album cover has been identified. If not, flow diagram 1400 loops back to decision step 1406 until an album cover is selected. On the other hand, once it is determined at decision step 1406 that an album cover has been selected, at a step 1408, a connection indicator is shown. As described above, the connection indicator may show a connection between the add button and the album cover, between the album cover and the playlist, or the connection indicator may show another connection. At a step 1410, the songs associated with the chosen album cover are added to the playlist. It will be understood that the songs could be added to the playlist before the connection indicator is shown, or both steps could occur simultaneously. Flow diagram 1400 ends at a step 1412.

In FIG. 14B, a flow diagram 1430 begins at a step 1432. At a decision step 1434, it is determined if an album cover has been selected. If not, flow diagram 1430 loops back to decision step 1434 until an album cover is selected. On the other hand, once it is determined at decision step 1434 that an album cover has been identified, at a step 1436, songs associated with the album cover are listed. At a decision step 1438, it is determined if one or more songs associated with the album cover have been identified. If not, flow diagram 1430 loops back to decision step 1438 until one or more songs are selected. On the other hand, once it is determined at decision step 1438 that one or more songs have been selected, at a step 1440, a connection indicator is shown. Again, as noted above, the connection indicator may show a connection between the add button and the list of songs, between each of the selected songs individually and the playlist, or the connection indicator may show another connection. At a step 1442 the songs selected are added to the playlist. It will be understood that the songs could be added to the playlist before the connection indicator is shown, or both steps could occur simultaneously. Flow diagram 1430 ends at a step 1444.

In FIG. 14C, a flow diagram 1450 begins at a step 1452. At a decision step 1454, it is determined if the delete button is selected. If not, flow diagram 1450 loops back to decision step 1404 until the add button is selected. On the other hand, once it is determined at decision step 1454 that the add button has been identified, at a decision step 1456, it is determined if songs in the playlist have been identified. If not, flow diagram 1450 loops to a decision step 1456 until one or more songs are selected. It will be understood that embodiments of the present invention may enable either the songs or the delete button to be chosen in the order that is desired by the user.

On the other hand, once it is determined at a decision step 1456 that one or more songs have been selected, at a step 1458, a connection indicator is shown. The connection indicator may show a connection between the delete button and the playlist, or the connection indicator may show another connection. At a step 1460, the songs identified are removed from the playlist. It will be understood that the songs could be removed from the playlist before the connection indicator is shown, or both steps could occur simultaneously. Flow diagram 1450 ends at a step 1452.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for controlling functions of a plurality of elements presented on a display associated with a computing system, comprising the steps of:
   receiving a first indication that a user has selected a first and a second element presented on a display, wherein the first and second elements comprise operands and wherein the first and second elements are selected simultaneously;
   receiving a second indication that the user has selected a third and a fourth element presented on the display, wherein the third and fourth elements comprise operators, each operator representing a corresponding function and wherein the third and fourth elements are selected simultaneously;
   recognizing a plurality of functions performable by the computing system based on the selection of the first, second, third and fourth elements presented on the display;
   displaying a plurality of graphical images, wherein a first graphical image of the plurality visually connects the first element and a portion of the display associated with the result of the function recognized and a second graphical image of the plurality visually connects the second element and the portion of the display associated with the result of the function recognized, such that at least two distinct graphical images are displayed, each of which touches at least a portion of the selected first and second elements and spans to touch at least a portion of the display portion associated with the functional result of the recognized function on the computer display, and wherein additional graphical images that span to touch a selected element and the portion of the display associated with the result of the function recognized are subsequently displayed each time an additional element has been selected; and
   performing both of the recognized functions of the third and fourth elements on each of the first and second elements.

2. The method of claim 1, further comprising presenting a visual indication on the display indicating a connection between one of:
   (a) each of the plurality of elements identified; and
   (b) at least one of the plurality of elements that were identified and a portion of the display associated with the function that was recognized.

3. The method of claim 2, wherein the visual indication presented varies according to the function that was recognized.

4. The method of claim 2, wherein the visual indication presented on the display indicating the connection includes at least one of:
   (a) a linear connection; and
   (b) an animation.

5. A memory on which are stored machine instructions for carrying out the steps of claim 1.

6. The method of claim 1, further comprising presenting a visual option indicator on the display upon detecting a first identification indicating an option of a next identification, the visual option indicator including one of:
   (a) visually highlighting a choice of available operands when an operator is selected with the first identification; and
   (b) visually highlighting a choice of available operators when at least one operand is selected with the first identification.

7. The method of claim 1, wherein the identifications of the plurality of elements presented on the display are received substantially simultaneously.

8. The method of claim 1, wherein at least one of the identifications is performed by detecting a physical object disposed adjacent to the display, at, or substantially near, a location where one of the plurality of elements is displayed, and wherein the physical object includes at least one of:
   (a) an inanimate object; and
   (b) a part of a user's body.

9. The method of claim 8, wherein a plurality of identifications are made by a combination of physical objects including a plurality of:
   (a) a part of a first user's body;
   (b) a part of a second user's body;
   (c) an inanimate object manipulated by a first user; and
   (d) an inanimate object manipulated by a second user.

10. The method of claim 8, wherein the function recognized varies based on a time interval during which the physical object is disposed adjacent to the display at the location where said one of the plurality of elements is displayed.

11. The method of claim 1, wherein an order in which the plurality of elements are identified changes at least one of:
   (a) the function recognized; and
   (b) the visual indication presented.

12. The method of claim 1, wherein the combination of the plurality of elements includes at least one operator and at least one operand, such that identification of the operator and the at least one operand causes a predefined function represented by the operator to be performed on the at least one operand.

13. The method of claim 12, further comprising the step of enabling a plurality of operands to be identified when a first operand is identified, and while an action causing the first operand to be identified continues, enabling an additional operand to be identified.

14. The method of claim 13, wherein the action causing the first operand to be identified includes the step of enabling pointing to the first operand; and wherein the action continues while the pointing is directed by dragging, to identify the additional operand.

15. The method of claim 12, where in a media player application, the operator represents a player function, and the at least one operand includes a representation of a media recording, and wherein the player function includes at least one of:
   (a) an add function that adds a media selection to a playlist;
   (b) a delete function that removes a media selection from playlist; and
   (c) a play function that plays one or more media selections in the playlist.

16. The method of claim 15, wherein the portion of the display associated with the function recognized includes one of:
   (a) a displayed playlist; and
   (b) the operator representing the player function.

17. A method for providing a visual feedback of a selection of an operator and at least one operand presented on a display that is coupled to a computing system, comprising the steps of:
   identifying the selection of a first operand as indicated by a first object;
   identifying the selection of a second operand as indicated by a second object, wherein the first and second operands are selected simultaneously;
   identifying the selection of first operator as indicated by a third object;
   identifying the selection of a second operator as indicated by a fourth object, wherein the first and second operators each represents a corresponding function and wherein the first and second operators are selected simultaneously;
   recognizing a plurality of functions performable by the computing system based on the selection of the first and second operands and the first and second operators;
   displaying plurality of graphical images, wherein a first graphical image of the plurality visually connects the first operand and the first operator on the display and a second graphical image of the plurality visually connects the second operand and the second operator on the display, such that at least two distinct graphical images are displayed, each of which touches at least a portion of the operand and spans to touch at least a portion of the selected first and second operands on the computer display, and wherein additional graphical images that span to touch a selected operand and the operator each time an additional element has been selected, and
   causing both of the functions of the first and second operators on each of the first and second operands.

18. The method of claim 17, further comprising presenting a visual option indicator on the display upon detecting a first identification indicating an option of a next identification, the visual option indicator including one of:
   (a) visually highlighting a choice of available operands when an operator is selected with the first identification; and
   (b) visually highlighting a choice of available operators when at least one operand is selected with the first identification.

19. The method of claim 17, wherein the step of receiving the identifications of the operator and the at least one operand occurs one of:
   (a) substantially simultaneously;
   (b) sequentially, without regard to order; and
   (c) sequentially, in a predefined order.

20. The method of claim 17, wherein at least one of the identifications is performed by detecting a physical object disposed adjacent to the display, at, or substantially near, a location where one of the plurality of elements is displayed, and the physical object includes at least one of:
   (a) a portion of a user's body; and
   (b) an inanimate object.

21. The method of claim 20, wherein a plurality of identifications are made by a combination of physical objects including a plurality of:
   (a) a part of a first user's body;
   (b) a part of a second user's body;
   (c) an inanimate object manipulated by a first user; and
   (d) an inanimate object manipulated by a second user.

22. The method of claim 20, wherein the function recognized varies based on a time interval during which the physical object is disposed adjacent to the display at the location where one of the plurality of elements is displayed.

23. The method of claim 17, further comprising the steps of enabling a plurality of operands to be identified when a first operand is identified; and while the first operand is being identified, identifying an additional operand.

24. The method of claim 23, wherein the first operand is identified by a pointing directed to the first operand, and wherein the additional operand is identified by dragging the pointing to be directed to the additional operand.

25. The method of claim 17, where in a media player application, the operator represents a player function, and the at least one operand includes a representation of a media recording, and wherein the player function includes at least one of:
   (a) a function to add a selection to a playlist;
   (b) a delete function to delete a selection from the playlist; and
   (c) a play function to play any selection in the playlist.

26. The method of claim 25, wherein the portion of the display associated with the function recognized includes one of:
   (a) the playlist; and
   (b) the operator representing the player function.

27. The method of claim 17, wherein the visual indication presented on the display indicating the connection includes at least one of:
   (a) a linear connection; and
   (b) an animation.

28. A memory on which are stored machine instructions for carrying out the steps of claim 17.

29. The method of claim 17, wherein the visual indication visually linking the result of the function recognized to the identified operator and the at least one operand is animated to highlight the consequential result of the user's identifications, rather than the actions themselves.

30. The method of claim 29, wherein the animated visual indication is altered based on subsequently received user identifications.

31. A system for providing an input to an application that is being executed, comprising:
   an interactive display surface adjacent to which a plurality of physical objects are manipulated, said interactive display surface presenting visual entities;
   a sensor that detects a location of the physical objects that are adjacent to the interactive display surface;
   a processor in communication with the light sensor and the display device; and
   a memory in communication with the processor, the memory storing data and machine instructions that cause the processor to carry out a plurality of functions, including:
      receiving identifications of a plurality of the visual entities including identifications of at least a first visual entity, a second visual entity, a third visual entity and a fourth visual entity, the identifications being made by the processor as a function of the locations of the physical objects adjacent to the plurality of visual entities presented on the interactive display surface, wherein the first and second visual entities comprise operands and the third and fourth visual entities comprise operators, wherein the first, second, third and fourth visual entities are selected simultaneously by a plurality of physical objects that are touching the interactive display surface;

recognizing a plurality of functions that are to be performed by the system based upon a combination of the visual entities that were identified;

displaying a plurality of graphical images, wherein a first graphical image of the plurality visually connects the first visual entity to the third visual entity and a second graphical image of the plurality visually connects the second visual entity to the third visual entity on the display, such that at least two distinct graphical images are displayed, each of which touches at least a portion of the third visual entity and spans to touch at least a portion of the first and second visual entities on the computer display, and wherein additional graphical images that span to touch a selected visual entity and the third visual entity are subsequently displayed each time an additional visual entity has been selected; and performing both of the recognized functions of the third and fourth visual entities on each of the first and second visual entities.

32. The system of claim 31, wherein the machine language instructions further cause the processor to present a visual indication on the interactive display surface indicating a connection between one of:

(a) each of the visual identifies that were identified; and (b) at least one of the visual identifies that was identified and the portion of the interactive display surface that is associated with the function recognized.

33. The system of claim 32, wherein the machine language instructions further cause the processor to vary the presentation of the visual indication according to the function that was recognized.

34. The system of claim 31, wherein the machine language instructions further cause the processor to present a visual option indicator on the display upon detecting a first identification indicating an option of a next identification, the visual option indicator including one of:

(a) visually highlighting a choice of available operands when an operator is selected with the first identification; and (b) visually highlighting a choice of available operators when at least one operand is selected with the first identification 35. The system of claim 31, wherein the identifications of the plurality of visual entities presented on the display are received substantially simultaneously.

36. The system of claim 31, wherein an identification of one of the visual entities comprising the combination is made by the sensor and is determined to be maintained while an identification of another of the visual entities comprising the combination is being made by the sensor.

* * * * *